US010897712B2

(12) United States Patent
Li et al.

(10) Patent No.: US 10,897,712 B2
(45) Date of Patent: Jan. 19, 2021

(54) CYBER SECURITY MANAGEMENT SYSTEM, METHOD, AND APPARATUS

(71) Applicant: HUAWEI TECHNOLOGIES CO., LTD., Shenzhen (CN)

(72) Inventors: Lichun Li, Shenzhen (CN); Fei Liu, Singapore (SG); Marco Spini, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/240,710

(22) Filed: Jan. 5, 2019

(65) Prior Publication Data

US 2019/0159029 A1    May 23, 2019

Related U.S. Application Data

(63) Continuation of application No. PCT/CN2017/077949, filed on Mar. 23, 2017.

(30) Foreign Application Priority Data

Jul. 5, 2016   (CN) .......................... 2016 1 0525502

(51) Int. Cl.
G06F 21/00     (2013.01)
H04W 12/06     (2009.01)
(Continued)

(52) U.S. Cl.
CPC ............ H04W 12/06 (2013.01); H04L 29/06 (2013.01); H04L 63/0869 (2013.01);
(Continued)

(58) Field of Classification Search
None
See application file for complete search history.

(56) References Cited

U.S. PATENT DOCUMENTS 7,356,694 B2 * 4/2008 Mayo .................. H04L 63/0815
                                                          713/159
7,450,595 B1 * 11/2008 Killian ................. H04L 12/467
                                                          370/356
(Continued)

FOREIGN PATENT DOCUMENTS

CN     101515927 A     8/2009
CN     102597981 A     7/2012
(Continued)

OTHER PUBLICATIONS

3GPP TR 23.711 V0.5.0 (May 2016), 3rd Generation Partnership Project; Technical Specification Group Services and System Aspects; Enhancements of Dedicated Core Networks selection mechanism;(Release 14), May 2016, 34 pages.
(Continued)

Primary Examiner — Maung T Lwin
(74) Attorney, Agent, or Firm — Kilpatrick Townsend & Stockton LLP

(57) ABSTRACT

Embodiments of the present invention disclose a cyber security management system, method, and apparatus. The system includes user equipment (UE), an access network (AN), a network function selection module, and at least two authentication modules. The UE is configured to send a first service request to the network function selection module, where the first service request carries authentication protocol information. The network function selection module is configured to: select a target authentication module based on the authentication protocol information, and send a second service request to the target authentication module. The target authentication module is configured to perform mutual authentication with the UE. The target authentication module is further configured to: determine a first security
(Continued)

configuration according to a specified security policy, and send the first security configuration to the AN.

20 Claims, 26 Drawing Sheets

(51) Int. Cl.
  *H04L 29/06* (2006.01)
  *H04W 12/10* (2009.01)
  *H04W 12/00* (2009.01)
  *H04L 29/08* (2006.01)

(52) U.S. Cl.
  CPC .......... *H04L 63/20* (2013.01); *H04L 63/0892* (2013.01); *H04L 63/205* (2013.01); *H04L 67/1002* (2013.01); *H04W 12/001* (2019.01); *H04W 12/10* (2013.01)

(56) References Cited

U.S. PATENT DOCUMENTS

| | | | | |
|---|---|---|---|---|
| 7,890,992 | B2* | 2/2011 | Schwartzman | H04L 63/0884 726/15 |
| 7,984,168 | B2* | 7/2011 | Tamas | H04L 67/1002 709/227 |
| 8,595,816 | B2* | 11/2013 | Karasawa | H04L 63/0823 726/10 |
| 8,812,374 | B1* | 8/2014 | Sriram | H04N 21/47815 705/1.1 |
| 8,966,584 | B2* | 2/2015 | Hughes | H04L 63/08 709/225 |
| 2004/0255166 | A1 | 12/2004 | Shimizu | |
| 2006/0041939 | A1 | 2/2006 | Schwartzman et al. | |
| 2006/0059549 | A1* | 3/2006 | Suzuki | H04L 29/12254 726/9 |
| 2007/0245007 | A1 | 10/2007 | Tsirtsis et al. | |
| 2008/0076425 | A1* | 3/2008 | Khetawat | H04W 88/12 455/436 |
| 2009/0119760 | A1* | 5/2009 | Hung | H04W 12/0609 726/6 |
| 2009/0217353 | A1 | 8/2009 | Zheng | |
| 2013/0061291 | A1 | 3/2013 | Hegg et al. | |
| 2013/0125226 | A1 | 5/2013 | Shah et al. | |
| 2013/0301577 | A1 | 11/2013 | Parlamas et al. | |
| 2013/0303114 | A1 | 11/2013 | Ahmad et al. | |
| 2014/0130104 | A1* | 5/2014 | Ruffini | H04N 21/2181 725/62 |
| 2015/0026780 | A1* | 1/2015 | Igarashi | H04L 63/0236 726/5 |
| 2015/0358807 | A1 | 12/2015 | Gorey et al. | |
| 2016/0119304 | A1* | 4/2016 | Lelcuk | G06F 21/31 726/3 |
| 2016/0241722 | A1* | 8/2016 | Hao | H04W 12/0023 |
| 2017/0118637 | A1 | 4/2017 | Peng et al. | |

FOREIGN PATENT DOCUMENTS

| | | |
|---|---|---|
| CN | 103124443 B | 9/2015 |
| CN | 105025478 A | 11/2015 |
| JP | 2004328029 A | 11/2004 |
| JP | 2009533980 A | 9/2009 |
| JP | 2011176469 A | 9/2011 |
| JP | 2013506918 A | 2/2013 |
| JP | 2014155095 A | 8/2014 |
| JP | 2015002695 A | 1/2015 |
| JP | 2015524186 A | 8/2015 |

OTHER PUBLICATIONS

3GPP TR 23.799 V0.5.0 (May 2016), 3rd Generation Partnership Project; Technical Specification Group Services and System Aspects; Study on Architecture for Next Generation System(Release 14), total 178 pages.

3GPP TR 33.899 V0.2.0 (May 2016);3rd Generation Partnership Project;Technical Specification Group Services and System Aspects;Study on the security aspects of the next generation system(Release 14);total 75 pages.

Huawei et al.,"Updates to Solution #8.9 Security mechanism differentiation for network slices",3GPP TSG SA WG3 (Security) Meeting #86 S3-170502(revision of S3-170057), Feb. 6-10, 2017, Sophia Antipolis (France),total 3 pages.

* cited by examiner

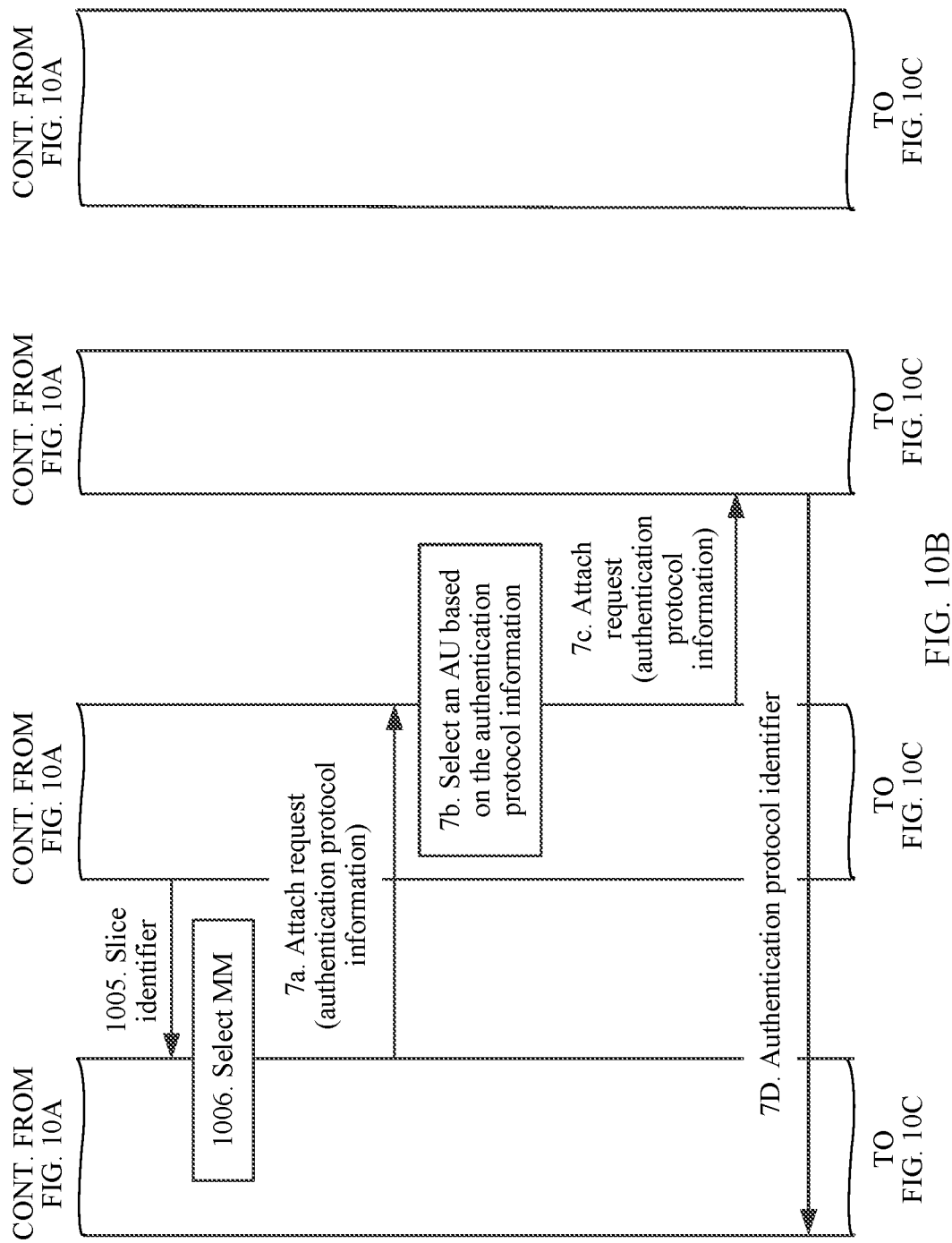

CYBER SECURITY MANAGEMENT SYSTEM, METHOD, AND APPARATUS

CROSS-REFERENCE TO RELATED APPLICATIONS

This application is a continuation of International Application No. PCT/CN2017/077949, filed on Mar. 23, 2017, which claims priority to a continuation of Chinese Application No. 201610525502.5, filed on Jul. 5, 2016. The disclosures of the aforementioned applications are hereby incorporated by reference in their entireties.

TECHNICAL FIELD

The present invention relates to the field of communications technologies, and in particular, to a cyber security management system, method, and apparatus.

BACKGROUND

In a 4G network, to support services, network leasing, network sharing, and the like with different requirements, a plurality of dedicated core networks may share an access network (AN). Each dedicated core network is optimized for a specific service in function and performance, to meet differentiated requirements for service functions and performance. FIG. 1 is a schematic architectural diagram of a 4G dedicated core network. The access network may be connected to a plurality of operators, each operator may have a dedicated core network (DCN), and a plurality of DNCs share the access network. User equipment (UE) is connected to the access network, and implements interaction, such as business service, with the dedicated core network of each operator by using the access network. In a 5G network, there are a plurality of logical networks that are referred to as "network slices" ("slice"). Different slices not only differ in function and performance requirements, but also may differ in security requirements.

In a prior-art idea for a slice architecture in the 5G network, UE may simultaneously access a plurality of slices, and a network selects an AU based on slice information of a slice to which the UE is to be attached or a load status of an authentication unit (AU), and then implements authentication with the UE by using the selected AU, or authorizes the UE to perform an operation, for example, to access a target slice. In the prior art, during AU selection, information such as an authentication protocol or an algorithm supported by the UE is not considered, and there is a lack of a related design. Consequently, cyber security cannot be better guaranteed.

SUMMARY

This application provides a cyber security management system, method, and apparatus, to meet differentiated authentication protocol and security policy security requirements of a network, and improve cyber security.

According to a first aspect, a cyber security management system is provided, where the management system is configured to implement security management of a network including at least two network slices, and the system may include user equipment UE, an access network AN, a network function selection module, and at least two authentication modules, where the UE is configured to send a first service request to the network function selection module, where the first service request carries authentication protocol information;

the network function selection module is configured to: select a target authentication module from the at least two authentication modules based on the authentication protocol information, and send a second service request to the target authentication module;

the target authentication module is configured to: receive the second service request, and perform mutual authentication with the UE;

the target authentication module is further configured to: determine a first security configuration according to a specified security policy of a specified network slice to which the UE is to be attached, and send a second service request response to the AN, where the second service request response carries the first security configuration; and the AN is configured to: determine a second security configuration based on the first security configuration or the specified security policy, and send a first service request response to the UE, where the first service request response carries the second security configuration.

In this application, the network function selection module may select, based on the information about an authentication protocol supported by the UE, an authentication module that supports the authentication protocol supported by the UE, and then the authentication module may perform mutual authentication with the UE, thereby improving authentication module selection accuracy and cyber security. In this application, the target authentication module selected according to the authentication protocol may generate a security configuration, or the target authentication module selected according to the authentication protocol and the AN may generate a security configuration, so that selection flexibility is high.

With reference to the first aspect, in a first possible implementation, the authentication protocol information includes an identifier of a first authentication protocol selected by the UE; and the network function selection module is specifically configured to:

select the target authentication module that supports the first authentication protocol from the at least two authentication modules based on the identifier of the first authentication protocol.

With reference to the first possible implementation of the first aspect, in a second possible implementation, if more than one authentication module supports the first authentication protocol, the network function selection module is specifically configured to:

select, based on a load status of each authentication module that supports the first authentication protocol, an authentication module with least load from the authentication modules as the target authentication module. It should be pointed out that alternatively, an authentication module whose load is less than a preset threshold is selected as the target authentication module from all the authentication modules. In other words, if there are a plurality of authentication modules whose load is less than the preset threshold, an authentication module may be randomly selected from the plurality of authentication modules whose load is less than the preset threshold, and an authentication module with least load does not necessarily need to be selected as the target authentication module.

With reference to the first aspect, in a third possible implementation, the authentication protocol information includes an identifier of a first authentication protocol selected by the UE;
the first service request further carries an identifier of the specified network slice; and
the network function selection module is specifically configured to:
select the target authentication module that supports the first authentication protocol and the specified network slice from the at least two authentication modules based on the identifier of the first authentication protocol and the identifier of the specified network slice.

With reference to the third possible implementation of the first aspect, in a fourth possible implementation, if more than one authentication module supports the first authentication protocol and the specified network slice, the network function selection module is specifically configured to:
select, based on a load status of each authentication module that supports the first authentication protocol and the specified network slice, an authentication module with least load from the authentication modules as the target authentication module.

With reference to the first aspect, in a fifth possible implementation, the authentication protocol information includes identifiers of at least two second authentication protocols supported by the UE; and
the network function selection module is specifically configured to:
select, based on the identifiers of the second authentication protocols, a to-be-selected authentication module that supports at least one of the second authentication protocols from the at least two authentication modules as the target authentication module.

With reference to the first aspect, in a sixth possible implementation, the authentication protocol information includes identifiers of at least two second authentication protocols supported by the UE;
the first service request further carries an identifier of the specified network slice; and
the network function selection module is specifically configured to:
select, based on the identifiers of the second authentication protocols, a to-be-selected authentication module that supports at least one of the second authentication protocols and supports the specified network slice from the at least two authentication modules as the target authentication module.

With reference to the first aspect, in a seventh possible implementation, the authentication protocol information includes identifiers of at least two second authentication protocols supported by the UE; and
the network function selection module is specifically configured to:
determine, based on an authentication protocol selection priority that is set in the network, an authentication protocol with a highest selection priority from the second authentication protocols supported by the UE, and select a to-be-selected authentication module that supports the authentication protocol with the highest selection priority from the at least two authentication modules as the target authentication module.

With reference to any one of the fifth possible implementation to the seventh possible implementation of the first aspect, in an eighth possible implementation, if there is more than one to-be-selected authentication module, the network function selection module is specifically configured to:
select, based on a load status of each of the more than one to-be-selected authentication module, an authentication module with least load from the authentication modules as the target authentication module.

With reference to the first aspect, in a ninth possible implementation, the authentication protocol information includes identifiers of at least two third authentication protocols supported by the UE and a selection priority of each of the at least two third authentication protocols; and
the network function selection module is specifically configured to:
select a to-be-selected authentication module that supports at least one of the third authentication protocols from the at least two authentication modules based on the identifiers of the third authentication protocols; and
if there is more than one to-be-selected authentication module, select, based on the selection priority of each third authentication protocol, an authentication module that supports a fourth authentication protocol with a highest selection priority from all to-be-selected authentication modules as the target authentication module.

With reference to the first aspect, in a tenth possible implementation, the authentication protocol information includes identifiers of at least two third authentication protocols supported by the UE and a selection priority of each of the at least two third authentication protocols;
the first service request further carries an identifier of the specified network slice; and
the network function selection module is specifically configured to:
select a first authentication module that supports at least one of the third authentication protocols from the at least two authentication modules based on the identifiers of the third authentication protocols;
if there is more than one first authentication module, select, based on the selection priority of each third authentication protocol, a second authentication module that supports a fourth authentication protocol with a highest priority from all first authentication modules; and
if there is more than one second authentication module, select, based on a load status of each second authentication module or information about a network slice served by each second authentication module, an authentication module with least load that serves the specified network slice from the second authentication modules as the target authentication module.

With reference to the first aspect, in an eleventh possible implementation, the network function selection module includes a first submodule and a second submodule, where
the first submodule is configured to: receive the first service request sent by the UE, and send an authentication module selection request to the second submodule, where the authentication module selection request carries the authentication protocol information;
the second submodule is configured to: select the target authentication module from the at least two authentication modules based on the authentication protocol information, and send an identifier of the target authentication module to the first submodule; and
the first submodule is further configured to send the second service request to the target authentication module corresponding to the identifier of the target authentication module.

With reference to the eleventh possible implementation of the first aspect, in a twelfth possible implementation, the second submodule is specifically configured to perform an implementation performed by the network function selection module in the foregoing various possible implementations.

With reference to any one of the first possible implementation to the tenth possible implementation of the first aspect, in a thirteenth possible implementation, the management system further includes a security policy controller, where
the security policy controller is configured to deliver a network slice security policy to the authentication module or the AN.

With reference to the thirteenth possible implementation of the first aspect, in a fourteenth possible implementation, the security policy controller is configured to deliver the network slice security policy to the authentication module;
the second service request further carries a security capability of the UE and a security capability of the AN;
the target authentication module is further configured to:
determine a key length specified in the specified security policy corresponding to the specified network slice, and generate a key corresponding to the key length;
select a target encryption algorithm or a target integrity protection algorithm based on the security capability of the UE, the security capability of the AN, and the specified security policy; and
generate the first security configuration by using the key and an identifier of the target encryption algorithm or an identifier of the target integrity protection algorithm, and add the first security configuration to the second service request response; and
the AN is specifically configured to:
determine, as the second security configuration, the identifier of the target encryption algorithm or the identifier of the target integrity protection algorithm that is carried in the first security configuration, and add the second security configuration to the first service request response.

With reference to the thirteenth possible implementation of the first aspect, in a fifteenth possible implementation, the security policy controller is configured to deliver the network slice security policy to the authentication module and the AN;
the second service request further carries a security capability of the UE;
the target authentication module is further configured to:
determine a key length specified in the specified security policy of the specified network slice, generate a key corresponding to the key length, generate the first security configuration based on the key and the identifier of the specified network slice, and add the first security configuration to the second service request response; and
the AN is specifically configured to:
determine the specified security policy based on the identifier of the specified network slice, and select a target encryption algorithm or a target integrity protection algorithm based on a security capability of the AN, the security capability of the UE, and the specified security policy; and
add an identifier of the target encryption algorithm or an identifier of the target integrity protection algorithm to the first security configuration, to obtain the second security configuration.

With reference to the thirteenth possible implementation of the first aspect, in a sixteenth possible implementation, the security policy controller is configured to deliver the network slice security policy to the authentication module;
the second service request further carries a security capability of the UE;
the target authentication module is further configured to:
select a target encryption algorithm or a target integrity protection algorithm based on the security capability of the UE, a security capability of the AN, and the specified security policy; and
generate the first security configuration by using an identifier of the target encryption algorithm or an identifier of the target integrity protection algorithm, and add the first security configuration to the second service request response; and
the AN is specifically configured to:
determine, as the second security configuration, the identifier of the target encryption algorithm or the identifier of the target integrity protection algorithm that is carried in the first security configuration, and add the second security configuration to the first service request response.

With reference to the fourteenth possible implementation of the first aspect or the sixteenth possible implementation of the first aspect, in a seventeenth possible implementation, the target encryption algorithm is an encryption algorithm with a highest selection priority in an encryption algorithm supported by both the UE and the AN; and
the target integrity protection algorithm is an integrity protection algorithm with a highest selection priority in an integrity protection algorithm supported by both the UE and the AN.

With reference to any one of the first aspect and the first possible implementation to the seventeenth possible implementation of the first aspect, in an eighteenth possible implementation, the network function selection module includes at least one of an authentication unit AU selection function AUSF, an AU routing function AURF, a slice selection function SSF, and mobility management MM.

With reference to any one of the eleventh possible implementation of the first aspect to the seventeenth possible implementation of the first aspect, in a nineteenth possible implementation, the first submodule is an AURF, and the second submodule is an AUSF.

With reference to any one of the eleventh possible implementation of the first aspect to the seventeenth possible implementation of the first aspect, in a twentieth possible implementation, the authentication module includes at least one of an AU, a front-end, and an access control agent ACA.

According to a second aspect, a cyber security management system is provided, where the management system is configured to implement authentication module selection in security management of a network including at least two network slices, and the system may include user equipment UE, a network function selection module, and at least two authentication modules, where
the UE is configured to send a first service request to the network function selection module, where the first service request carries authentication protocol information;
the network function selection module is configured to:
select a target authentication module from the at least two authentication modules based on the authentication protocol information, and send a second service request to the target authentication module; and
the target authentication module is configured to: receive the second service request, and perform mutual authentication with the UE.

In this application, the network function selection module may select the target authentication module based on a plurality of authentication protocols supported by the UE, a selection priority of each of the authentication protocols, an authentication protocol selection priority that is set in the network, slice information, authentication module load, and the like, thereby improving authentication module selection flexibility, authentication module selection accuracy, authentication module selection efficiency, and cyber security.

With reference to the second aspect, in a first possible implementation, the authentication protocol information includes an identifier of a first authentication protocol selected by the UE; and
the network function selection module is specifically configured to:
select the target authentication module that supports the first authentication protocol from the at least two authentication modules based on the identifier of the first authentication protocol.

With reference to the first possible implementation of the second aspect, in a second possible implementation, if more than one authentication module supports the first authentication protocol, the network function selection module is specifically configured to:
select, based on a load status of each authentication module that supports the first authentication protocol, an authentication module with least load from the authentication modules as the target authentication module.

With reference to the second aspect, in a third possible implementation, the authentication protocol information includes an identifier of a first authentication protocol selected by the UE;
the first service request further carries an identifier of a specified network slice; and
the network function selection module is specifically configured to:
select the target authentication module that supports the first authentication protocol and the specified network slice from the at least two authentication modules based on the identifier of the first authentication protocol and the identifier of the specified network slice.

With reference to the third possible implementation of the second aspect, in a fourth possible implementation, if more than one authentication module supports the first authentication protocol and the specified network slice, the network function selection module is specifically configured to:
select, based on a load status of each authentication module that supports the first authentication protocol and the specified network slice, an authentication module with least load from the authentication modules as the target authentication module.

With reference to the second aspect, in a fifth possible implementation, the authentication protocol information includes identifiers of at least two second authentication protocols supported by the UE; and
the network function selection module is specifically configured to:
select, based on the identifiers of the second authentication protocols, a to-be-selected authentication module that supports at least one of the second authentication protocols from the at least two authentication modules as the target authentication module.

With reference to the second aspect, in a sixth possible implementation, the authentication protocol information includes identifiers of at least two second authentication protocols supported by the UE;
the first service request further carries an identifier of a specified network slice; and
the network function selection module is specifically configured to:
select, based on the identifiers of the second authentication protocols, a to-be-selected authentication module that supports at least one of the second authentication protocols and supports the specified network slice from the at least two authentication modules as the target authentication module.

With reference to the second aspect, in a seventh possible implementation, the authentication protocol information includes identifiers of at least two second authentication protocols supported by the UE; and
the network function selection module is specifically configured to:
determine, based on an authentication protocol selection priority that is set in the network, an authentication protocol with a highest selection priority from the second authentication protocols supported by the UE, and select a to-be-selected authentication module that supports the authentication protocol with the highest selection priority from the at least two authentication modules as the target authentication module.

With reference to any one of the fifth possible implementation of the second aspect to the seventh possible implementation of the second aspect, in an eighth possible implementation, if there is more than one to-be-selected authentication module, the network function selection module is specifically configured to:
select, based on a load status of each of the more than one to-be-selected authentication module, an authentication module with least load from the authentication modules as the target authentication module.

With reference to the second aspect, in a ninth possible implementation, the authentication protocol information includes identifiers of at least two third authentication protocols supported by the UE and a selection priority of each of the at least two third authentication protocols; and
the network function selection module is specifically configured to:
select a to-be-selected authentication module that supports at least one of the third authentication protocols from the at least two authentication modules based on the identifiers of the third authentication protocols; and
if there is more than one to-be-selected authentication module, select, based on the selection priority of each third authentication protocol, an authentication module that supports a fourth authentication protocol with a highest selection priority from all to-be-selected authentication modules as the target authentication module.

With reference to the second aspect, in a tenth possible implementation, the authentication protocol information includes identifiers of at least two third authentication protocols supported by the UE and a selection priority of each of the at least two third authentication protocols;
the first service request further carries an identifier of a specified network slice; and
the network function selection module is specifically configured to:
select a first authentication module that supports at least one of the third authentication protocols from the at least two authentication modules based on the identifiers of the third authentication protocols;

if there is more than one first authentication module, select, based on the selection priority of each third authentication protocol, a second authentication module that supports a fourth authentication protocol with a highest priority from all first authentication modules; and if there is more than one second authentication module, select, based on a load status of each second authentication module or information about a network slice served by each second authentication module, an authentication module with least load that serves the specified network slice from the second authentication modules as the target authentication module.

With reference to the second aspect, in an eleventh possible implementation, the network function selection module includes a first submodule and a second submodule, where the first submodule is configured to: receive the first service request sent by the UE, and send an authentication module selection request to the second submodule, where the authentication module selection request carries the authentication protocol information;

the second submodule is configured to: select the target authentication module from the at least two authentication modules based on the authentication protocol information, and send an identifier of the target authentication module to the first submodule; and the first submodule is further configured to send the second service request to the target authentication module corresponding to the identifier of the target authentication module.

With reference to the eleventh possible implementation of the second aspect, in a twelfth possible implementation, the second submodule is specifically configured to perform any one of the implementations performed by the network function selection module.

With reference to any one of the second aspect and the first possible implementation to the twelfth possible implementation of the second aspect, in a thirteenth possible implementation, the network function selection module includes at least one of an authentication unit AU selection function AUSF, an AU routing function AURF, a slice selection function SSF, and mobility management MM.

With reference to either of the eleventh possible implementation of the second aspect and the twelfth possible implementation of the second aspect, in a fourteenth possible implementation, the first submodule is an AURF, and the second submodule is an AUSF.

With reference to any one of the second aspect and the first possible implementation to the twelfth possible implementation of the second aspect, in a fifteenth possible implementation, the authentication module includes at least one of an AU, a front-end, and an access control agent ACA.

According to a third aspect, a cyber security management system is provided, where the management system is configured to implement security configuration management in security management of a network including at least two network slices, and the system may include user equipment UE, an access network AN, a security policy controller, and an authentication module, where the security policy controller is configured to deliver a network slice security policy to the AN or the authentication module;

the UE is configured to send a first service request to the AN, where the first service request carries an identifier of a specified network slice to which the UE is to be attached;

the AN is configured to send a second service request to the authentication module, where the second service request carries the identifier of the specified network slice to which the UE is to be attached;

the authentication module is configured to: receive the second service request, and perform mutual authentication with the UE;

the authentication module is further configured to: determine a first security configuration according to a specified security policy of the specified network slice, and send a second service request response to the AN, where the second service request response carries the first security configuration; and the AN is further configured to: determine a second security configuration based on the first security configuration or the specified security policy, and send a first service request response to the UE, where the first service request response carries the second security configuration.

In this application, a target authentication module selected according to an authentication protocol may generate a security configuration, or a target authentication module selected according to an authentication protocol and the AN may generate a security configuration, so that selection flexibility is high and cyber security is improved.

With reference to the third aspect, in a first possible implementation, the security policy controller is configured to deliver the network slice security policy to the authentication module;

the second service request further carries a security capability of the UE and a security capability of the AN;

the authentication module is further configured to:

determine a key length specified in the specified security policy corresponding to the specified network slice, and generate a key corresponding to the key length;

select a target encryption algorithm or a target integrity protection algorithm based on the security capability of the UE, the security capability of the AN, and the specified security policy; and generate the first security configuration by using the key and an identifier of the target encryption algorithm or an identifier of the target integrity protection algorithm, and add the first security configuration to the second service request response; and the AN is specifically configured to:

determine, as the second security configuration, the identifier of the target encryption algorithm or the identifier of the target integrity protection algorithm that is carried in the first security configuration, and add the second security configuration to the first service request response.

With reference to the third aspect, in a second possible implementation, the security policy controller is configured to deliver the network slice security policy to the authentication module and the AN;

the second service request further carries a security capability of the UE;

the authentication module is further configured to:

determine a key length specified in the specified security policy of the specified network slice, generate a key corresponding to the key length, generate the first security configuration based on the key and the identifier of the specified network slice, and add the first security configuration to the second service request response; and the AN is specifically configured to:
  determine the specified security policy based on the identifier of the specified network slice, and select a target encryption algorithm or a target integrity protection algorithm based on a security capability of the AN, the security capability of the UE, and the specified security policy; and
  add an identifier of the target encryption algorithm or an identifier of the target integrity protection algorithm to the first security configuration, to obtain the second security configuration.

With reference to the third aspect, in a third possible implementation, the security policy controller is configured to deliver the network slice security policy to the authentication module;
  the second service request further carries a security capability of the UE and a security capability of the AN;
  the authentication module is further configured to:
  select a target encryption algorithm or a target integrity protection algorithm based on the security capability of the UE, the security capability of the AN, and the specified security policy; and
  generate the first security configuration by using the key and an identifier of the target encryption algorithm or an identifier of the target integrity protection algorithm, and add the first security configuration to the second service request response; and
  the AN is specifically configured to:
  determine, as the second security configuration, the identifier of the target encryption algorithm or the identifier of the target integrity protection algorithm that is carried in the first security configuration, and add the second security configuration to the first service request response.

With reference to any one of the first possible implementation of the third aspect to the third possible implementation of the third aspect, in a fourth possible implementation, the target encryption algorithm is an encryption algorithm with a highest selection priority in an encryption algorithm supported by both the UE and the AN; and
  the target integrity protection algorithm is an integrity protection algorithm with a highest selection priority in an integrity protection algorithm supported by both the UE and the AN.

With reference to any one of the third aspect and the first possible implementation to the fourth possible implementation of the third aspect, in a fifth possible implementation, the authentication module includes at least one of an AU, a front-end, and an access control agent ACA.

According to a fourth aspect, a cyber security management method is provided, where the method may include:
  receiving, by a network function selection module, a first service request sent by user equipment UE, where the first service request carries authentication protocol information;
  selecting, by the network function selection module based on the authentication protocol information, a target authentication module from at least two authentication modules included in a network; and
  sending, by the network function selection module, a second service request to the target authentication module.

With reference to the fourth aspect, in a first possible implementation, the authentication protocol information includes an identifier of a first authentication protocol selected by the UE; and
  the selecting, by the network function selection module based on the authentication protocol information, a target authentication module from at least two authentication modules included in a network includes:
  selecting, by the network function selection module, the target authentication module that supports the first authentication protocol from the at least two authentication modules based on the identifier of the first authentication protocol.

With reference to the first possible implementation of the fourth aspect, in a second possible implementation, if more than one authentication module supports the first authentication protocol, the method further includes:
  selecting, based on a load status of each authentication module that supports the first authentication protocol, an authentication module with least load from the authentication modules as the target authentication module.

With reference to the fourth aspect, in a third possible implementation, the authentication protocol information includes an identifier of a first authentication protocol selected by the UE;
  the first service request further carries an identifier of a specified network slice; and
  the selecting, by the network function selection module based on the authentication protocol information, a target authentication module from at least two authentication modules included in a network includes:
  selecting, by the network function selection module, the target authentication module that supports the first authentication protocol and the specified network slice from the at least two authentication modules based on the identifier of the first authentication protocol and the identifier of the specified network slice.

With reference to the third possible implementation of the fourth aspect, in a fourth possible implementation, if more than one authentication module supports the first authentication protocol and the specified network slice, the method further includes:
  selecting, based on a load status of each authentication module that supports the first authentication protocol and the specified network slice, an authentication module with least load from the authentication modules as the target authentication module.

With reference to the fourth aspect, in a fifth possible implementation, the authentication protocol information includes identifiers of at least two second authentication protocols supported by the UE; and
  the selecting, by the network function selection module based on the authentication protocol information, a target authentication module from at least two authentication modules included in a network includes:
  selecting, by the network function selection module as the target authentication module, a to-be-selected authentication module that supports at least one of the second authentication protocols from the at least two authentication modules based on the identifiers of the second authentication protocols.

With reference to the fourth aspect, in a sixth possible implementation, the authentication protocol information includes identifiers of at least two second authentication protocols supported by the UE;
  the first service request further carries an identifier of a specified network slice; and
  the selecting, by the network function selection module based on the authentication protocol information, a target authentication module from at least two authentication modules included in a network includes:
selecting, by the network function selection module as the target authentication module, a to-be-selected authentication module that supports at least one of the second authentication protocols and supports the specified network slice from the at least two authentication modules based on the identifiers of the second authentication protocols.

With reference to the fourth aspect, in a seventh possible implementation, the authentication protocol information includes identifiers of at least two second authentication protocols supported by the UE; and
the selecting, by the network function selection module based on the authentication protocol information, a target authentication module from at least two authentication modules included in a network includes:
determining, by the network function selection module based on an authentication protocol selection priority that is set in the network, an authentication protocol with a highest selection priority from the second authentication protocols supported by the UE, and selecting a to-be-selected authentication module that supports the authentication protocol with the highest selection priority from the at least two authentication modules as the target authentication module.

With reference to any one of the fifth possible implementation of the fourth aspect to the seventh possible implementation of the fourth aspect, in an eighth possible implementation, if there is more than one to-be-selected authentication module, the method further includes:
selecting, based on a load status of each of the more than one to-be-selected authentication module, an authentication module with least load from the authentication modules as the target authentication module.

With reference to the fourth aspect, in a ninth possible implementation, the authentication protocol information includes identifiers of at least two third authentication protocols supported by the UE and a selection priority of each of the at least two third authentication protocols; and
the selecting, by the network function selection module based on the authentication protocol information, a target authentication module from at least two authentication modules included in a network includes:
selecting, by the network function selection module, a to-be-selected authentication module that supports at least one of the third authentication protocols from the at least two authentication modules based on the identifiers of the third authentication protocols; and
if there is more than one to-be-selected authentication module, selecting, based on the selection priority of each third authentication protocol, an authentication module that supports a fourth authentication protocol with a highest selection priority from all to-be-selected authentication modules as the target authentication module.

With reference to the fourth aspect, in a tenth possible implementation, the authentication protocol information includes identifiers of at least two third authentication protocols supported by the UE and a selection priority of each of the at least two third authentication protocols;
the first service request further carries an identifier of a specified network slice; and
the selecting, by the network function selection module based on the authentication protocol information, a target authentication module from at least two authentication modules included in a network includes:
selecting, by the network function selection module, a first authentication module that supports at least one of the third authentication protocols from the at least two authentication modules based on the identifiers of the third authentication protocols;
if there is more than one first authentication module, selecting, based on the selection priority of each third authentication protocol, a second authentication module that supports a fourth authentication protocol with a highest priority from all first authentication modules; and
if there is more than one second authentication module, selecting, based on a load status of each second authentication module or information about a network slice served by each second authentication module, an authentication module with least load that serves the specified network slice from the second authentication modules as the target authentication module.

With reference to any one of the fourth aspect and the first possible implementation to the tenth possible implementation of the fourth aspect, in an eleventh possible implementation, the network function selection module includes at least one of an authentication unit AU selection function AUSF, an AU routing function AURF, a slice selection function SSF, and mobility management MM.

According to a fifth aspect, a cyber security management method is provided, where the method may include:
receiving, by a second network function selection module, an authentication module selection request sent by a first network function selection module, where the authentication module selection request carries authentication protocol information sent by user equipment UE;
selecting, by the second network function selection module based on the authentication protocol information, a target authentication module from at least two authentication modules included in a network; and
sending, by the second network function selection module, an identifier of the target authentication module to the first network function selection module, so as to send a service request to the target authentication module by using the first network function selection module.

According to a sixth aspect, a cyber security management method is provided, where the method may include:
receiving, by an authentication module, a network slice security policy delivered by a security policy controller;
receiving, by the authentication module, a service request sent by an access network AN, where the service request carries a security capability of user equipment UE and an identifier of a specified network slice to which the UE is to be attached;
searching, by the authentication module for a specified security policy of the specified network slice based on the identifier of the specified network slice, the network slice security policy delivered by the security policy controller, and determining a security configuration according to the specified security policy; and
sending, by the authentication module, a service request response to the AN, where the service request response carries the security configuration.

With reference to the sixth aspect, in a first possible implementation, the specified security policy includes key information and encryption algorithm information or integrity protection algorithm information;

the service request further carries the security capability of the user equipment UE; and the determining a security configuration according to the specified security policy includes:

determining a key length specified in the specified security policy of the specified network slice, and generating a key corresponding to the key length;

selecting a target encryption algorithm or a target integrity protection algorithm based on the security capability of the UE, a security capability of the AN, and the encryption algorithm information and the integrity protection algorithm information included in the specified security policy; and generating the security configuration based on the key and an identifier of the target encryption algorithm or an identifier of the target integrity protection algorithm, and adding the security configuration to the second service request response.

With reference to the sixth aspect, in a second possible implementation, the specified security policy includes key information; and the determining a security configuration according to the specified security policy includes:

determining a key length specified in the specified security policy of the specified network slice, generating a key corresponding to the key length, generating the security configuration based on the key and the identifier of the specified network slice, and adding the security configuration to the second service request response.

With reference to the sixth aspect, in a third possible implementation, the specified security policy includes encryption algorithm information or integrity protection algorithm information;

the service request further carries the security capability of the user equipment UE; and the determining a security configuration according to the specified security policy includes:

selecting a target encryption algorithm or a target integrity protection algorithm based on the security capability of the UE, a security capability of the AN, and the encryption algorithm information and the integrity protection algorithm information included in the specified security policy; and generating the security configuration based on an identifier of the target encryption algorithm or an identifier of the target integrity protection algorithm, and adding the security configuration to the second service request response.

With reference to any one of the first possible implementation of the sixth aspect to the third possible implementation of the sixth aspect, in a fourth possible implementation, the encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

With reference to any one of the sixth aspect and the first possible implementation to the fourth possible implementation of the sixth aspect, in a fifth possible implementation, the authentication module includes at least one of an authentication unit AU, a front-end, and an access control agent ACA.

According to a seventh aspect, a cyber security management method is provided, where the method may include:

receiving, by an access network AN, a first service request sent by user equipment UE, where the first service request carries a security capability of the UE and an identifier of a specified network slice to which the UE is to be attached;

sending, by the AN, a second service request to an authentication module, where the second service request carries the identifier of the specified network slice to which the UE is to be attached, a security capability of the AN, and the security capability of the UE;

receiving, by the AN, a second service request response sent by the authentication module, where the second service request response carries a first security configuration that is determined by the authentication module based on the identifier of the specified network slice, the security capability of the AN, and the security capability of the UE; and determining, by the AN, a second security configuration based on the first security configuration, and sending a first service request response to the UE, where the first service request response carries the second security configuration.

With reference to the seventh aspect, in a first possible implementation, the first security configuration includes a key and an identifier of an encryption algorithm or an identifier of an integrity protection algorithm; and the determining, by the AN, a second security configuration based on the first security configuration includes:

storing, by the AN, the key, obtaining the identifier of the encryption algorithm and the identifier of the integrity protection algorithm from the first security configuration, and generating the second security configuration based on the identifier of the encryption algorithm and the identifier of the integrity protection algorithm.

According to an eighth aspect, a cyber security management method is provided, where the method may include:

receiving, by an access network AN, a first service request sent by user equipment UE, where the first service request carries a security capability of the UE and an identifier of a specified network slice to which the UE is to be attached;

sending, by the AN, a second service request to an authentication module, where the second service request carries the identifier of the specified network slice to which the UE is to be attached;

receiving, by the AN, a second service request response sent by the authentication module; and determining, by the AN, a second security configuration based on the security capability of the UE and a specified security policy corresponding to the identifier of the specified network slice, and sending a first service request response to the UE, where the first service request response carries the second security configuration.

With reference to the eighth aspect, in a first possible implementation, the determining, by the AN, a second security configuration based on the security capability of the UE and a specified security policy corresponding to the identifier of the specified network slice includes:

determining, by the AN, the specified security policy based on the identifier of the specified network slice; and selecting a target encryption algorithm or a target integrity protection algorithm based on a security capability of the AN, the security capability of the UE, and the specified security policy, and generating the second security configuration based on an identifier of the target encryption algorithm or an identifier of the target integrity protection algorithm.

With reference to the first possible implementation of the eighth aspect, in a second possible implementation, encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

According to a ninth aspect, a cyber security management apparatus is provided, where the apparatus may include:

a receiving unit, configured to receive a first service request sent by user equipment UE, where the first service request carries authentication protocol information;

a selection unit, configured to select, based on the authentication protocol information received by the receiving unit, a target authentication module from at least two authentication modules included in a network; and a sending unit, configured to send a second service request to the target authentication module selected by the selection unit.

With reference to the ninth aspect, in a first possible implementation, the authentication protocol information includes an identifier of a first authentication protocol selected by the UE; and the selection unit is specifically configured to:

select the target authentication module that supports the first authentication protocol from the at least two authentication modules based on the identifier of the first authentication protocol.

With reference to the first possible implementation of the ninth aspect, in a second possible implementation, if more than one authentication module supports the first authentication protocol, the selection unit is specifically configured to:

select, based on a load status of each authentication module that supports the first authentication protocol, an authentication module with least load from the authentication modules as the target authentication module.

With reference to the ninth aspect, in a third possible implementation, the authentication protocol information includes an identifier of a first authentication protocol selected by the UE;

the first service request further carries an identifier of a specified network slice; and the selection unit is specifically configured to:

select the target authentication module that supports the first authentication protocol and the specified network slice from the at least two authentication modules based on the identifier of the first authentication protocol and the identifier of the specified network slice.

With reference to the third possible implementation of the ninth aspect, in a fourth possible implementation, if more than one authentication module supports the first authentication protocol and the specified network slice, the selection unit is specifically configured to:

select, based on a load status of each authentication module that supports the first authentication protocol and the specified network slice, an authentication module with least load from the authentication modules as the target authentication module.

With reference to the ninth aspect, in a fifth possible implementation, the authentication protocol information includes identifiers of at least two second authentication protocols supported by the UE; and the selection unit is specifically configured to:

select, based on the identifiers of the second authentication protocols, a to-be-selected authentication module that supports at least one of the second authentication protocols from the at least two authentication modules as the target authentication module.

With reference to the ninth aspect, in a sixth possible implementation, the authentication protocol information includes identifiers of at least two second authentication protocols supported by the UE;

the first service request further carries an identifier of a specified network slice; and the selection unit is specifically configured to:

select, based on the identifiers of the second authentication protocols, a to-be-selected authentication module that supports at least one of the second authentication protocols and supports the specified network slice from the at least two authentication modules as the target authentication module.

With reference to the ninth aspect, in a seventh possible implementation, the authentication protocol information includes identifiers of at least two second authentication protocols supported by the UE; and the selection unit is specifically configured to:

determine, based on an authentication protocol selection priority that is set in the network, an authentication protocol with a highest selection priority from the second authentication protocols supported by the UE, and select a to-be-selected authentication module that supports the authentication protocol with the highest selection priority from the at least two authentication modules as the target authentication module.

With reference to any one of the fifth possible implementation of the ninth aspect to the seventh possible implementation of the ninth aspect, in an eighth possible implementation, if there is more than one to-be-selected authentication module, the selection unit is specifically configured to:

select, based on a load status of each of the more than one to-be-selected authentication module, an authentication module with least load from the authentication modules as the target authentication module.

With reference to the ninth aspect, in a ninth possible implementation, the authentication protocol information includes identifiers of at least two third authentication protocols supported by the UE and a selection priority of each of the at least two third authentication protocols; and the selection unit is specifically configured to:

select a to-be-selected authentication module that supports at least one of the third authentication protocols from the at least two authentication modules based on the identifiers of the third authentication protocols; and if there is more than one to-be-selected authentication module, select, based on the selection priority of each third authentication protocol, an authentication module that supports a fourth authentication protocol with a highest selection priority from all to-be-selected authentication modules as the target authentication module.

With reference to the ninth aspect, in a tenth possible implementation, the authentication protocol information includes identifiers of at least two third authentication protocols supported by the UE and a selection priority of each of the at least two third authentication protocols;

the first service request further carries an identifier of a specified network slice; and the selection unit is specifically configured to:

select a first authentication module that supports at least one of the third authentication protocols from the at least two authentication modules based on the identifiers of the third authentication protocols;

if there is more than one first authentication module, select, based on the selection priority of each third authentication protocol, a second authentication module that supports a fourth authentication protocol with a highest priority from all first authentication modules; and if there is more than one second authentication module, select, based on a load status of each second authentication module or information about a network slice served by each second authentication module, an authentication module with least load that serves the specified network slice from the second authentication modules as the target authentication module.

With reference to the ninth aspect, in an eleventh possible implementation, the selection unit includes a first subunit and a second subunit, where the first subunit is configured to: receive the first service request sent by the UE, and send an authentication module selection request to the second subunit, where the authentication module selection request carries the authentication protocol information;

the second subunit is configured to: select the target authentication module from the at least two authentication modules based on the authentication protocol information, and send an identifier of the target authentication module to the first subunit; and the first subunit is further configured to send the second service request to the target authentication module corresponding to the identifier of the target authentication module.

With reference to the eleventh possible implementation of the ninth aspect, in a twelfth possible implementation, the second subunit is specifically configured to perform any one of the implementations performed by the selection unit.

With reference to the ninth aspect and the first possible implementation to the tenth possible implementation of the ninth aspect, in a thirteenth possible implementation, the selection unit includes at least one of an authentication unit AU selection function AUSF, an AU routing function AURF, a slice selection function SSF, and mobility management MM.

With reference to the eleventh possible implementation of the ninth aspect or the twelfth possible implementation of the ninth aspect, in a thirteenth possible implementation, the first subunit is an AURF, and the second subunit is an AUSF.

According to a tenth aspect, a cyber security management apparatus is provided, where the apparatus may include:

a receiving unit, configured to receive a network slice security policy delivered by a security policy controller, where the receiving unit is further configured to receive a service request sent by an access network AN, where the service request carries a security capability of user equipment UE and an identifier of a specified network slice to which the UE is to be attached;

an execution unit, configured to: search, for a specified security policy of the specified network slice based on the identifier of the specified network slice that is received by the receiving unit, the network slice security policy delivered by the security policy controller, and determine a security configuration according to the specified security policy; and a sending unit, configured to send a service request response to the AN, where the service request response carries the security configuration determined by the execution unit.

With reference to the tenth aspect, in a first possible implementation, the specified security policy includes key information and encryption algorithm information or integrity protection algorithm information;

the service request further carries the security capability of the user equipment UE; and the execution unit is specifically configured to:

determine a key length specified in the specified security policy of the specified network slice, and generate a key corresponding to the key length;

select a target encryption algorithm or a target integrity protection algorithm based on the security capability of the UE, a security capability of the AN, and the encryption algorithm information or the integrity protection algorithm information included in the specified security policy; and generate the security configuration based on the key and an identifier of the target encryption algorithm or an identifier of the target integrity protection algorithm, and add the security configuration to the second service request response.

With reference to the tenth aspect, in a second possible implementation, the specified security policy includes key information; and the execution unit is specifically configured to:

determine a key length specified in the specified security policy of the specified network slice, generate a key corresponding to the key length, generate the security configuration based on the key and the identifier of the specified network slice, and add the security configuration to the second service request response.

With reference to the tenth aspect, in a third possible implementation, the specified security policy includes encryption algorithm information or integrity protection algorithm information;

the service request further carries the security capability of the user equipment UE; and the execution unit is specifically configured to:

select a target encryption algorithm or a target integrity protection algorithm based on the security capability of the UE, a security capability of the AN, and the encryption algorithm information or the integrity protection algorithm information included in the specified security policy; and generate the security configuration based on an identifier of the encryption algorithm or an identifier of the integrity protection algorithm, and add the security configuration to the second service request response.

With reference to any one of the first possible implementation of the tenth aspect to the third possible implementation of the tenth aspect, in a fourth possible implementation, the encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

With reference to any one of the tenth aspect and the first possible implementation to the fourth possible implementation of the tenth aspect, in a fifth possible implementation, the execution unit includes at least one of an authentication unit AU, a front-end, and an access control agent ACA.

According to an eleventh aspect, a cyber security management apparatus is provided, where the apparatus may include:

a receiving unit, configured to receive a first service request sent by user equipment UE, where the first service request carries a security capability of the UE and an identifier of a specified network slice to which the UE is to be attached;

a sending unit, configured to send a second service request to an authentication module based on the first service request received by the receiving unit, where the second service request carries the identifier of the specified network slice to which the UE is to be attached, a security capability of the AN, and the security capability of the UE, where the receiving unit is further configured to receive a second service request response sent by the authentication module, where the second service request response carries a first security configuration that is determined by the authentication module based on the identifier of the specified network slice, the security capability of the AN, and the security capability of the UE; and a processing unit, configured to determine a second security configuration based on the first security configuration received by the receiving unit, where the sending unit is further configured to send a first service request response to the UE, where the first service request response carries the second security configuration determined by the processing unit.

With reference to the eleventh aspect, in a first possible implementation, the first security configuration includes a key and an identifier of an encryption algorithm or an identifier of an integrity protection algorithm; and the processing unit is specifically configured to:

store the key, obtain the identifier of the encryption algorithm or the identifier of the integrity protection algorithm from the first security configuration, and generate the second security configuration based on the identifier of the encryption algorithm or the identifier of the integrity protection algorithm.

According to a twelfth aspect, a cyber security management apparatus is provided, where the apparatus may include:

a receiving unit, configured to receive a first service request sent by user equipment UE, where the first service request carries a security capability of the UE and an identifier of a specified network slice to which the UE is to be attached;

a sending unit, configured to send a second service request to an authentication module based on the first service request received by the receiving unit, where the second service request carries the identifier of the specified network slice to which the UE is to be attached, where the receiving unit is further configured to receive a second service request response sent by the authentication module; and a processing unit, configured to determine a second security configuration based on the security capability of the UE that is received by the receiving unit and a specified security policy corresponding to the identifier of the specified network slice, where the sending unit is further configured to send a first service request response to the UE, where the first service request response carries the second security configuration determined by the processing unit.

With reference to the twelfth aspect, in a first possible implementation, the processing unit is specifically configured to:

determine the specified security policy based on the identifier of the specified network slice; and select a target encryption algorithm or a target integrity protection algorithm based on a security capability of the AN, the security capability of the UE, and the specified security policy, and generate the second security configuration based on an identifier of the target encryption algorithm or an identifier of the target integrity protection algorithm.

With reference to the first possible implementation of the twelfth aspect, in a second possible implementation, encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

According to a thirteenth aspect, a network function selection module is provided, where the network function selection module may include a memory and a processor, and the memory is connected to the processor, where the memory is configured to store a set of program code; and the processor is configured to invoke the program code stored in the memory, to perform the cyber security management method provided in the fourth aspect.

According to a fourteenth aspect, a network function selection module is provided, where the network function selection module may include a memory and a processor, and the memory is connected to the processor, where the memory is configured to store a set of program code; and the processor is configured to invoke the program code stored in the memory, to perform the cyber security management method provided in the fifth aspect.

According to a fifteenth aspect, an authentication module is provided, where the authentication module may include a memory and a processor, and the memory is connected to the processor, where the memory is configured to store a set of program code; and the processor is configured to invoke the program code stored in the memory, to perform the cyber security management method provided in the sixth aspect.

According to a sixteenth aspect, an access network is provided, where the access network may include a memory and a processor, and the memory is connected to the processor, where the memory is configured to store a set of program code; and the processor is configured to invoke the program code stored in the memory, to perform the cyber security management method provided in the seventh aspect.

According to a seventeenth aspect, a network function selection module is provided, where the network function selection module may include a memory and a processor, and the memory is connected to the processor, where the memory is configured to store a set of program code; and the processor is configured to invoke the program code stored in the memory, to perform the cyber security management method provided in the eighth aspect.

It can be learned from the above that the present invention discloses a cyber security management system, method, and apparatus. The system includes UE, an AN, a network function selection module, and at least two authentication modules. The UE is configured to send a first service request to the network function selection module, where the first service request carries authentication protocol information. The network function selection module is configured to: select a target authentication module based on the authentication protocol information, and send a second service request to the target authentication module. The target authentication module is configured to perform mutual authentication with the UE. The target authentication module is further configured to: determine a first security configuration according to a specified security policy, and send the first security configuration to the AN. The AN is configured to: determine a second security configuration based on the first security configuration or the specified security policy, and send the second security configuration to the UE. According to technical solutions provided in the present invention, differential authentication protocol and security policy security requirements of a network can be met, thereby improving cyber security.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 10A, FIG. 10B, and FIG. 10C are a schematic interaction diagram of performing cyber security management by a management system according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
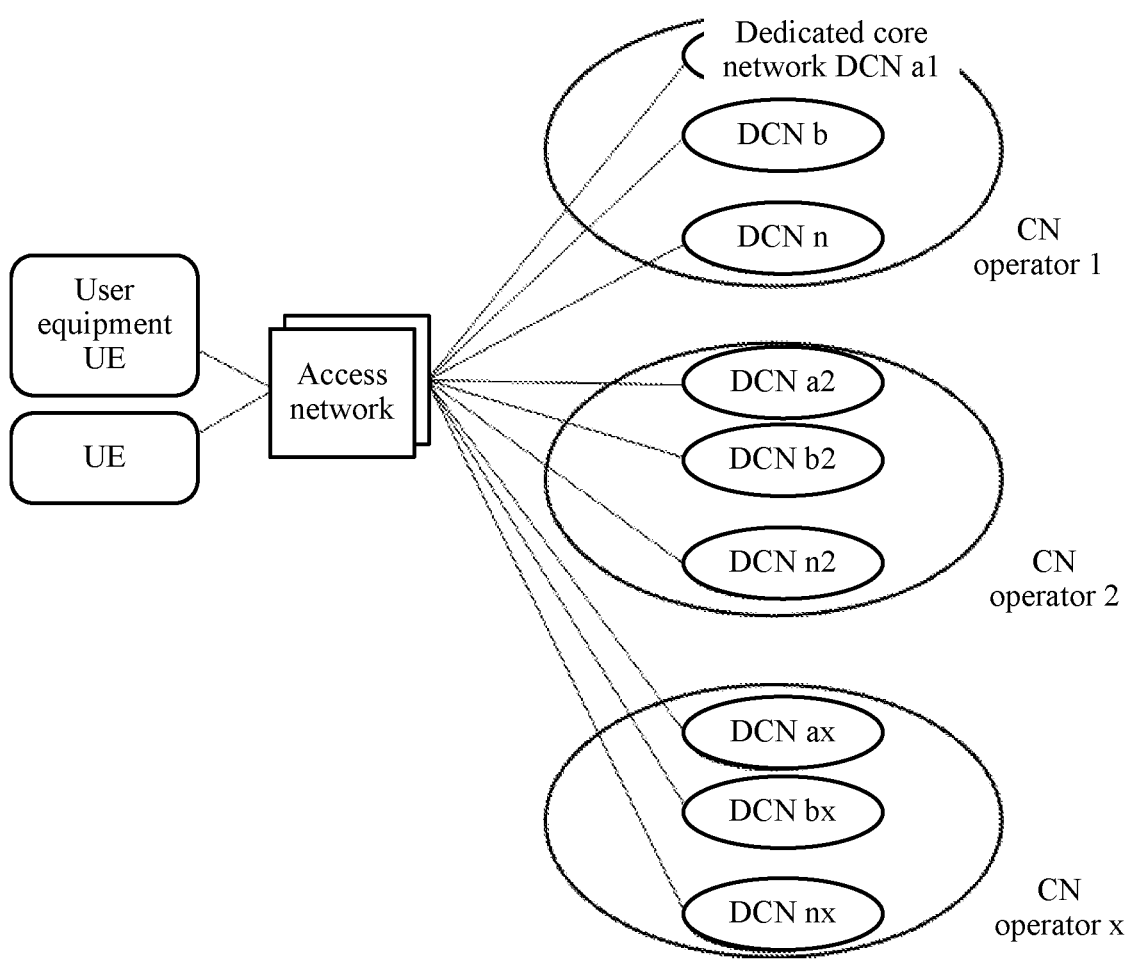
FIG. 1 is a schematic architectural diagram of a 4G dedicated core network.
Figure 2:
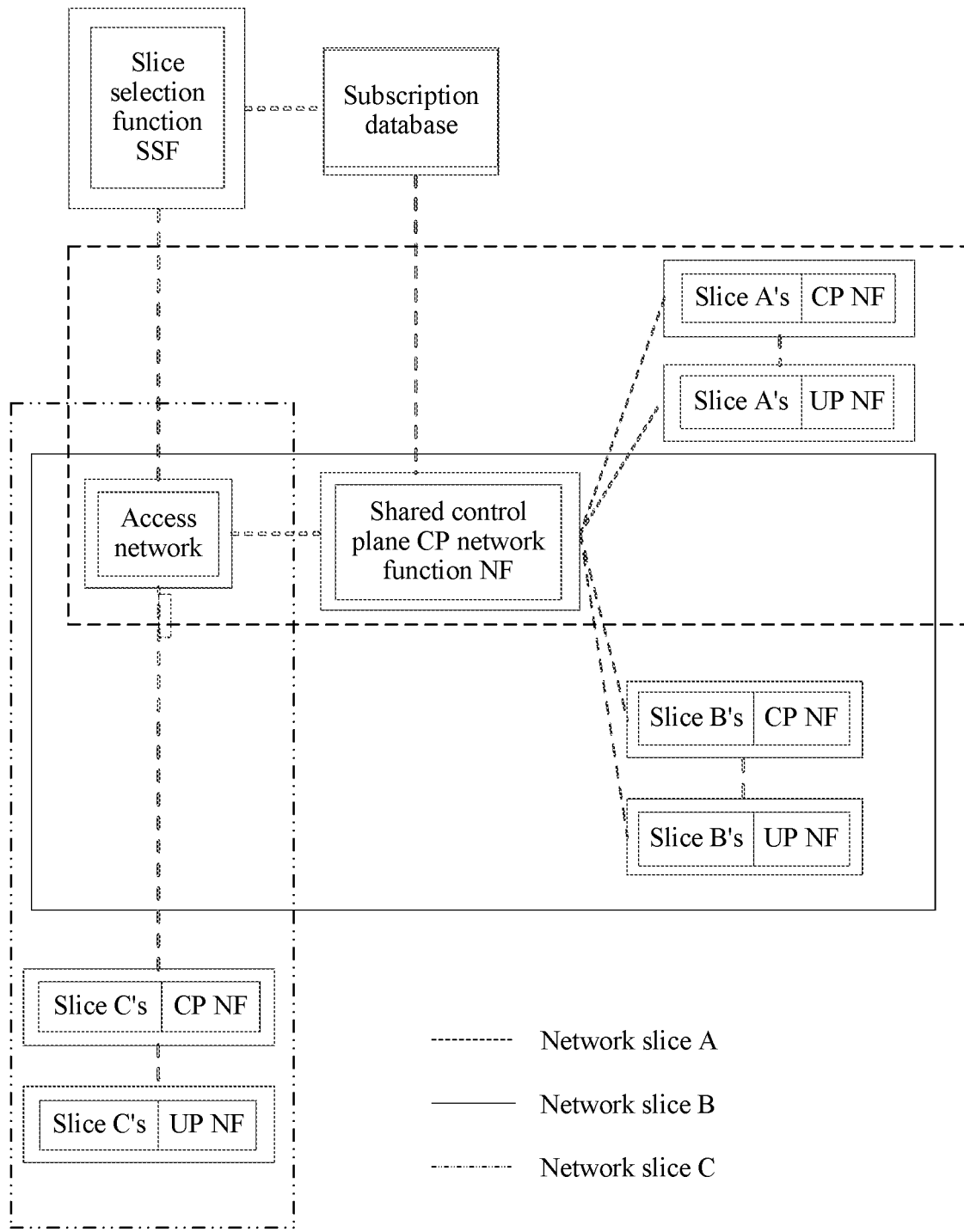
FIG. 2 is a schematic architectural diagram of a 5G network slice according to an embodiment of the present invention.

FIG. 2 is a schematic architectural diagram of a 5G network slice according to an embodiment of the present invention. As shown in FIG. 2, in an architecture of the 5G network slice (slice for short), all slices share an access network ((English: Access Network, AN) or (English: Radio Access Network, RAN), where the following uses the AN as an example for description) and a slice selection function (English: Slice Selection Function, SSF). Some slices share one control plane (English: Control Plane, CP) network function (English: Network Function, NF), and a CP NF is exclusive to some slices. For example, a slice A and a slice B share one CP NF 1, in other words, a CP NF of the slice A and a CP NF of the slice B are a same CP NF. A CP NF 2 is exclusive to a slice C. Each slice further includes a user plane (English: User Plane, UP) NF. Each CP NF includes one AU, an AU included in a CP NF shared by a plurality of slices serves the plurality of slices, and an AU in a CP NF exclusive to one slice serves only the slice. For example, an AU 1 included in the CP NF 1 serves the slice A and the slice B, and an AU 2 included in the CP NF 2 serves the slice C.

In the prior art, when selecting an AU for UE, a network may consider which AU serves a slice to which the UE is to be attached, and then may select the AU to serve the UE. Further, if the slice to which the UE is to be attached is served by a plurality of AUs, one of the AUs may be selected based on a load status of each of the plurality of AUs, to serve the UE. In the prior art, during AU selection, information such as an authentication protocol or an algorithm supported by the UE is not considered, and there is a lack of a related design, causing low accuracy and low selection efficiency of AU selection. Consequently, cyber security cannot be better guaranteed.

In an AU selection solution provided in the embodiments of the present invention, an AU serving UE may be selected according to an authentication protocol supported by the UE, or an AU serving UE may be selected or information such as information about a slice to which the UE is to be attached and a load status of a to-be-selected AU, thereby improving AU selection accuracy. Further, an attach request or a new service request of the UE, a slice security policy, and the like may be executed by using the selected AU, thereby improving cyber security. With reference to FIG. 3 to FIG. 27, the following describes a cyber security management system, method, and apparatus provided in the embodiments of the present invention.

Figure 3:
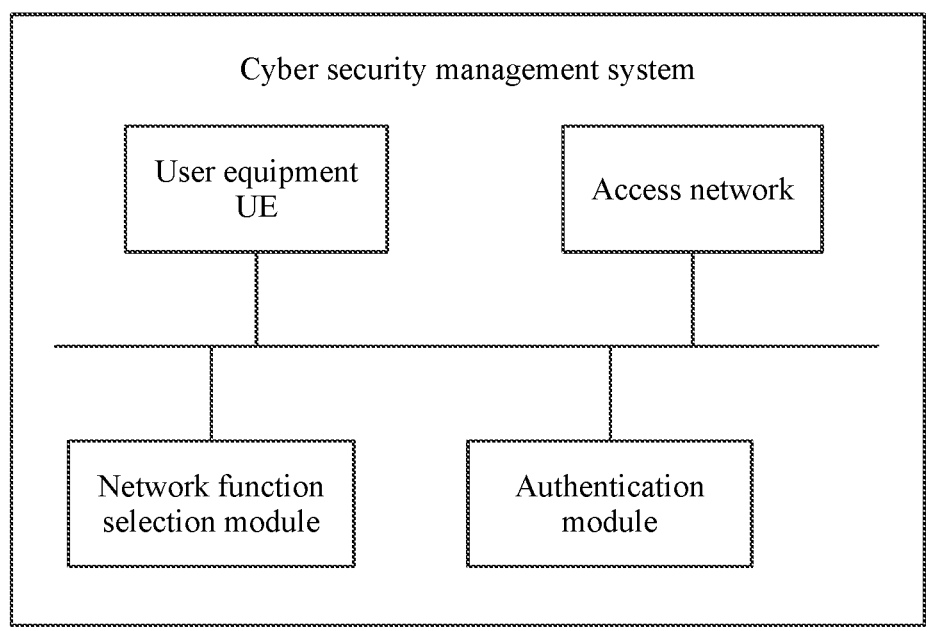
FIG. 3 is a schematic structural diagram of a cyber security management system according to an embodiment of the present invention.

FIG. 3 is a schematic structural diagram of a cyber security management system according to an embodiment of the present invention. The management system provided in this embodiment of the present invention may be configured to implement security management of the network architecture shown in FIG. 2. In other words, the management system provided in this embodiment of the present invention may be configured to implement security management of a network including a plurality of network slices. The management system provided in this embodiment of the present invention may include UE, an AN, a network function selection module, and at least two authentication modules. The at least two authentication modules include an authentication module shared by a plurality of slices, and also include an authentication module exclusive to a single slice. Alternatively, each of the at least two authentication modules is an authentication module shared by a plurality of slices, or may be an authentication module exclusive to a single slice. There may be a plurality of shared authentication modules, and each shared authentication module serves at least two slices. There may also be a plurality of exclusive authentication modules, and each exclusive authentication module serves one slice. During specific implementation, a quantity of authentication modules and a distribution status of slices served by the authentication modules may be determined based on an actual application scenario, and this is not limited herein.

In this embodiment of the present invention, the network function selection module may include an AU selection function (English: AU Selection Function, AUSF), an AU routing function (English: AU Routing Function, AURF), an SSF, mobility management (English: Mobility Management, MM), and the like. Details may be determined based on an actual application scenario, and are not limited herein.

In this embodiment of the present invention, the authentication module may include an AU, a front-end, an access control agent (English: Access Control Agent, ACA), and the like. Details may be determined based on an actual application scenario, and are not limited herein.

Figure 4:
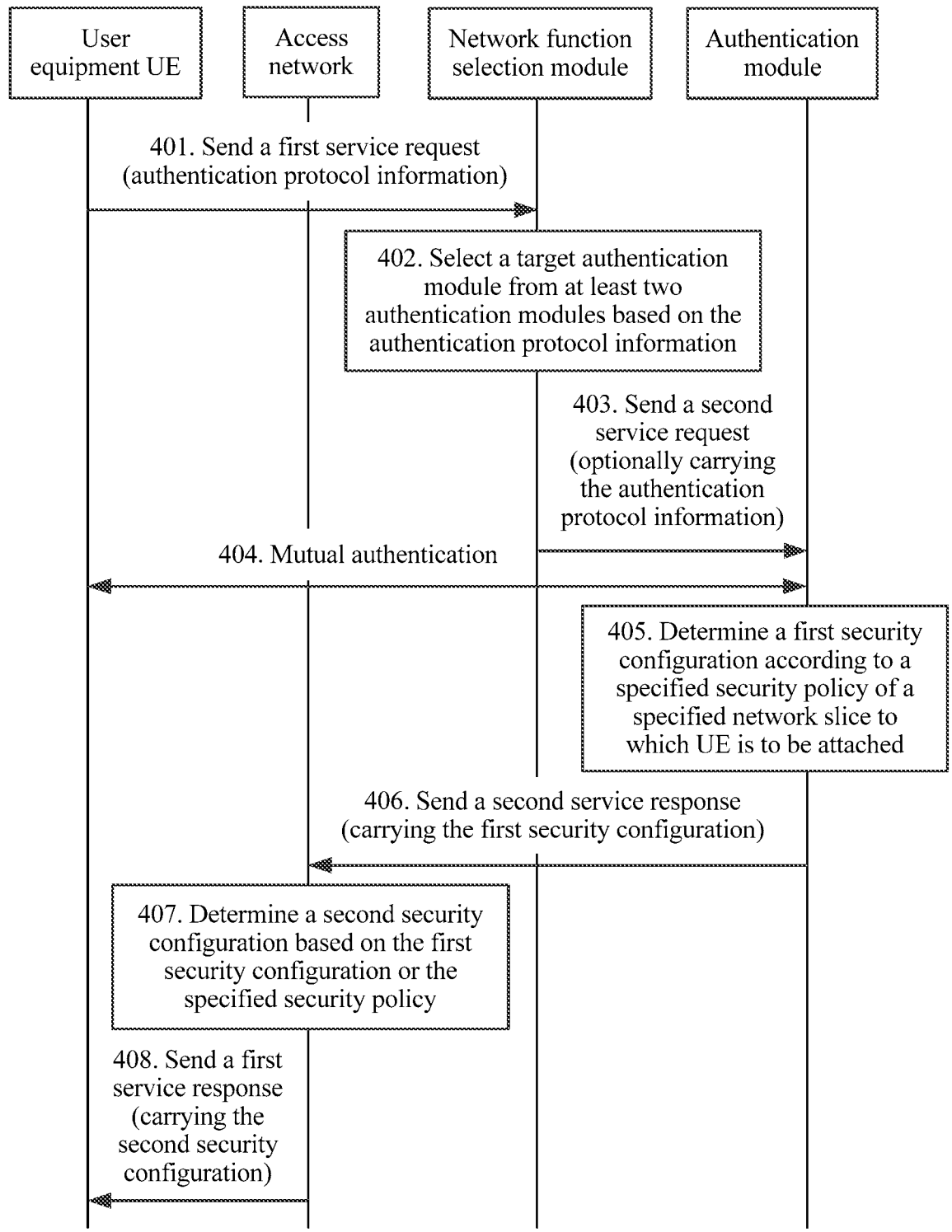
FIG. 4 is a schematic interaction diagram of implementing cyber security management by function modules in a management system according to an embodiment of the present invention.

FIG. 4 is a schematic interaction diagram of implementing cyber security management by function modules (including UE, an AN, a network function selection module, and an authentication module) in a management system according to an embodiment of the present invention. A process in which the system shown in FIG. 3 implements cyber security management may include the following steps.

401. The UE sends a first service request to the network function selection module.

In some feasible implementations, the first service request may be specifically an attach request that the UE requests to be attached to a slice. Alternatively, the first service request may be a new service request that is sent by the UE when the UE has been attached to a slice and expects to be attached to another slice by using the new service request. The attach request or the new service request carries authentication protocol information. The authentication protocol information includes information such as an identifier of one or more authentication protocols supported by the UE, or a selection priority of each of a plurality of authentication protocols supported by the UE. The attach request or the new service request may also carry an identifier of a slice to which the UE is to be attached, and the like. Details may be determined based on an actual application scenario, and are not limited herein. A type of the first service request and the authentication protocol information carried in the first service request may be specifically determined based on an actual application scenario, and are not limited herein.

402. The network function selection module selects a target authentication module from at least two authentication modules based on authentication protocol information.

403. The network function selection module sends a second service request to the target authentication module.

In some feasible implementations, after receiving the first service request sent by the UE, the network function selection module may select the target authentication module from the at least two authentication modules based on the authentication protocol information carried in the first service request. During specific implementation, if the authentication protocol information carries an identifier of one authentication protocol (for example, a first authentication protocol) supported by the UE, the network function selection module may select, based on the identifier of the first authentication protocol, an authentication module that supports the first authentication protocol from the plurality of authentication modules as the target authentication module. If more than one authentication module supports the first authentication protocol, the network function selection module may select, based on a load status of each authentication module, an authentication module with least load from the authentication modules as the target authentication module.

Further, if the first service request carries an identifier of a slice (namely, a specified network slice) to which the UE is to be attached, the network function selection module may select, based on the identifier of the first authentication protocol and the identifier of the specified network slice, the target authentication module from the at least two authentication modules included in a network. The target authentication module is an authentication module that supports the first authentication protocol and the specified network slice. Specifically, the network function selection module may first select an authentication module that supports the first authentication protocol from the plurality of authentication modules based on the identifier of the first authentication protocol. If more than one authentication module supports the first authentication protocol, the network function selection module may select, based on the identifier of the specified network slice, an authentication module associated with the slice to which the UE is to be attached from the plurality of authentication modules that support the first authentication protocol as the target authentication module. The authentication module associated with the slice to which the UE is to be attached may be an authentication module that serves the slice. In addition, alternatively, the network function selection module may first select an authentication module that supports the specified network slice from the plurality of authentication modules based on the identifier of the specified network slice. If more than one authentication module supports the specified network slice, the network function selection module may select, according to the first authentication protocol, an authentication module that supports the first authentication protocol from the plurality of authentication modules that support the specified network slice as the target authentication module. Further, alternatively, the network function selection module may select the target authentication module from the plurality of authentication modules simultaneously based on the identifier of the first authentication protocol and the identifier of the specified network slice. An authentication module screening manner in a specific selection process may be determined based on an actual application scenario, and is not limited herein.

Further, in some feasible implementations, if more than one target authentication module is selected based on the identifier of the first authentication protocol or based on the identifier of the first authentication protocol and the identifier of the specified network slice, the network function selection module may select, as a finally selected target authentication module based on a load status of each selected to-be-determined target authentication module, an authentication module with least load from the plurality of selected to-be-determined target authentication modules.

In some feasible implementations, if the authentication protocol information carries identifiers of a plurality of authentication protocols (each authentication protocol is, for example, a second authentication protocol) supported by the UE, the network function selection module may select, based on the identifiers of the second authentication protocols supported by the UE, the target authentication module from the plurality of authentication modules included in a network. During specific implementation, if only one of the plurality of authentication modules included in the system supports the authentication protocol supported by the UE, the authentication module may be determined as the target authentication module. If the plurality of authentication modules included in the network include a plurality of authentication modules that support one of the authentication protocols supported by the UE, an authentication module with least load may be selected as the target authentication module from the plurality of authentication modules that support the authentication protocol. If the plurality of authentication modules included in the network include a plurality of different authentication modules that support different authentication protocols, the network function selection module selects the target authentication module from the plurality of different authentication modules based on a selection priority of each authentication protocol or a load status of each authentication module.

In some feasible implementations, if the plurality of authentication modules included in the network include a plurality of different authentication modules that support different authentication protocols, the network function selection module may determine, based on an authentication protocol selection priority that is set in the network, an authentication protocol with a highest selection priority from the plurality of authentication protocols supported by the UE, and then may select a to-be-selected authentication module that supports the authentication protocol with the highest selection priority from the plurality of different authentication modules that support different authentication protocols as the target authentication module. If more than one to-be-selected authentication module supports the authentication protocol with the highest selection priority, an authentication module with least load may be selected, based on a load status of each to-be-selected authentication module, from the authentication modules as the target authentication module.

In some feasible implementations, if the plurality of authentication modules included in the network include a plurality of different authentication modules that support different authentication protocols, the network function selection module may directly select, based on a load status of each authentication module, an authentication module with least load from the authentication modules as the target authentication module.

Further, in some feasible implementations, the authentication protocol information carried in the first service request may include identifiers of a plurality of authentication protocols (each authentication protocol may be, for example, a third authentication protocol) supported by the UE and a selection priority of each third authentication protocol. The network function selection module may select, based on the identifiers of the third authentication protocols supported by the UE, the target authentication module from the plurality of authentication modules included in the system. During specific implementation, if only one of the plurality of authentication modules included in the system supports the authentication protocol supported by the UE, the authentication module may be determined as the target authentication module. If the plurality of authentication modules included in the system include a plurality of authentication modules that support one of the third authentication protocols supported by the UE, an authentication module with least load may be selected as the target authentication module from the plurality of authentication modules that support the third authentication protocol. If the plurality of authentication modules included in the system include a plurality of different authentication modules that support different third authentication protocols, the network function selection module may select, based on a load status of each authentication module, an authentication module with least load from the authentication modules as the target authentication module.

Further, if the plurality of authentication modules included in the system include a plurality of different authentication modules that support different third authentication protocols, the network function selection module may further select, based on a selection priority of each third authentication protocol, an authentication module that supports an authentication protocol with a highest selection priority (for example, a fourth authentication protocol) from the plurality of different authentication modules that support different third authentication protocols as the target authentication module. If more than one authentication module supports the fourth authentication protocol, the network function selection module may select, based on a load status of each authentication module, an authentication module with least load from the authentication modules as the target authentication module.

Further, in some feasible implementations, the first service request may carry more slice information in addition to the identifier of the slice to which the UE is to be attached, and the slice information may specifically include a slice type, a service type supported by the slice, a slice tenant identifier, or the like. In the process of selecting the target authentication module based on the authentication protocol information, the network function selection module may also perform comprehensive selection with reference to the slice information, and this is not limited herein.

In some feasible implementations, after selecting the target authentication module, the network function selection module may send the second service request to the target authentication module. Correspondingly, the second service request may also be an attach request or a new service request. During specific implementation, if the target authentication module supports only one authentication protocol, the second service request sent to the target authentication module does not need to carry the authentication protocol information, and may carry an identifier of the UE, information about the slice to which the UE is to be attached, or the like. If the target authentication module may support a plurality of authentication protocols, the second service request may carry an identifier that is of an authentication protocol supported by both the UE and the target authentication module and that is used during selection of the target authentication module. Optionally, the second service request may carry an identifier of the UE, information about the slice to which the UE is to be attached, or the like, and this is not limited herein.

404. The target authentication module receives the second service request, and performs mutual authentication with the UE.

In some feasible implementations, if the target authentication module supports only one authentication protocol, the target authentication module may directly perform mutual authentication with the UE by using the authentication protocol. If the target authentication module may support a plurality of authentication protocols, the target authentication module may receive the second service request sent by the network function selection module, and perform mutual authentication with the UE according to an authentication protocol that is supported by both the UE and the target authentication module and that is carried in the second service request. During specific implementation, the second service request may further carry the identifier of the UE, for example, an identity (ID) of the UE, and this is not limited herein. For an implementation in which the authentication module implements mutual authentication with the UE by using the ID of the UE or the slice information, refer to an existing implementation of system interaction in a 5G framework, and details are not described herein.

In this embodiment of the present invention, the network function selection module may select, based on the information about the authentication protocol supported by the UE, an authentication module that supports the authentication protocol supported by the UE, and then the authentication module may perform mutual authentication with the UE, thereby improving authentication module selection accuracy and cyber security.

Figure 5:
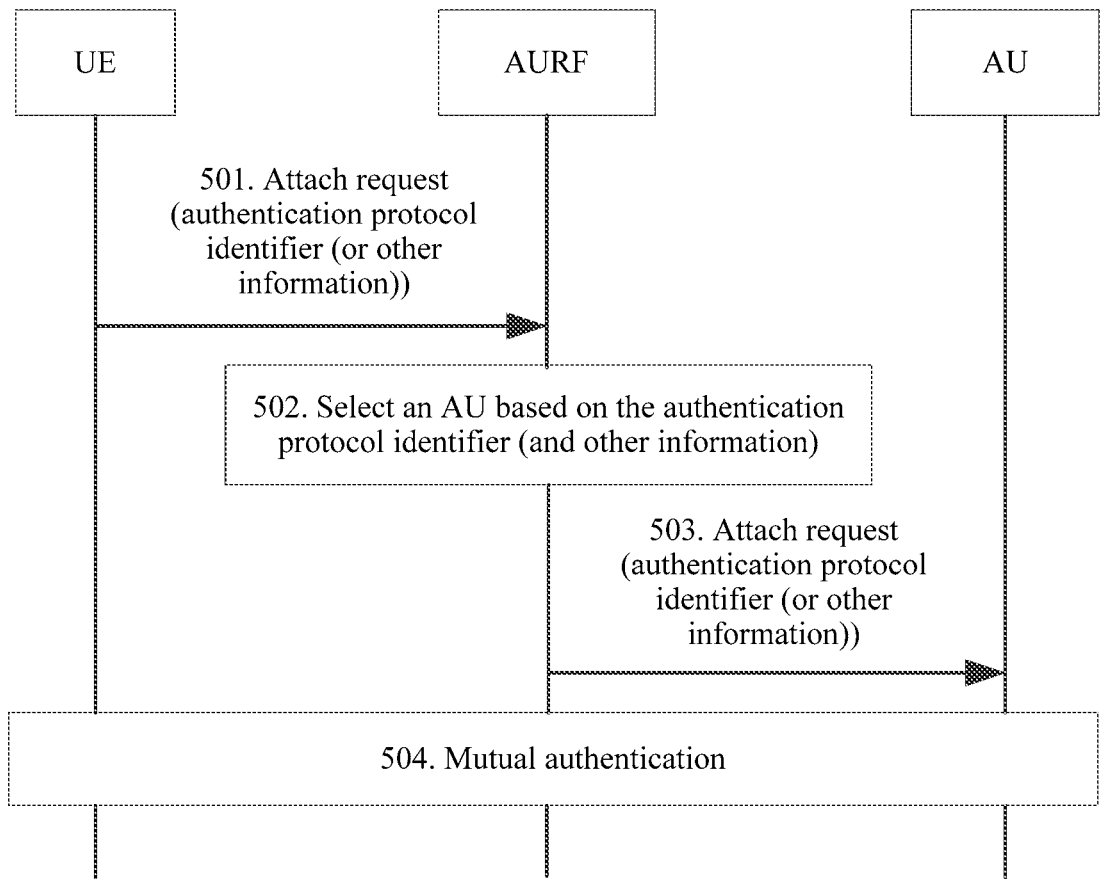
FIG. 5 is a schematic interaction diagram of implementing AU selection by a management system according to an embodiment of the present invention.
Figure 6:
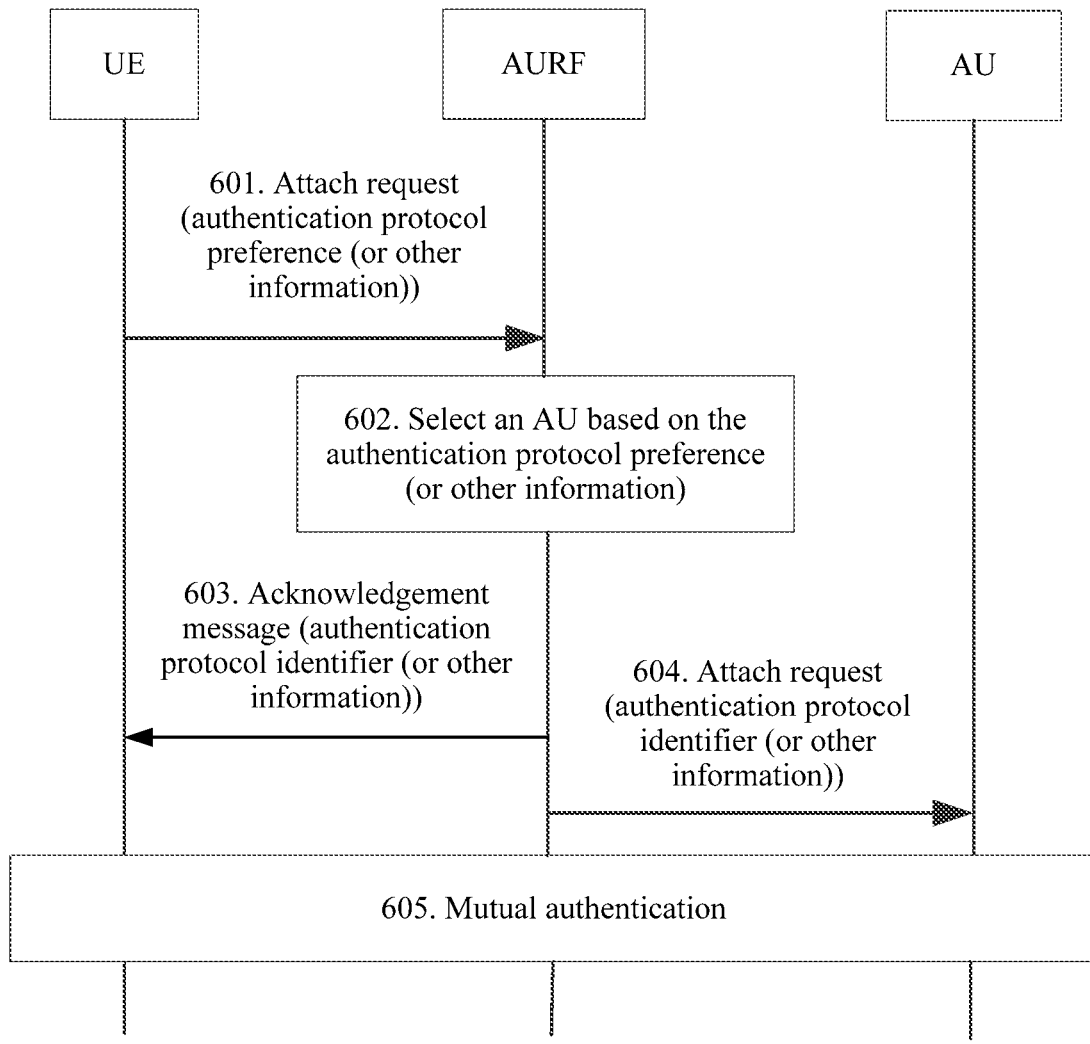
FIG. 6 is another schematic interaction diagram of implementing AU selection by a management system according to an embodiment of the present invention.
Figure 7:
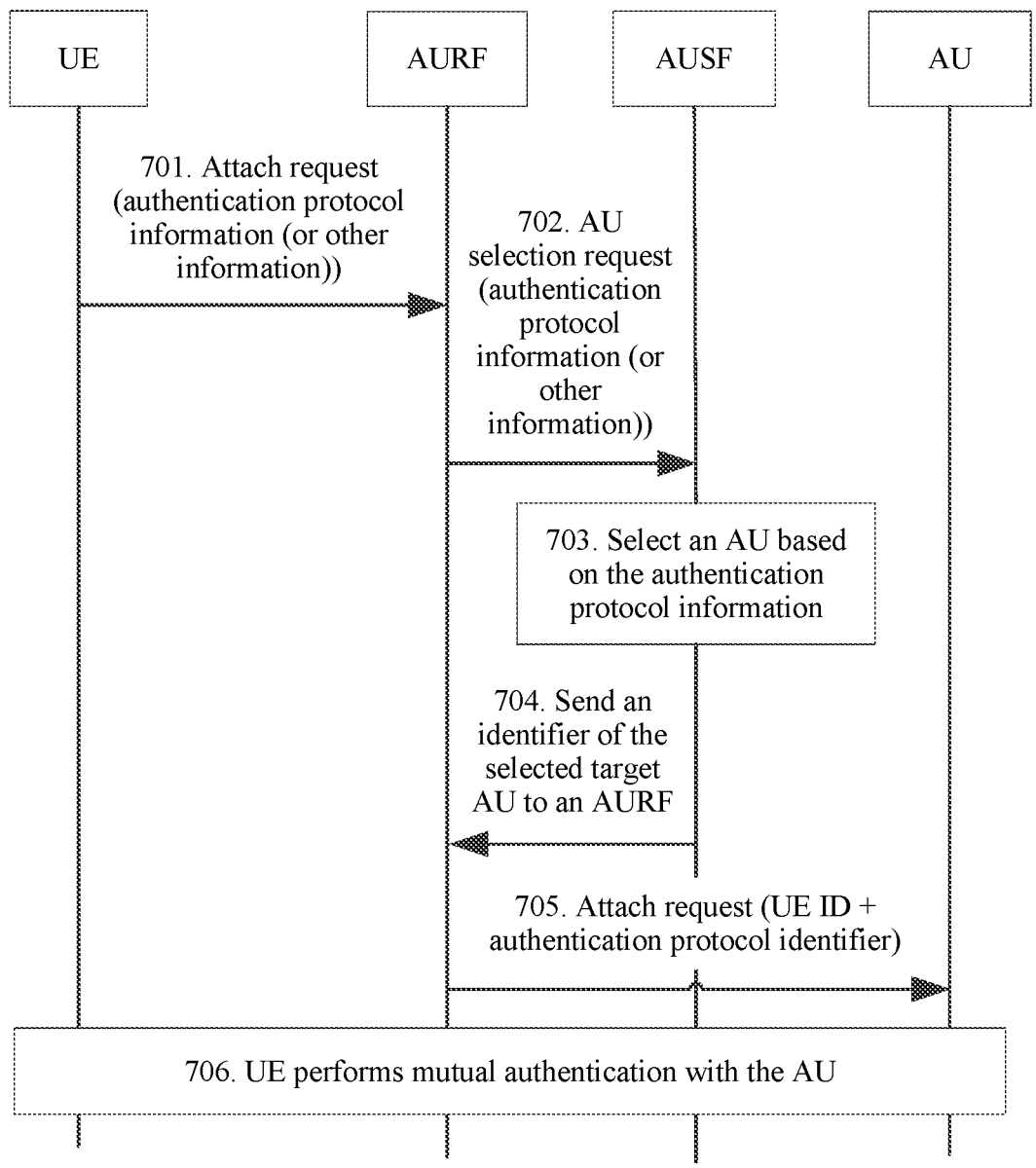
FIG. 7 is another schematic interaction diagram of implementing AU selection by a management system according to an embodiment of the present invention.

With reference to FIG. 5 to FIG. 7, the following describes implementations in which the management system provided in this embodiment of the present invention implements authentication module selection in different application scenarios.

In some feasible implementations, FIG. 5 is a schematic interaction diagram of implementing AU selection by a management system according to an embodiment of the present invention. In FIG. 5, an AURF is used as an example of a network function selection module for description, an AU is used as an example of an authentication module for description, and an attach request is used as an example of a first service request for description. An AU selection process provided in the management system shown in FIG. 5 includes the following steps.

501. UE sends an attach request to the AURF.

In some feasible implementations, the UE supports only one authentication protocol, and the attach request sent by the UE to the AURF may carry an identifier of the authentication protocol supported by the UE. The attach request may further carry an ID of the UE, slice information, and the like. The slice information may include a slice type, a service type supported by a slice, a slice tenant identifier, or the like, and this is not limited herein.

502. The AURF selects a target AU based on information such as an authentication protocol identifier carried in the attach request.

In some feasible implementations, after receiving the attach request sent by the UE, the AURF may select the target AU based on the authentication protocol identifier carried in the attach request, or may select the target AU with reference to the slice information carried in the attach request or a load status of each of to-be-selected AUs in the system. For a specific selection manner, refer to the implementation described in step S402, and details are not described herein again.

503. The AURF sends an attach request to the target AU.

In some feasible implementations, after determining the target AU, the AURF may send the attach request to the target AU. Optionally, if the target AU may support a plurality of authentication protocols, the AURF may add an identifier of an authentication protocol supported by the UE to the attach request, so that the target AU can perform mutual authentication with the UE. The attach request may further carry the ID of the UE, the slice information, and the like. For details, refer to the implementation described in step S402, and this is not limited herein.

504. The AU performs mutual authentication with the UE.

In some feasible implementations, after receiving the attach request sent by the AURF, the AU may perform mutual authentication with the UE. If the AU supports a plurality of authentication protocols, the AU may determine, according to the attach request, the authentication protocol supported by the UE, and perform mutual authentication with the UE by using the authentication protocol. For a specific implementation in which the AU performs mutual authentication with the UE by using the authentication protocol, refer to an implementation provided in an existing 5G network system, and details are not described herein.

In this embodiment of the present invention, the AURF may select the target AU according to the authentication protocol supported by the UE, thereby improving AU selection accuracy, AU selection efficiency, and cyber security.

In some feasible implementations, FIG. 6 is another schematic interaction diagram of implementing AU selection by a management system according to an embodiment of the present invention. In FIG. 6, an AURF is used as an example of a network function selection module for description, an AU is used as an example of an authentication module for description, and an attach request is used as an example of a first service request for description. An AU selection process provided in the management system shown in FIG. 6 includes the following steps.

601. UE sends an attach request to the AURF.

In some feasible implementations, the attach request sent by the UE to the AURF may carry a preference for authentication protocols to be used by the UE. The preference for authentication protocols includes identifiers of a plurality of authentication protocols supported by the UE, and indication information of selection priorities of the authentication protocols preferred by the UE. The indication information of the selection priorities of the authentication protocols preferred by the UE may be specifically a selection priority of each of the plurality of authentication protocols supported by the UE. The attach request may further carry an ID of the UE, slice information, and the like. This is not limited herein.

602. The AURF selects a target AU based on information such as a preference for authentication protocols carried in the attach request.

In some feasible implementations, after receiving the attach request sent by the UE, the AURF may select the target AU based on information, such as an authentication protocol identifier or a selection priority, carried in the attach request. Further, the AURF may select the target AU based on the slice information carried in the attach request and a load status of each of to-be-selected AUs in a network. For a specific selection manner, refer to the implementation described in step S402, and details are not described herein again.

Further, in some feasible implementations, if the attach request carries identifiers of a plurality of authentication protocols, the AURF may select the target AU from to-be-selected AUs based on a selection priority that is of each authentication protocol and that is set in the network and with reference to authentication protocols supported by the plurality of AUs. For a specific selection manner, refer to the implementation described in step S402, and details are not described herein again.

603. The AURF sends an AU selection acknowledgement message to the UE.

In some feasible implementations, if the UE supports a plurality of authentication protocols, after the AURF selects the target AU based on information such as the authentication protocol supported by the UE, an authentication protocol supported by each AU, a load status of each AU, and the slice information, the AURF may send an identifier of an authentication protocol supported by the selected target AU to the UE by using the acknowledgement message. After receiving the acknowledgement message, the UE may determine, based on the authentication protocol identifier carried in the acknowledgement message, an authentication protocol used when the AURF selects the target AU, namely, an authentication protocol supported by both the UE and the AU.

It should be noted that, during specific implementation, an operation manner of the acknowledgement message sent by the AURF to the UE is an optional implementation, and may be specifically determined based on an actual application scenario. Specifically, alternatively, to learn the authentication protocol used when the AURF selects the target AU, the UE may determine the authentication protocol by using indication information carried in a first message sent by the AU when the AU performs authentication with the UE. A specific form of the indication information may be determined based on an actual application scenario. This is not limited herein.

604. The AURF sends an attach request to the target AU.

In some feasible implementations, after determining the target AU, the AURF may add an authentication protocol identifier to the attach request, and send the attach request to the target AU, so that the target AU performs mutual authentication with the UE. The authentication protocol identifier carried in the attach request is an identifier that is of one of the plurality of authentication protocols supported by the UE and that is used when the AURF selects the target AU, and is used to instruct the AU to perform mutual authentication with the UE by using the authentication protocol. The attach request may further carry the ID of the UE, the slice information, and the like. This is not limited herein.

605. The AU performs mutual authentication with the UE.

In some feasible implementations, after receiving the attach request sent by the AURF, the AU may perform mutual authentication with the UE. If the AU supports a plurality of authentication protocols, the AU may determine, according to the attach request, the authentication protocol supported by the UE, and perform mutual authentication with the UE by using the authentication protocol. For a specific implementation in which the AU performs mutual authentication with the UE by using the authentication protocol, refer to an implementation provided in an existing 5G network system, and details are not described herein.

In this embodiment of the present invention, the AURF may select the target AU based on the plurality of authentication protocols supported by the UE, the selection priority of each of the authentication protocols, the authentication protocol selection priority that is set in the network, the slice information, AU load status, and the like, thereby improving AU selection flexibility, AU selection accuracy, AU selection efficiency, and cyber security.

In some feasible implementations, FIG. 7 is another schematic interaction diagram of implementing AU selection by a management system according to an embodiment of the present invention. In FIG. 7, a network function selection module may include a first submodule and a second submodule. An AURF is used as an example of the first submodule for description, an AUSF is used as an example of the second submodule for description, an AU is used as an example of an authentication module for description, and an attach request is used as an example of a first service request for description. An AU selection process provided in the management system shown in FIG. 7 includes the following steps.

701. UE sends an attach request to the AURF.

In some feasible implementations, the attach request sent by the UE to the AURF may carry authentication protocol information. The authentication protocol information may include an identifier of a single authentication protocol supported by the UE, or may include identifiers of a plurality of authentication protocols supported by the UE, and information such as indication information of selection priorities of the authentication protocols supported by the UE. The indication information of the selection priorities of the authentication protocols supported by the UE may be specifically a selection priority of each of the plurality of authentication protocols supported by the UE. The attach request may further carry an ID of the UE, slice information, and the like. This is not limited herein. For details, refer to the implementation described in step S401, and details are not described herein again.

702. After receiving the attach request sent by the UE, the AURF requests the AUSF to select an AU.

In some feasible implementations, after receiving the attach request sent by the UE, the AURF may send an AU selection request to the AUSF associated with the AURF. In a 5G network, one AUSF may serve a plurality of AURFs, and the AUSF is used for selecting an AU. When AUs are increased or decreased by one in the network, the network only needs to notify the AUSF of an AU increase or decrease message. If the AURF manages an AU, the network needs to notify each AURF of an AU increase or decrease message. Because one AUSF may manage a plurality of AURFs, notifying each AUSF of the AU increase or decrease message occupies less signaling than directly notifying each AURF of the AU increase or decrease message, and therefore processing efficiency of the network is higher.

703. The AUSF selects a target AU based on authentication protocol information.

In some feasible implementations, after receiving the AU selection request sent by the AURF, the AUSF may select the target AU based on an authentication protocol identifier, a selection priority, the slice information, and the like carried in the AU selection request. Further, the AURF may select the target AU based on a load status of each of to-be-selected AUs in the network. For a specific implementation of selecting an AU by the AUSF, refer to the implementation of selecting an AU by the network function selection module described in step S402, and details are not described herein again. In a system structure shown in FIG. 7, an AU may be selected by the AUSF, and the AURF may be configured to send an attach message.

704. The AUSF sends an identifier of the selected target AU to the AURF.

In some feasible implementations, after selecting the target AU, the AUSF may send the identifier of the selected target AU to the AURF, so as to send an attach message of the UE to the target AU by using the AURF.

705. The AURF sends an attach request to the target AU.

In some feasible implementations, after determining the target AU based on the identifier of the target AU that is sent by the AUSF, the AURF may add an authentication protocol identifier to the attach request, and send the attach request to the target AU, so that the target AU performs mutual authentication with the UE. The authentication protocol identifier carried in the attach request is an identifier that is of one of the plurality of authentication protocols supported by the UE and that is used when the AUSF selects the target AU, and is used to instruct the AU to perform mutual authentication with the UE by using the authentication protocol. The attach request may further carry the ID of the UE, the slice information, and the like. This is not limited herein.

706. The AU performs mutual authentication with the UE.

In some feasible implementations, after receiving the attach request sent by the AURF, the AU may perform mutual authentication with the UE. If the AU supports a plurality of authentication protocols, the AU may determine, according to the attach request, the authentication protocol supported by the UE, and perform mutual authentication with the UE by using the authentication protocol. For a specific implementation in which the AU performs mutual authentication with the UE by using the authentication protocol, refer to an implementation provided in an existing 5G network system, and details are not described herein.

In this embodiment of the present invention, the AURF may request the AUSF to select the target AU based on the plurality of authentication protocols supported by the UE, the selection priority of each of the authentication protocols, an authentication protocol selection priority that is set in the network, the slice information, AU load, and the like, thereby improving AU selection flexibility, reducing signaling overheads of the network, and improving AU selection accuracy, execution efficiency of the network, and cyber security.

405. The target authentication module determines a first security configuration according to a specified security policy of a specified network slice to which the UE is to be attached.

406. The target authentication module sends a second service request response to the AN.

407. The AN determines a second security configuration based on the first security configuration or the specified security policy.

408. The AN sends a first service request response to the UE.

In some feasible implementations, the management system provided in this embodiment of the present invention may further include a security policy controller.

The security policy controller is configured to deliver a security policy of each network slice included in the system to the authentication module or the AN. During specific implementation, in the management system provided in this embodiment of the present invention, the security policy of the slice to which the UE is to be attached may be executed by the target authentication module, or the security policy of the slice to which the UE is to be attached may be jointly executed by the target authentication module and the AN. During specific implementation, a network slice security policy may specify a length of a key to signaling between the UE and the AN, and may further specify information such as an encryption algorithm selection priority, an integrity protection algorithm selection priority, and a use range of the key. The use range of the key may include use duration of the key, a quantity of data packets that can be encrypted by using the key, or the like.

In some feasible implementations, if the security policy of the slice to which the UE is to be attached is executed by the target authentication module, the security policy controller may send a security policy of one or more network slices in the system to the target authentication module. The one or more network slices may be one or more of network slices served by the target authentication module, and may be specifically determined based on an actual application scenario. This is not limited herein. The target authentication module may determine, by using a security capability of the UE that is carried in the second service request sent by the network function selection module, information such as an encryption algorithm and an integrity protection algorithm supported by the UE. Alternatively, the target authentication module may obtain, by using the network, a security capability of the UE, to be specific, information such as an encryption algorithm and an integrity protection algorithm supported by the UE. The target authentication module may further obtain a security capability of the AN, to be specific, an encryption algorithm, an integrity protection algorithm, and the like supported by the AN. The security capability of the AN may be sent by the AN to the target authentication module. For example, the AN may add the security capability of the AN to the second service request and send the second service request to the target authentication module. During specific implementation, the target authentication module may generate a key according to the security policy (namely, the specified security policy) of the specified network slice to which the UE is to be attached, and may further select an encryption algorithm and an integrity protection algorithm based on the security capability of the UE, the security capability of the AN, and the specified security policy. The key may include at least two keys, for example, a first key and a second key. The first key may be a key used to protect signaling between the UE and the AN, and the second key may be a key used to protect signaling between the UE and the AU. A length of the first key and a length of the second key are consistent with a key length specified in the specified security policy. The encryption algorithm may be an encryption algorithm with a highest selection priority in an encryption algorithm supported by both the UE and the AN, and the integrity protection algorithm may be an integrity protection algorithm with a highest selection priority in an integrity protection algorithm supported by both the UE and the AN.

In some feasible implementations, after generating the first key and the second key and selecting the target encryption algorithm and the target integrity protection algorithm, the target authentication module may generate the first security configuration based on the first key, an identifier of the target encryption algorithm, and an identifier of the target integrity protection algorithm, and add the first security configuration to the second service request response, so as to send the first security configuration information to the AN by using the second service request response. The first security configuration information may include information such as a use range of the first key, the identifier of the target encryption algorithm, and the identifier of the target integrity protection algorithm.

In some feasible implementations, after receiving the second service request response sent by the target authentication module, the AN may determine information such as the key and the identifier of the encryption algorithm or the identifier of the integrity protection algorithm based on the first configuration information carried in the second service request response. If the first security configuration carries information such as the first key, the identifier of the encryption algorithm, and the identifier of the integrity protection algorithm, the AN does not need to execute the security policy, and may directly store the key, determine, as the second security configuration, the identifier of the encryption algorithm and the identifier of the integrity protection algorithm that are carried in the first security configuration, add the second security configuration to the first service request response, and then send the first service request response to the UE to notify the UE of the second security configuration.

In some feasible implementations, if the security policy of the slice to which the UE is to be attached is jointly executed by the target authentication module and the AN, the security policy controller may send a security policy of one or more network slices supported by the target authentication module to the target authentication module, and the security policy controller may further send a security policy of each network slice in the system to the AN. The target authentication module may determine, by using a security capability of the UE that is carried in the second service request sent by the network function selection module, information such as an encryption algorithm and an integrity protection algorithm supported by the UE, and may further send the security capability of the UE to the AN. Alternatively, the target authentication module and the AN may obtain, by using the network, a security capability of the UE, to be specific, information such as an encryption algorithm and an integrity protection algorithm supported by the UE. During specific implementation, the target authentication module may generate at least two keys, for example, the first key and the second key according to the specified security policy. Further, the target authentication module may generate the first security configuration based on information such as a use range of the first key and the identifier of the specified network slice, and add the first configuration to the second service request response.

In some feasible implementations, after receiving the second service request response sent by the target authentication module, the AN may determine information such as the key and the identifier of the encryption algorithm or the identifier of the integrity protection algorithm based on the first configuration information carried in the second service request response. If the first security configuration carries only information about the first key, the AN needs to execute the security policy. Specifically, the AN may determine, based on the identifier of the specified network slice, the specified security policy corresponding to the identifier of the specified network slice, and then select a target encryption algorithm and a target integrity protection algorithm based on the security capability of the UE and the specified security policy. Further, the AN may add an identifier of the target encryption algorithm and an identifier of the target integrity protection algorithm to the first security configuration, to obtain the second security configuration, add the second security configuration to the first service request response, and send the first service request response to the UE to notify the UE of the second security configuration.

In this embodiment of the present invention, the target authentication module selected according to the authentication protocol may generate a security configuration, or the target authentication module selected according to the authentication protocol and the AN may generate a security configuration, so that selection flexibility is high and cyber security is improved.

Figure 8:
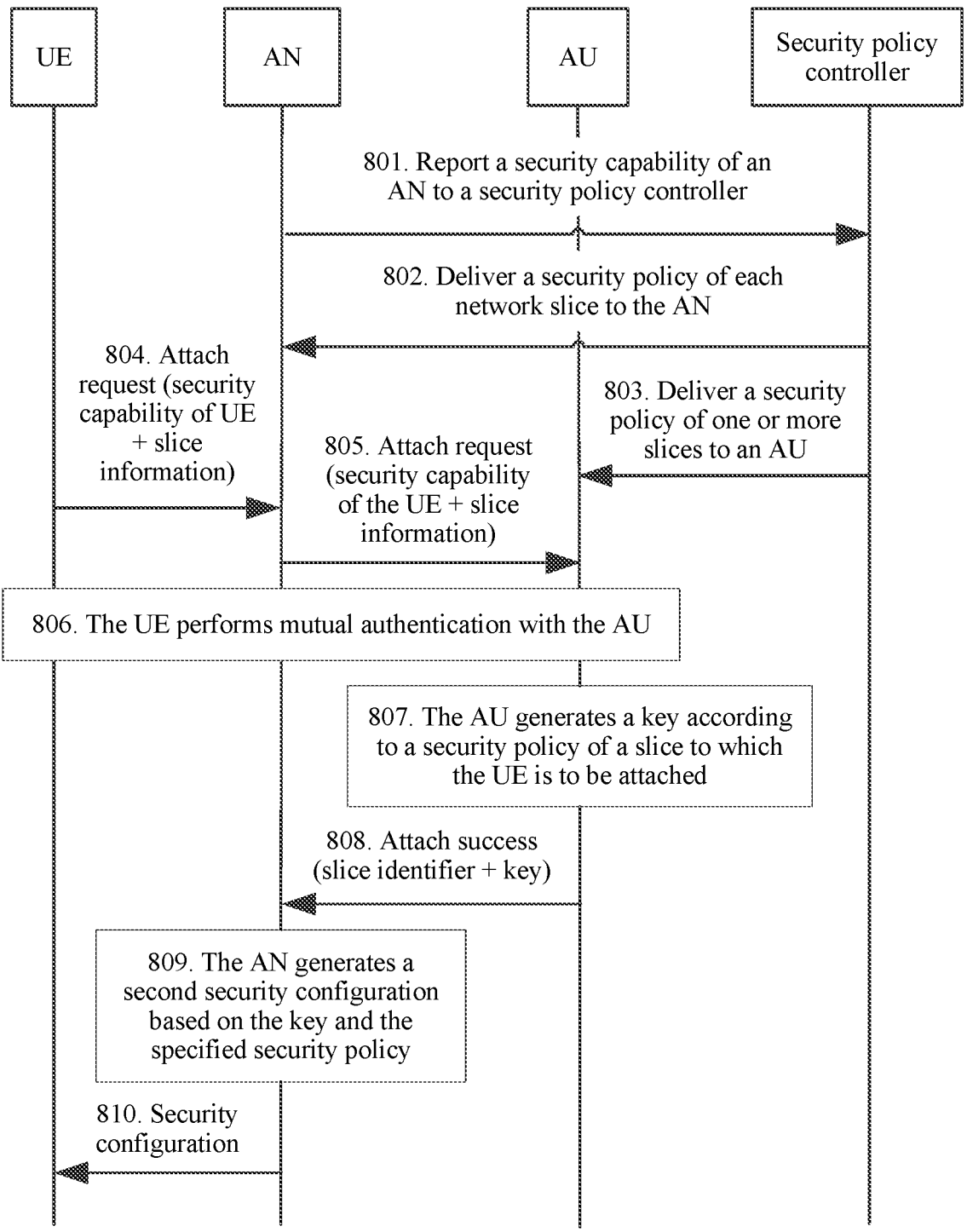
FIG. 8 is a schematic interaction diagram of executing a security policy by a management system according to an embodiment of the present invention.
Figure 9:
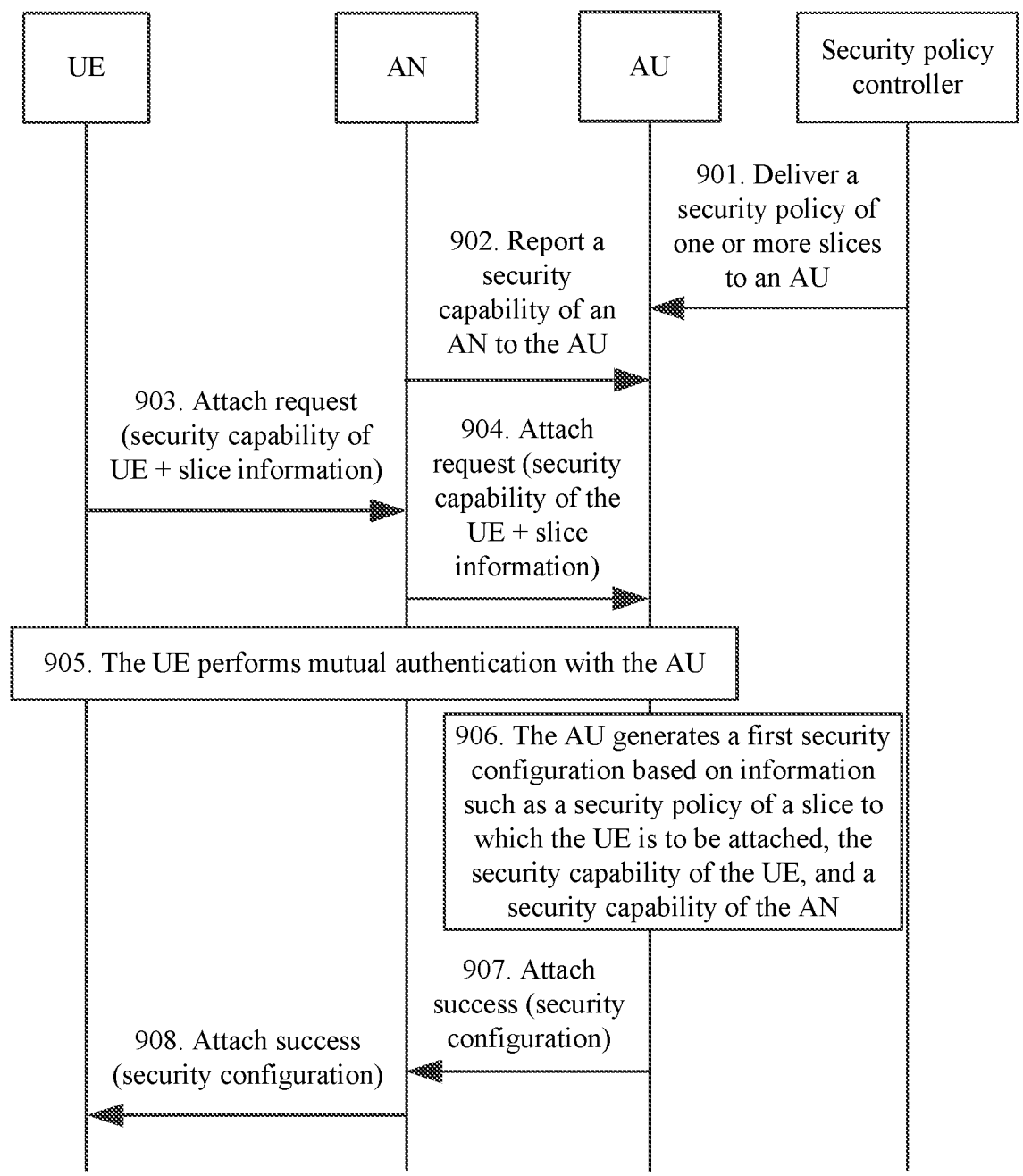
FIG. 9 is another schematic interaction diagram of executing a security policy by a management system according to an embodiment of the present invention.

With reference to FIG. 8 and FIG. 9, the following describes implementations in which the management system provided in the embodiments of the present invention executes a security policy in different application scenarios.

In some feasible implementations, FIG. 8 is a schematic interaction diagram of executing a security policy by a management system according to an embodiment of the present invention. A system structure shown in FIG. 8 includes UE, an AN, an authentication module, and a security policy controller, and a security configuration is jointly performed by the AN and the authentication module. An AU is used as an example of the authentication module for description, and an attach request is used as an example of both a first service request and a second service request for description. A process of performing a security configuration provided in the management system shown in FIG. 8 includes the following steps.

801. The AN reports a security capability of the AN to the security policy controller.

In some feasible implementations, optionally, the AN may report the security capability of the AN to the security policy controller before executing a security policy, and the security policy controller may record the security capability of the AN for subsequent security policy delivery. The security capability of the AN may include an encryption algorithm, an integrity protection algorithm, and the like supported by the AN, and this is not limited herein.

802. The security policy controller delivers a security policy of each network slice to the AN.

In some feasible implementations, in a process of performing a security configuration, the security policy controller may deliver the security policy of each slice to the AN, so that the AN can execute the security policy. The security policy of each slice includes information such as a selection priority of each encryption algorithm supported by the slice, a selection priority of each integrity protection algorithm supported by the slice, and a length and a use range of a key. The key includes a first key used to protect signaling between the UE and the AN and a second key used to protect signaling between the UE and the authentication module. Security policies of different slices may specify different lengths and different use ranges of keys, and security policies of different slices may also include different encryption algorithm selection priorities and different integrity protection algorithm selection priorities. Details may be determined based on an actual application scenario, and are not limited herein.

803. The security policy controller delivers a security policy of one or more slices to the AU.

In some feasible implementations, the AU to which the security policy controller delivers the security policy may be specifically a target AU selected by a network function selection module. The target AU (AU for short below) may serve one or more slices. The security policy controller may deliver security policies of all slices served by the AU to the AU. The security policy may include information such as a length of a key and a use range of the key.

804. The UE sends an attach request to the AN.

In some feasible implementations, the attach request may be a first service request (namely, the attach request) sent by the UE to the network function selection module. The UE sends the attach request to the AN, and the AN may send, to the network function selection module and the like in the system, the attach request sent by the UE. During specific implementation, the attach request sent by the UE to the AN may carry a security capability of the UE, slice information of a slice to which the UE is to be attached, or the like. The security capability of the UE includes an encryption algorithm, an integrity protection algorithm, or the like supported by the UE. The slice information of the slice to which the UE is to be attached includes a slice identifier, a slice type, a service type supported by the slice, a slice tenant identifier, and the like, and may be specifically determined based on an actual application scenario requirement. This is not limited herein.

805. The AN sends an attach request to the AU.

In some feasible implementations, the AN may directly send the attach request to the AU, or another network element (for example, the network function selection module) may forward the attach request to the AU. For example, the AN may send a second service request to the AU by using the network function selection module. The attach request sent by the AN to the AU may also carry information such as the security capability of the UE or the slice information of the slice to which the UE is to be attached, and this is not limited herein. If the AU serves a plurality of slices, when sending the attach request to the AU, the AN may add, to the attach request, the slice information such as an identifier of the slice to which the UE is to be attached. If the AU serves a single slice, when sending the attach request to the AU, the AN may not add, to the attach request, the slice information such as an identifier of the slice to which the UE is to be attached. Whether the attach request carries the slice information such as the identifier of the slice to which the UE is to be attached may be specifically determined based on an actual application scenario, and is not limited herein. Details are not described below.

806. The AU performs mutual authentication with the UE.

In some feasible implementations, for a specific implementation in which the UE sends the attach request, and the AU receives the attach request and performs mutual authentication with the UE, refer to the implementations described in the steps S401 to S404 in the foregoing embodiment, and details are not described herein again.

807. The AU generates a key according to a security policy of a slice to which the UE is to be attached.

In some feasible implementations, the AU may generate at least two keys according to the security policy of the slice (namely, the foregoing specified network slice) to which the UE is to be attached, and the at least two keys include the first key and the second key. A length of the first key and a length of the second key are consistent with a key length specified in the security policy (namely, the foregoing specified security policy) of the specified network slice.

The AU may further generate a first security configuration based on the key and an identifier of the specified network slice, and add the first security configuration to a second service request response that is to be sent to the AN. The second service request response may be specifically an attach success message indicating that the UE is successfully attached to the specified network slice.

808. The AU sends an attach success message to the AN.

In some feasible implementations, the attach success message may carry information such as the identifier of the specified network slice and the key.

809. The AN generates a second security configuration based on the key and the specified security policy.

In some feasible implementations, after receiving the attach success message, the AN may obtain information such as the identifier of the specified network slice and the first security configuration from the attach success message. The AN may store the key carried in the first security configuration, determine, based on the identifier of the specified network slice that is carried in the first security configuration, the specified security policy corresponding to the identifier of the specified network slice, and then select a target encryption algorithm and a target integrity protection algorithm based on the security capability of the UE and the specified security policy. Further, the AN may add an identifier of the target encryption algorithm and an identifier of the target integrity protection algorithm to the first security configuration, to obtain the second security configuration, add the second security configuration to a first service request response that is to be sent to the UE, and send the second security configuration to the UE by using the first service request response.

810. The AN sends the security configuration to the UE.

In some feasible implementations, the AN may add the second security configuration information to the first service request response (namely, an attach request response), and send the attach request response to the UE, to notify the UE of the second security configuration by using the attach request response.

In this embodiment of the present invention, in the system, the AU and the AN may execute the security policy, and through execution of a security configuration, the UE may be attached to the specified network slice, thereby guaranteeing system security and implementing multi-slice cyber security management.

In some feasible implementations, FIG. 9 is another schematic interaction diagram of executing a security policy by a management system according to an embodiment of the present invention. A system structure shown in FIG. 9 includes UE, an AN, and an authentication module. A security configuration is performed by the authentication module, and the AN may report a security capability of the AN to the authentication module and forward a security policy. An AU is used as an example of the authentication module for description, and an attach request is used as an example of both a first service request and a second service request for description. A process of performing a security configuration provided in the management system shown in FIG. 9 includes the following steps.

901. A security policy controller delivers a security policy of one or more slices to the AU.

In some feasible implementations, the AU to which the security policy controller delivers the security policy may be specifically a target AU selected by a network function selection module. The target AU (AU for short below) may serve one or more slices. The security policy controller may deliver security policies of all slices served by the AU to the AU. A security policy of each slice includes information such as a selection priority of each encryption algorithm supported by the slice, a selection priority of each integrity protection algorithm supported by the slice, and a length and a use range of a key. The key includes a first key used to protect signaling between the UE and the AN and a second key used to protect signaling between the UE and the authentication module. Security policies of different slices may specify different lengths and different use ranges of keys, and security policies of different slices may also include different encryption algorithm selection priorities and different integrity protection algorithm selection priorities. Details may be determined based on an actual application scenario, and are not limited herein.

902. The AN may report a security capability of the AN to the AU.

In some feasible implementations, the AN may send information such as an encryption algorithm or an integrity protection algorithm supported by the AN to the AU, so that the AU selects a corresponding encryption algorithm or integrity protection algorithm based on the security capability of the AN and a security capability of the UE. A process of reporting the security capability of the AN to the AU may be performed at any moment before the AU executes the security policy. This is not limited herein. The AU may store the security capability of the AN for subsequent security policy execution.

903. The UE sends an attach request to the AN.

In some feasible implementations, the attach request may be a first service request (namely, the attach request) sent by the UE to the network function selection module. The UE sends the attach request to the AN, and the AN may send, to the network function selection module and the like in the system, the attach request sent by the UE. During specific implementation, the attach request sent by the UE to the AN may carry the security capability of the UE, slice information of a slice to which the UE is to be attached, or the like. The security capability of the UE includes an encryption algorithm, an integrity protection algorithm, or the like supported by the UE. The slice information of the slice to which the UE is to be attached includes a slice identifier, a slice type, a service type supported by the slice, a slice tenant identifier, and the like, and may be specifically determined based on an actual application scenario requirement. This is not limited herein.

904. The AN sends an attach request to the AU.

In some feasible implementations, the AN may directly send the attach request to the AU, or another network element (for example, the network function selection module) may forward the attach request to the AU. For example, the AN may send a second service request to the AU by using the network function selection module. The attach request sent by the AN to the AU may also carry information such as the security capability of the UE or the slice information of the slice to which the UE is to be attached, and this is not limited herein.

905. The AU performs mutual authentication with the UE.

In some feasible implementations, for a specific implementation in which the AU performs mutual authentication with the UE after receiving the attach request, refer to the implementations described in the steps S401 to S404 in the foregoing embodiment, and details are not described herein again.

906. The AU generates a first security configuration based on information such as a security policy of a slice to which the UE is to be attached, a security capability of the UE, and the security capability of the AN.

In some feasible implementations, the AU may determine, by using the security capability of the UE that is carried in the second service request (namely, the attach request), information such as the encryption algorithm and the integrity protection algorithm supported by the UE. Alternatively, the AU may obtain, by using a network, the security capability of the UE, to be specific, information such as the encryption algorithm and the integrity protection algorithm supported by the UE. The AU may further obtain the security capability of the AN, to be specific, the encryption algorithm, the integrity protection algorithm, and the like supported by the AN. During specific implementation, the AU may generate a key according to the security policy (namely, a specified security policy) of the specified network slice to which the UE is to be attached, and may further select an encryption algorithm and an integrity protection algorithm based on the security capability of the UE, the security capability of the AN, and the specified security policy. The key may include at least two keys, for example, the first key and the second key. The first key may be a key used to protect signaling between the UE and the AN, and the second key may be a key used to protect signaling between the UE and the AU. A length of the first key and a length of the second key are consistent with a key length specified in the specified security policy. The encryption algorithm may be an encryption algorithm with a highest selection priority in an encryption algorithm supported by both the UE and the AN, and the integrity protection algorithm may be an integrity protection algorithm with a highest selection priority in an integrity protection algorithm supported by both the UE and the AN.

In some feasible implementations, after generating the first key and the second key and selecting the target encryption algorithm and the target integrity protection algorithm, the AU may generate the first security configuration based on the first key, an identifier of the target encryption algorithm, and an identifier of the target integrity protection algorithm, and add the first security configuration to a second service request response, so as to send the first security configuration information to the AN by using the second service request response. The first security configuration information may include information such as a use range of the first key, the identifier of the target encryption algorithm, and the identifier of the target integrity protection algorithm.

907. The AU sends an attach success message to the AN.

In some feasible implementations, the attach success message may carry the first security configuration information.

908. The AN sends first the security configuration to the UE.

In some feasible implementations, after receiving the attach success message, the AN may obtain the first security configuration from the attach success message, further store the key carried in the first security configuration, generate a second security configuration based on the identifier of the encryption algorithm and the identifier of the integrity protection algorithm that are carried in the first security configuration, add the second security configuration to a first service request response that is to be sent to the UE, and send the second security configuration to the UE by using the first service request response.

In this embodiment of the present invention, in the system, the AU may execute the security policy, and through execution of a security configuration, the UE may be attached to the specified network slice, thereby guaranteeing system security and implementing multi-slice cyber security management.

With reference to FIG. 10A, FIG. 10B, and FIG. 10C to FIG. 14, the following describes implementations in which the management system provided in the embodiments of the present invention performs cyber security management in different application scenarios.

Figure 10A:
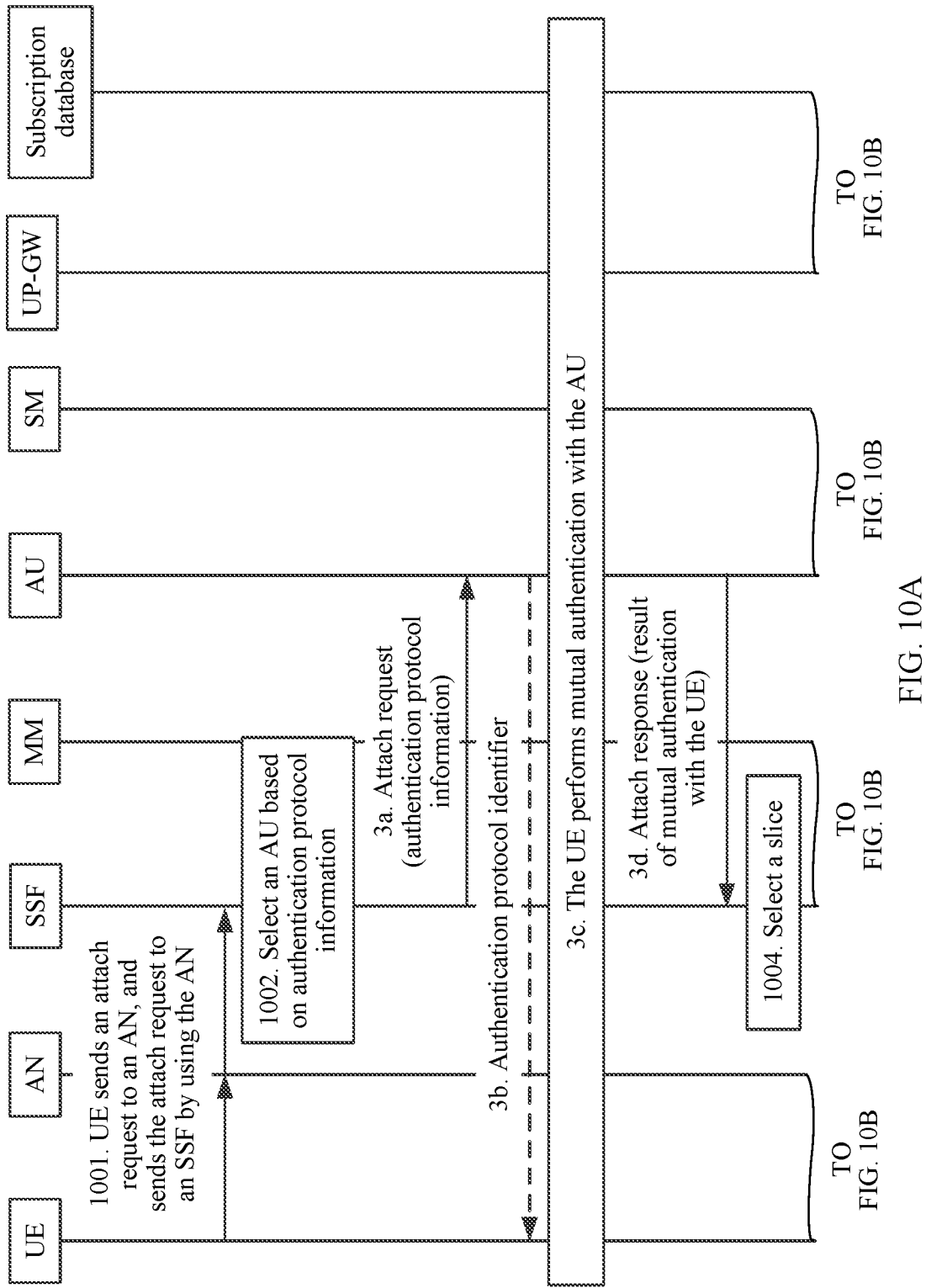
Figure 10C:
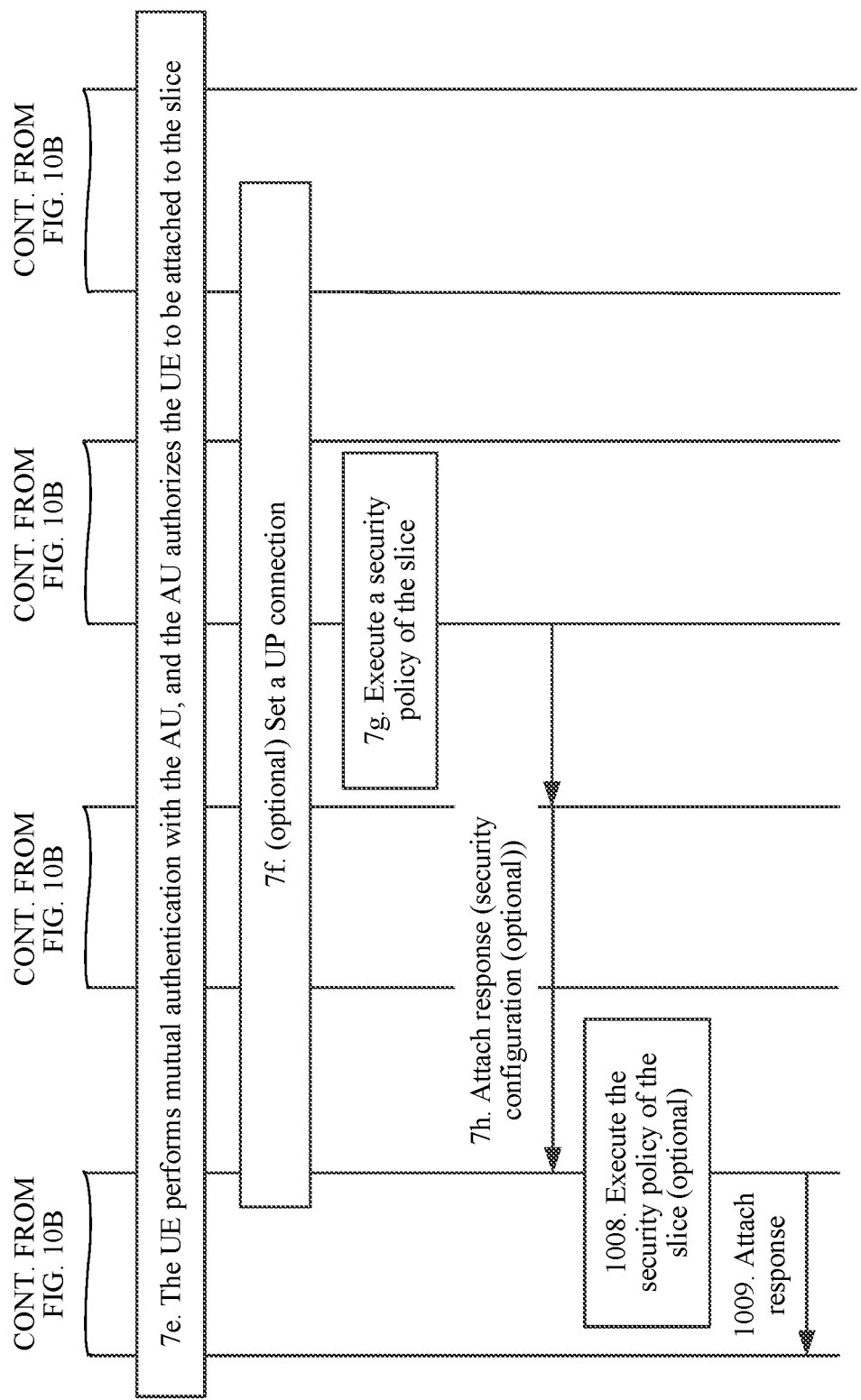

In some feasible implementations, FIG. 10A, FIG. 10B, and FIG. 10C are a schematic interaction diagram of performing cyber security management by a management system according to an embodiment of the present invention. A system structure shown in FIG. 10A, FIG. 10B, and FIG. 10C includes UE, an AN, a network function selection module, and an authentication module. An SSF and MM are used as examples of the network function selection module for description, and both the SSF and the MM may provide functions of an AURF and an AUSF. An AU is used as an example of the authentication module for description, and an attach request is used as an example of both a first service request and a second service request for description. In FIG. 10A, FIG. 10B, and FIG. 10C, the management system provided in this embodiment of the present invention may further interact with session management (English: Session Management, SM), a UP-GW, and a subscription database in a 5G network architecture.

In this application scenario, the UE cannot provide a slice identifier, and the UE is to perform authentication twice in an attach procedure. Slice selection may be implemented during a first time of AU selection, and the first time of AU selection is performed in the SSF. A security policy of a slice may be implemented during a second time of AU selection, and the second time of AU selection is performed in the MM. Both the SSF and the MM provide the functions of the AUSF and the AURF.

A process of performing cyber security management provided in the management system shown in FIG. 10A, FIG. 10B, and FIG. 10C includes the following steps.

1001. The UE sends an attach request to the AN, and sends the attach request to the SSF by using the AN.

During specific implementation, the attach request may be the foregoing first service request, and the attach request carries authentication protocol information.

1002. The SSF selects an AU based on authentication protocol information.

During specific implementation, for a specific implementation process in which the SSF selects the AU based on the authentication protocol information, refer to the implementation described in step S402, and details are not described herein again.

1003. The AU performs mutual authentication with the UE by using a selected authentication protocol, and notifies the SSF of an authentication result.

Step S1003 may include the following sub-steps.

3a. The SSF sends the attach request to the AU.

The attach request carries the authentication protocol information. The AU may select, based on the authentication protocol information, the authentication protocol supported by both the UE and the AU. For a specific selection manner, refer to the implementations described in the steps S401 to S404.

3b. The AU feeds back an identifier of the authentication protocol to the UE.

After selecting the target authentication protocol, the AU may send the identifier of the authentication protocol to the UE, so as to implement mutual authentication with the UE by using the target authentication protocol.

3c. The AU performs mutual authentication with the UE.

3d. The AU sends the result of mutual authentication with the UE to the SSF.

1004. The SSF selects a slice.

During specific implementation, the SSF selects, based on the result of authentication between the AU and the UE, the slice to which the UE is to be attached. For a specific implementation, refer to an implementation provided in an existing 5G network system, and details are not described herein.

1005. The SSF sends an identifier of the slice to the AN.

During specific implementation, the SSF may send the identifier of the slice to the AN after selecting the slice, so as to select, by using the AN, MM for attaching the UE to the slice.

1006. The AN selects MM.

For a specific implementation in which the AN selects the MM based on the identifier of the slice to which the UE is to be attached, refer to an implementation provided in the existing 5G network system, and details are not described herein.

1007. The UE performs attach to the selected slice, including the following steps.

7*a*. The AN sends the attach request of the UE to the MM. The attach request includes the authentication protocol information.

7*b*. The MM selects an AU based on the authentication protocol information.

7*c*. The MM sends the attach request of the UE to the selected AU.

The attach request may include the authentication protocol information. If the selected AU supports only one authentication protocol, the attach request may not include the authentication protocol information. If the selected AU supports a plurality of authentication protocols, the attach request may include an authentication protocol determined during AU selection.

7*d*. The AU notifies the UE of an identifier of a selected authentication protocol.

Optionally, the identifier of the selected authentication protocol may be sent by the SSF or the MM providing functions of the AURF, and this is not limited herein.

7*e*. The UE performs mutual authentication with the AU, and the AU authorizes the UE to be attached to the slice.

During specific implementation, for an implementation, described in 7*a* to 7*e*, in which the AU performs mutual authentication with the UE according to the authentication protocol, refer to the implementations described in the steps S401 and S404, and details are not described herein again.

7*f*. Set a UP connection.

7*g*. Execute a security policy of the slice.

During specific implementation, the AU generates a first security configuration based on information such as the security policy of the slice to which the UE is to be attached. The first security configuration includes a key, may further include information such as an identifier of an encryption algorithm or an identifier of an integrity protection algorithm, and may be specifically determined according to an implementation of executing the security policy by the AU. For details, refer to the implementations described in the foregoing application scenarios, and details are not described herein again.

7*h*. The AU sends an attach response to the AN.

The attach response may include the first security configuration.

1008. Execute the security policy of the slice.

Optionally, the AN determines a second security configuration based on information such as the first security configuration and the security policy of the slice to which the UE is to be attached. If the first security configuration generated by the AU includes information such as the key, the encryption algorithm, and the integrity protection algorithm, this step may be omitted. If the first security configuration generated by the AU includes only the key, the AN may further select information such as the encryption algorithm and the integrity protection algorithm, to determine the second security configuration that includes information such as the key, the encryption algorithm, and the integrity protection algorithm.

1009. The AN sends the attach response to the UE.

The attach response may include the second security configuration.

Figure 11:
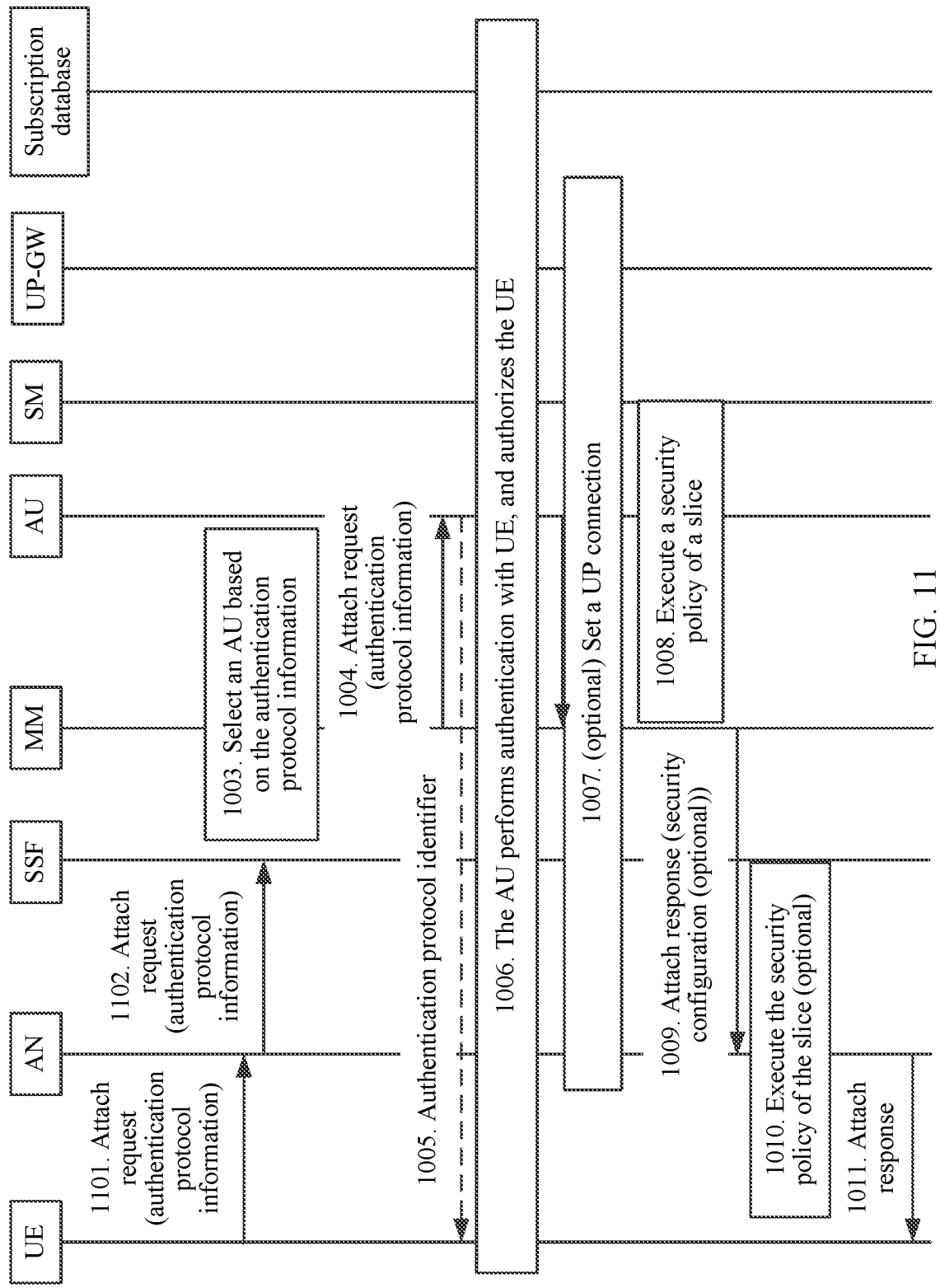
FIG. 11 is another schematic interaction diagram of performing cyber security management by a management system according to an embodiment of the present invention.

In some feasible implementations, FIG. 11 is another schematic interaction diagram of performing cyber security management by a management system according to an embodiment of the present invention. A system structure shown in FIG. 11 includes UE, an AN, a network function selection module, and an authentication module. An SSF and MM are used as examples of the network function selection module for description, and both the SSF and the MM may provide functions of an AURF and an AUSF. An AU is used as an example of the authentication module for description, and an attach request is used as an example of both a first service request and a second service request for description. In FIG. 11, the management system provided in this embodiment of the present invention may further interact with SM, a GW-U, and a subscription database in a 5G network architecture.

In this application scenario, the UE provides a slice identifier, and the UE is to perform authentication once in an attach procedure. AU selection is performed in the MM. The MM provides the functions of the AUSF and the AURF.

A process of performing cyber security management provided in the management system shown in FIG. 11 includes the following steps.

1101. The UE sends an attach request to the AN, where the request includes authentication protocol information of the UE.

1102. The AN sends the attach request of the UE to the MM.

1103. The MM selects an AU based on the authentication protocol information in the attach request.

1104. The MM sends the attach request of the UE to the selected AU, where the request includes the authentication protocol information.

1105. (optional) The AU notifies the UE of an identifier of a selected authentication protocol.

1106. The UE performs mutual authentication with the AU by using the authentication protocol.

1107. (optional) Set a UP connection.

1108. Execute a security policy of a slice.

During specific implementation, the AU generates a first security configuration based on information such as the security policy of the slice to which the UE is to be attached. The first security configuration includes a key, may further include information such as an identifier of an encryption algorithm or an identifier of an integrity protection algorithm, and may be specifically determined according to an implementation of executing the security policy by the AU. For details, refer to the implementations described in the foregoing application scenarios, and details are not described herein again.

1109. The AU sends an attach response to the AN.

The attach response may include the first security configuration.

1110. Execute the security policy of the slice.

Optionally, the AN determines a second security configuration based on information such as the first security configuration and the security policy of the slice to which the UE is to be attached. If the first security configuration generated by the AU includes information such as the key, the encryption algorithm, and the integrity protection algorithm, this step may be omitted. If the first security configuration generated by the AU includes only the key, the AN may further select information such as the encryption algorithm and the integrity protection algorithm, to determine the second security configuration that includes information such as the key, the encryption algorithm, and the integrity protection algorithm.

1111. The AN sends the attach response to the UE.

During specific implementation, for implementations of the foregoing steps, refer to the implementations described in the steps in the embodiment of the application scenario shown in FIG. 10A, FIG. 10B, and FIG. 10C, and details are not described herein again.

Figure 12:
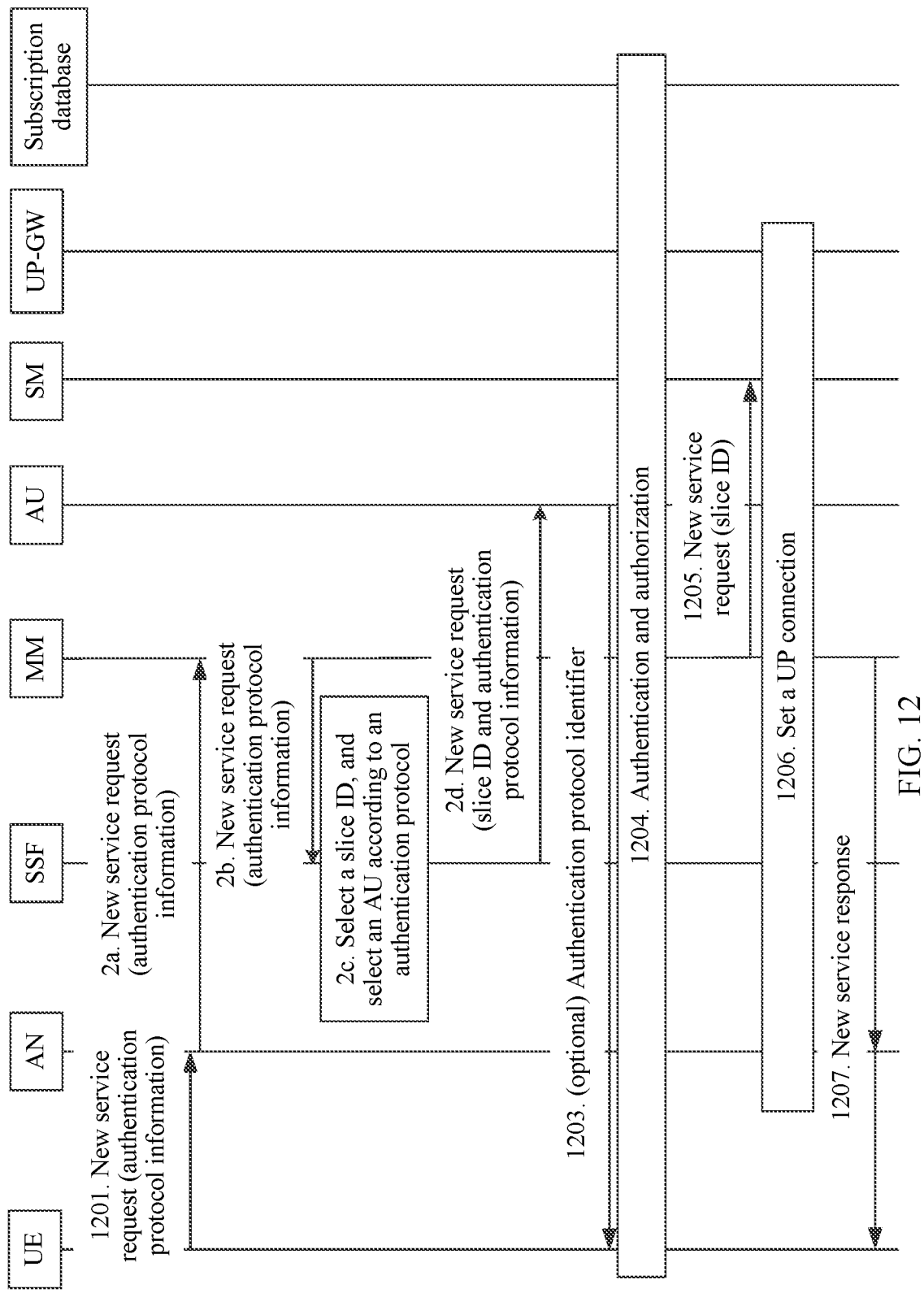
FIG. 12 is another schematic interaction diagram of performing cyber security management by a management system according to an embodiment of the present invention.

In some feasible implementations, FIG. 12 is another schematic interaction diagram of performing cyber security management by a management system according to an embodiment of the present invention. A system structure shown in FIG. 12 includes UE, an AN, a network function selection module, and an authentication module. An SSF and MM are used as examples of the network function selection module for description, and both the SSF and the MM may provide functions of an AURF and an AUSF. An AU is used as an example of the authentication module for description, and an attach request is used as an example of both a first service request and a second service request for description. In FIG. 12, the management system provided in this embodiment of the present invention may further interact with SM, a GW-U, and a subscription database in a 5G network architecture.

In this embodiment, the UE has been attached to a slice and requests to be attached to another slice by using a new service request, and the UE is to perform authentication once in an attach procedure. AU selection is performed in the SSF. The SSF provides the functions of the AUSF and the AURF.

A process of performing cyber security management provided in the management system shown in FIG. 12 includes the following steps.

1201. The UE sends a new service request to the AN, where the request includes authentication protocol information of the UE.

1202. A network performs slice selection and AU selection, including the following steps.

2a. The AN sends the new service request to the MM, where the new service request carries the authentication protocol information.

2b. The MM sends the new service request to the SSF, where the new service request carries the authentication protocol information.

2c. The SSF selects a slice, and selects an AU based on the authentication protocol information.

For a process of selecting the slice by the SSF, refer to an implementation provided in a system of an existing 5G architecture, and this is not limited herein. The SSF may select the target AU based on the selected slice and the authentication protocol information carried in the new service request, so as to implement an operation of attaching the UE to another slice by using the target AU.

2d. The SSF sends the new service request to the AU.

The new service request carries an ID of the slice and the authentication protocol information.

1203. (optional) The AU notifies the UE of an identifier of a selected authentication protocol.

1204. The UE performs mutual authentication with the AU by using the authentication protocol, and the AU authorizes the UE to be attached to the slice.

1205. The MM sends a new service request to the SM.

1206. Set a UP connection.

1207. The MM sends a new service response to the UE.

During specific implementation, for implementations of the foregoing steps, refer to the implementations described in the steps in the embodiments of the foregoing application scenarios, and details are not described herein again.

Figure 13:
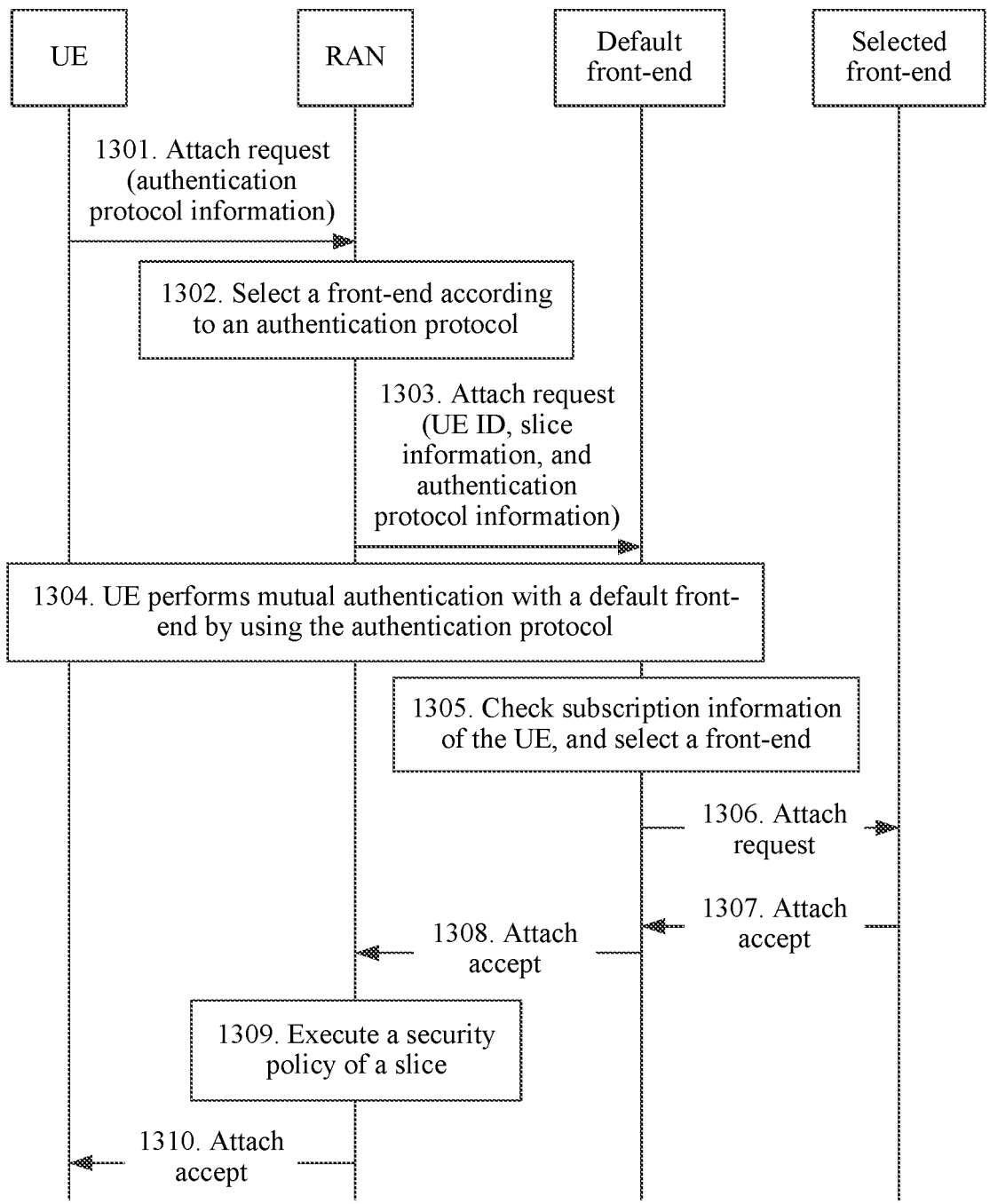
FIG. 13 is another schematic interaction diagram of performing cyber security management by a management system according to an embodiment of the present invention.

In some feasible implementations, FIG. 13 is another schematic interaction diagram of performing cyber security management by a management system according to an embodiment of the present invention. A system structure shown in FIG. 13 includes UE, an AN, and an authentication module. For description, an implementation performed by a network function selection module is performed by the AN, and the AN may provide functions of an AURF and an AUSF. A front-end is used as an example of the authentication module for description, and the front-end may provide functions of an AU. An attach request is used as an example of both a first service request and a second service request for description.

In this embodiment, a network element named the front-end provides the functions of the AU, and a front-end allocated to the UE is responsible for forwarding all control plane (Control Plane, CP) signaling of the UE to a network element exclusive to a slice. The UE is to perform authentication once with the front-end in an attach procedure. Front-end selection is performed in a RAN. The RAN provides the functions of the AUSF and the AURF.

A process of performing cyber security management provided in the management system shown in FIG. 13 includes the following steps.

1301. The UE sends an attach request to the RAN.

The attach request includes information such as authentication protocol information of the UE, an identifier of the UE, slice information, and a security capability of the UE.

1302. The RAN selects a default front-end based on authentication protocol information in the attach request.

1303. The RAN sends the attach request of the UE to the selected default front-end, where the request includes the authentication protocol information.

1304. The UE performs mutual authentication with the default front-end by using an authentication protocol.

1305. The default front-end checks subscription information of the UE, and selects a front-end.

1306. The default front-end forwards the attach request to the selected front-end.

1307. The selected front-end sends an attach accept message to the default front-end.

1308. The default front-end sends the attach accept message to the RAN.

1309. The RAN executes a security policy of a slice.

During specific implementation, optionally, the RAN generates a security configuration according to the security policy of the slice to which the UE is to be attached, and the security configuration includes a first key, a second key, an encryption algorithm, an integrity protection algorithm, and the like.

1310. The RAN sends the attach accept message to the UE.

During specific implementation, for implementations of the foregoing steps, refer to the implementations described in the steps in the embodiments of the foregoing application scenarios, and details are not described herein again.

Figure 14:
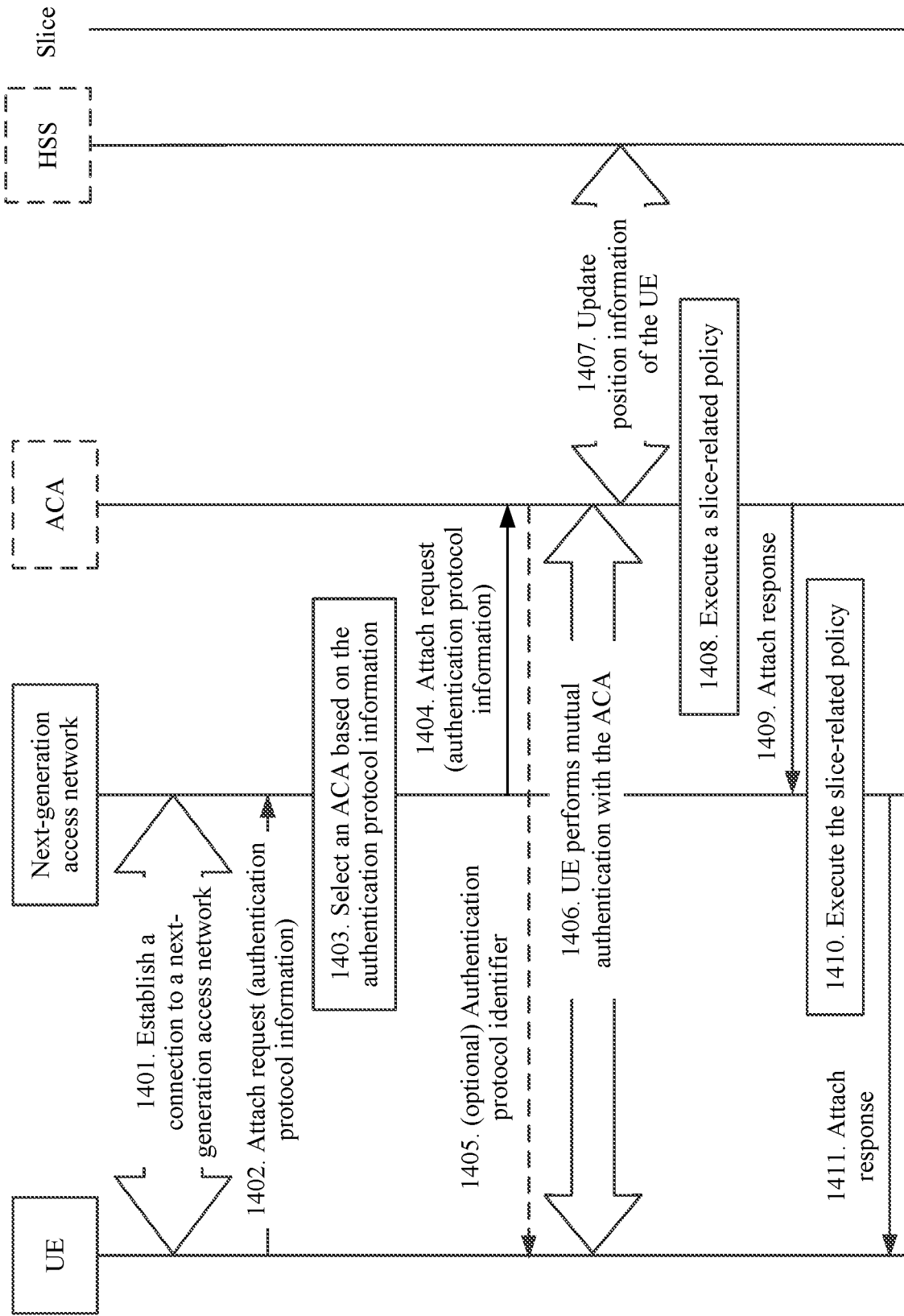
FIG. 14 is another schematic interaction diagram of performing cyber security management by a management system according to an embodiment of the present invention.

In some feasible implementations, FIG. 14 is another schematic interaction diagram of performing cyber security management by a management system according to an embodiment of the present invention. A system structure shown in FIG. 14 includes UE, a next-generation access network, and an authentication module. For description, implementations performed by an AN and a network function selection module are performed by the next-generation access network, and the next-generation access network may provide functions of an AURF and an AUSF. An ACA is used as an example of the authentication module for description, and the ACA may provide functions of an AU. An attach request is used as an example of both a first service request and a second service request for description. In FIG. 14, the management system provided in this embodiment of the present invention may further interact with an HSS in a 5G network architecture.

In this embodiment, a network element named the ACA provides the functions of the AU, and the ACA also provides a slice selection function. The UE is to perform authentication once with the ACA in an attach procedure. ACA selection is performed in the next-generation access network (namely, a next-generation RAN). The next-generation access network provides the functions of the AUSF and the AURF.

A process of performing cyber security management provided in the management system shown in FIG. 14 includes the following steps.

1401. The UE establishes a connection to the next-generation access network.

1402. The UE sends an attach request to the next-generation access network, where the request includes authentication protocol information.

1403. The next-generation access network selects an ACA based on the authentication protocol information in the attach request.

1404. The next-generation access network sends the attach request of the UE to the selected ACA, where the request includes the authentication protocol information.

1405. (optional) The ACA sends an identifier of an authentication protocol to the UE.

1406. The UE performs mutual authentication with the ACA by using the authentication protocol.

1407. The ACA updates position information of the UE to the HSS.

1408. The ACA executes a security policy of a slice.

Specifically, the ACA generates a key according to the security policy of the slice to which the UE is to be attached, and may further select an encryption algorithm and an integrity protection algorithm based on information such as a security capability of the UE and the security policy of the slice, and add information such as an identifier of the encryption algorithm and an identifier of the integrity protection algorithm to a first security configuration.

1409. The ACA sends an attach response message to the next-generation access network.

1410. The next-generation access network executes the security policy of the slice.

During specific implementation, optionally, the next-generation access network may select an encryption algorithm and an integrity protection algorithm based on information such as the security policy of the slice to which the UE is to be attached and the security capability of the UE, and determine a second security configuration with reference to the first security configuration.

1411. The next-generation access network sends the attach response message to the UE.

The attach response message may carry the second security configuration.

During specific implementation, for implementations of the foregoing steps, refer to the implementations described in the steps in the embodiments of the foregoing application scenarios, and details are not described herein again.

Figure 15:
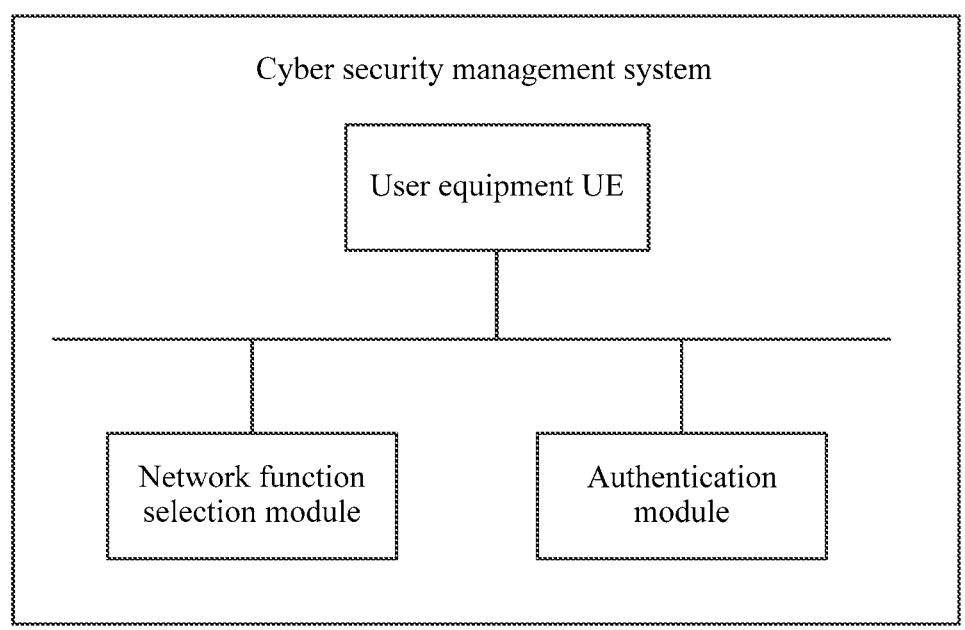
FIG. 15 is another schematic structural diagram of a cyber security management system according to an embodiment of the present invention.

FIG. 15 is another schematic structural diagram of a cyber security management system according to an embodiment of the present invention. The management system provided in this embodiment of the present invention may include UE, a network function selection module, and at least two authentication modules. The at least two authentication modules include an authentication module shared by a plurality of slices, and also include an authentication module exclusive to a single slice. Alternatively, each of the at least two authentication modules may be an authentication module shared by a plurality of slices, or may be an authentication module exclusive to a single slice. Details may be determined based on an actual application scenario, and are not limited herein. There may be a plurality of shared authentication modules, and each shared authentication module serves at least two slices. There may also be a plurality of exclusive authentication modules, and each exclusive authentication module serves one slice. During specific implementation, a quantity of authentication modules and a distribution status of slices served by the authentication modules may be determined based on an actual application scenario, and this is not limited herein.

In this embodiment of the present invention, the network function selection module may include an AUSF, an AURF, an SSF, MM, and the like, and may be specifically determined based on an actual application scenario, and this is not limited herein.

In this embodiment of the present invention, the authentication module may include an AU, a front-end, an ACA, and the like, and may be specifically determined based on an actual application scenario, and this is not limited herein.

Figure 16:
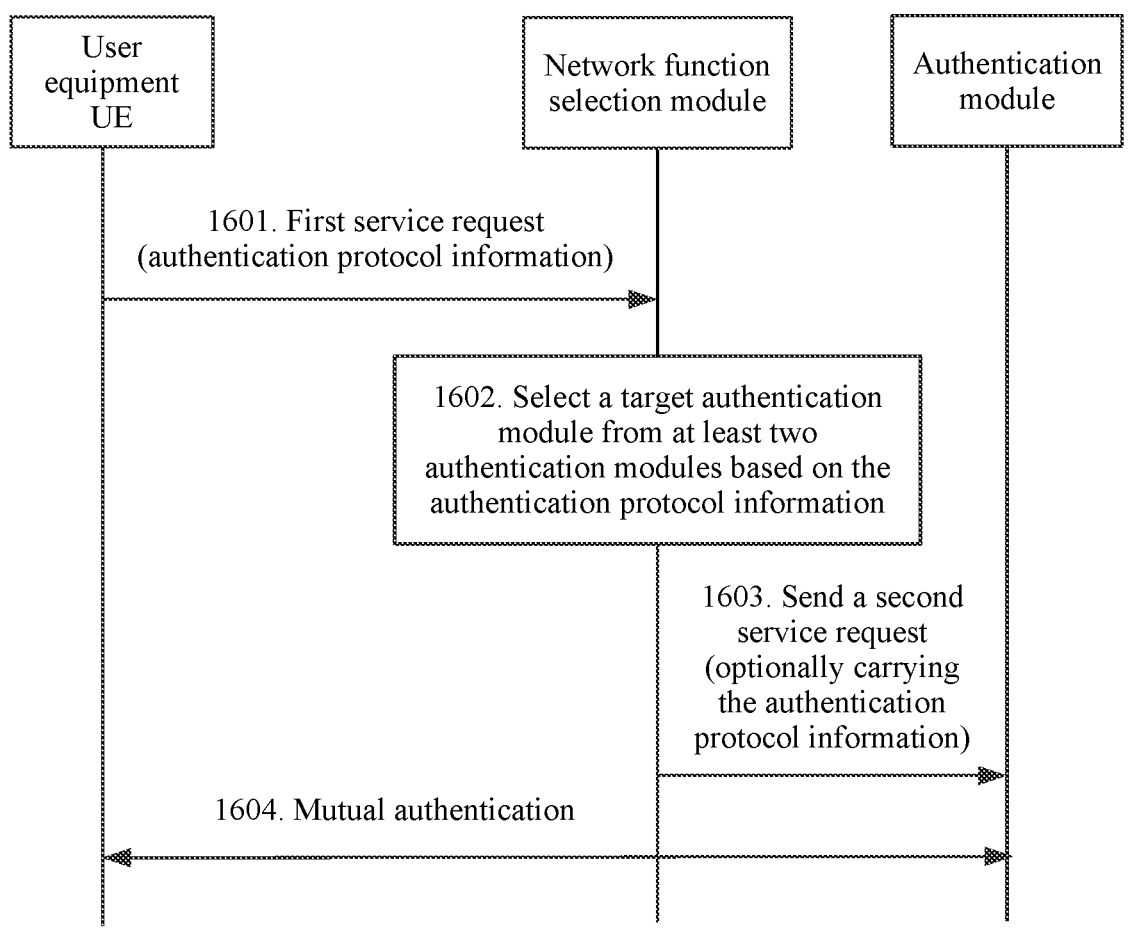
FIG. 16 is a schematic interaction diagram of implementing cyber security management by function modules in a management system according to an embodiment of the present invention.

FIG. 16 is a schematic interaction diagram of implementing cyber security management by function modules (including UE, an AN, a network function selection module, and an authentication module) in a management system according to an embodiment of the present invention. A process in which the system shown in FIG. 15 implements cyber security management may include the following steps:

1601. The UE sends a first service request to the network function selection module, where the first service request carries authentication protocol information.

1602. The network function selection module selects a target authentication module from at least two authentication modules based on the authentication protocol information.

1603. The network function selection module sends a second service request to the target authentication module.

1604. The target authentication module receives the second service request, and performs mutual authentication with the UE.

In some feasible implementations, the first service request may be specifically an attach request that the UE requests to be attached to a slice. Alternatively, the first service request may be a new service request that is sent by the UE when the UE has been attached to a slice and expects to be attached to another slice by using the new service request. The attach request or the new service request carries the authentication protocol information. The authentication protocol information includes information such as an identifier of one or more authentication protocols supported by the UE, or a selection priority of each of a plurality of authentication protocols supported by the UE. The attach request or the new service request may also carry an identifier of a slice to which the UE is to be attached, and the like. A type of the first service request and the authentication protocol information carried in the first service request may be specifically determined based on an actual application scenario, and are not limited herein.

In some feasible implementations, after receiving the first service request sent by the UE, the network function selection module may select the target authentication module from the at least two authentication modules based on the authentication protocol information carried in the first service request. During specific implementation, if the authentication protocol information carries an identifier of one authentication protocol (for example, a first authentication protocol) supported by the UE, the network function selection module may select, based on the identifier of the first authentication protocol, an authentication module that supports the first authentication protocol from the plurality of authentication modules as the target authentication module.

If more than one authentication module supports the first authentication protocol, the network function selection module may select, based on a load status of each authentication module, an authentication module with least load from the authentication modules as the target authentication module.

Further, if the first service request carries an identifier of a slice (namely, a specified network slice) to which the UE is to be attached, the network function selection module may select, based on the identifier of the first authentication protocol and the identifier of the specified network slice, the target authentication module from the at least two authentication modules included in a network. The target authentication module is an authentication module that supports the first authentication protocol and the specified network slice. Specifically, the network function selection module may first select an authentication module that supports the first authentication protocol from the plurality of authentication modules based on the identifier of the first authentication protocol. If more than one authentication module supports the first authentication protocol, the network function selection module may select, based on the identifier of the specified network slice, an authentication module associated with the slice to which the UE is to be attached from the plurality of authentication modules that support the first authentication protocol as the target authentication module. The authentication module associated with the slice to which the UE is to be attached may be an authentication module that serves the slice. In addition, alternatively, the network function selection module may first select an authentication module that supports the specified network slice from the plurality of authentication modules based on the identifier of the specified network slice. If more than one authentication module supports the specified network slice, the network function selection module may select, according to the first authentication protocol, an authentication module that supports the first authentication protocol from the plurality of authentication modules that support the specified network slice as the target authentication module. Further, alternatively, the network function selection module may select the target authentication module from the plurality of authentication modules simultaneously based on the identifier of the first authentication protocol and the identifier of the specified network slice. An authentication module screening manner in a specific selection process may be determined based on an actual application scenario, and is not limited herein.

Further, in some feasible implementations, if more than one target authentication module is selected based on the identifier of the first authentication protocol or based on the identifier of the first authentication protocol and the identifier of the specified network slice, the network function selection module may select, as a finally selected target authentication module based on a load status of each selected to-be-selected target authentication module, an authentication module with least load from the plurality of selected to-be-selected target authentication modules.

In some feasible implementations, if the authentication protocol information carries identifiers of a plurality of authentication protocols (each authentication protocol is, for example, a second authentication protocol) supported by the UE, the network function selection module may select, based on the identifiers of the second authentication protocols supported by the UE, the target authentication module from the plurality of authentication modules included in a network. During specific implementation, if only one of the plurality of authentication modules included in the system supports the authentication protocol supported by the UE, the authentication module may be determined as the target authentication module. If the plurality of authentication modules included in the network include a plurality of authentication modules that support one of the authentication protocols supported by the UE, an authentication module with least load may be selected as the target authentication module from the plurality of authentication modules that support the authentication protocol. If the plurality of authentication modules included in the network include a plurality of different authentication modules that support different authentication protocols, the network function selection module selects the target authentication module from the plurality of different authentication modules based on a selection priority of each authentication protocol or a load status of each authentication module.

In some feasible implementations, if the plurality of authentication modules included in the network include a plurality of different authentication modules that support different authentication protocols, the network function selection module may determine, based on an authentication protocol selection priority that is set in the network, an authentication protocol with a highest selection priority from the plurality of authentication protocols supported by the UE, and then may select a to-be-selected authentication module that supports the authentication protocol with the highest selection priority from the plurality of different authentication modules that support different authentication protocols as the target authentication module. If more than one to-be-selected authentication module supports the authentication protocol with the highest selection priority, an authentication module with least load may be selected, based on a load status of each to-be-selected authentication module, from the authentication modules as the target authentication module.

In some feasible implementations, if the plurality of authentication modules included in the network include a plurality of different authentication modules that support different authentication protocols, the network function selection module may directly select, based on a load status of each authentication module, an authentication module with least load from the authentication modules as the target authentication module.

Further, in some feasible implementations, the authentication protocol information carried in the first service request may include identifiers of a plurality of authentication protocols (each authentication protocol may be, for example, a third authentication protocol) supported by the UE and a selection priority of each third authentication protocol. The network function selection module may select, based on the identifiers of the third authentication protocols supported by the UE, the target authentication module from the plurality of authentication modules included in the system. During specific implementation, if only one of the plurality of authentication modules included in the system supports the authentication protocol supported by the UE, the authentication module may be determined as the target authentication module. If the plurality of authentication modules included in the system include a plurality of authentication modules that support one of the third authentication protocols supported by the UE, an authentication module with least load may be selected as the target authentication module from the plurality of authentication modules that support the third authentication protocol. If the plurality of authentication modules included in the system include a plurality of different authentication modules that support different third authentication protocols, the network function selection module may select, based on a load status of each authentication module, an authentication module with least load from the authentication modules as the target authentication module.

Further, if the plurality of authentication modules included in the system include a plurality of different authentication modules that support different third authentication protocols, the network function selection module may further select, based on a selection priority of each third authentication protocol, an authentication module that supports an authentication protocol with a highest selection priority (for example, a fourth authentication protocol) from the plurality of different authentication modules that support different third authentication protocols as the target authentication module. If more than one authentication module supports the fourth authentication protocol, the network function selection module may select, based on a load status of each authentication module, an authentication module with least load from the authentication modules as the target authentication module.

Further, in some feasible implementations, the first service request may carry more slice information in addition to the identifier of the slice to which the UE is to be attached, and the slice information may specifically include a slice type, a service type supported by the slice, a slice tenant identifier, or the like. In the process of selecting the target authentication module based on the authentication protocol information, the network function selection module may also perform comprehensive selection with reference to the slice information, and this is not limited herein.

In some feasible implementations, after selecting the target authentication module, the network function selection module may send the second service request to the target authentication module. Correspondingly, the second service request may also be an attach request or a new service request. During specific implementation, if the target authentication module supports only one authentication protocol, the second service request sent to the target authentication module does not need to carry the authentication protocol information, and may carry an identifier of the UE, information about the slice to which the UE is to be attached, or the like. If the target authentication module may support a plurality of authentication protocols, the second service request may carry an identifier that is of an authentication protocol supported by both the UE and the target authentication module and that is used during selection of the target authentication module. Optionally, the second service request may carry an identifier of the UE, information about the slice to which the UE is to be attached, or the like, and this is not limited herein.

In some feasible implementations, if the target authentication module supports only one authentication protocol, the target authentication module may directly perform mutual authentication with the UE by using the authentication protocol. If the target authentication module may support a plurality of authentication protocols, the target authentication module may receive the second service request sent by the network function selection module, and perform mutual authentication with the UE according to an authentication protocol that is supported by both the UE and the target authentication module and that is carried in the second service request.

During specific implementation, the second service request may further carry the identifier of the UE, for example, an ID of the UE, and this is not limited herein. For an implementation in which the authentication module implements mutual authentication with the UE by using the ID of the UE or the slice information, refer to an existing implementation of system interaction in a 5G framework, and details are not described herein.

During specific implementation, for implementations in which the management system provided in this embodiment of the present invention implements authentication module selection in different application scenarios, refer to the implementations described in the steps in the embodiments in FIG. 5 to FIG. 7, and details are not described herein again.

In this embodiment of the present invention, the network function selection module may select, based on the information about the authentication protocol supported by the UE, an authentication module that supports the authentication protocol supported by the UE, and then the authentication module may perform mutual authentication with the UE, thereby improving authentication module selection accuracy and cyber security.

Figure 17:
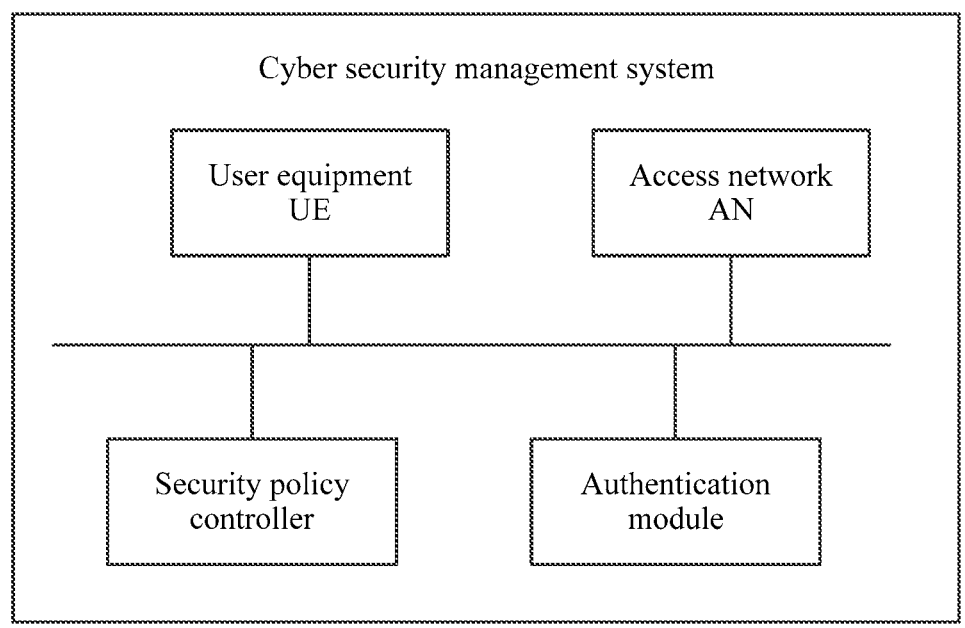
FIG. 17 is another schematic structural diagram of a cyber security management system according to an embodiment of the present invention.

FIG. 17 is another schematic structural diagram of a cyber security management system according to an embodiment of the present invention. The management system provided in this embodiment of the present invention may include UE, an AN, a security policy controller, and an authentication module. The authentication module includes an authentication module shared by a plurality of slices, and also includes an authentication module exclusive to a single slice. There may be a plurality of shared authentication modules, and each shared authentication module serves at least two slices. There may also be a plurality of exclusive authentication modules, and each exclusive authentication module serves one slice. During specific implementation, a quantity of authentication modules and a distribution status of slices served by the authentication modules may be determined based on an actual application scenario, and this is not limited herein.

In this embodiment of the present invention, the authentication module may include an AU, a front-end, an ACA, and the like, and may be specifically determined based on an actual application scenario, and this is not limited herein.

Figure 18:
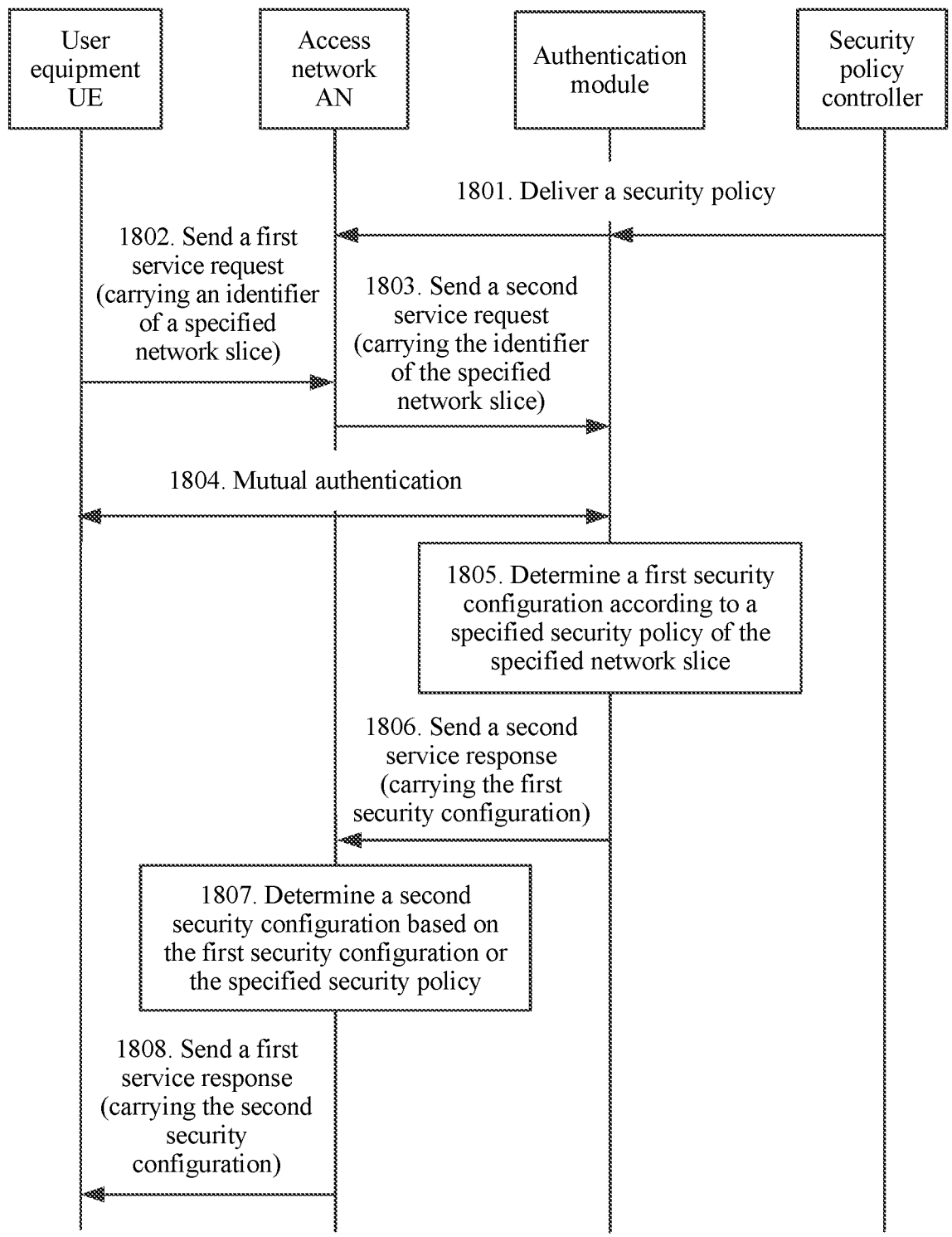
FIG. 18 is another schematic interaction diagram of implementing cyber security management by function modules in a management system according to an embodiment of the present invention.

FIG. 18 is another schematic interaction diagram of implementing cyber security management by function modules (including UE, an AN, a security policy controller, and an authentication module) in a management system according to an embodiment of the present invention. A process in which the system shown in FIG. 17 implements security configuration management in cyber security management may include the following steps:

1801. The security policy controller delivers a network slice security policy to the AN or the authentication module.

1802. The UE sends a first service request to the AN, where the first service request carries an identifier of a specified network slice to which the UE is to be attached.

1803. The AN sends a second service request to the authentication module, where the second service request carries the identifier of the specified network slice to which the UE is to be attached.

1804. The authentication module receives the second service request, and performs mutual authentication with the UE.

1805. The authentication module determines a first security configuration according to a specified security policy of the specified network slice.

1806. The authentication module sends a second service request response to the AN, where the second service request response carries the first security configuration.

1807. The AN determines a second security configuration based on the first security configuration or the specified security policy.

1808. The AN sends a first service request response to the UE, where the first service request response carries the second security configuration.

In some feasible implementations, the security policy controller provided in this embodiment of the present invention is configured to deliver a security policy of each network slice included in the system to the authentication module or the AN. During specific implementation, in the management system provided in this embodiment of the present invention, the security policy of the slice to which the UE is to be attached may be executed by the target authentication module (the authentication module shown in FIG. 17), or the security policy of the slice to which the UE is to be attached may be jointly executed by the target authentication module and the AN. During specific implementation, a network slice security policy may specify a length of a key to signaling between the UE and the AN, and may further specify information such as an encryption algorithm selection priority, an integrity protection algorithm selection priority, and a use range of the key. The use range of the key may include use duration of the key, a quantity of data packets that can be encrypted by using the key, or the like.

In some feasible implementations, if the security policy of the slice to which the UE is to be attached is executed by the target authentication module, the security policy controller may send a security policy of one or more network slices in the system to the target authentication module. The one or more network slices may be one or more of network slices served by the target authentication module, and may be specifically determined based on an actual application scenario. This is not limited herein.

During specific implementation, the UE may send the first service request to the AN. The first service request carries a security capability of the UE and the identifier of the specified network slice to which the UE is to be attached. After receiving the first service request, the AN may send the second service request to the authentication module. The second service request carries the security capability of the UE and the identifier of the specified network slice to which the UE is to be attached. After receiving the second service request, the authentication module may perform mutual authentication with the UE, and then may execute the security policy of the slice to which the UE is to be attached.

In some feasible implementations, the target authentication module may determine, by using the security capability of the UE that is carried in the second service request, information such as an encryption algorithm and an integrity protection algorithm supported by the UE. Alternatively, the target authentication module may obtain, by using a network, the security capability of the UE, to be specific, information such as an encryption algorithm and an integrity protection algorithm supported by the UE. The target authentication module may further obtain a security capability of the AN, to be specific, an encryption algorithm, an integrity protection algorithm, and the like supported by the AN. The security capability of the AN may be sent by the AN to the target authentication module. For example, the AN may add the security capability of the AN to the second service request and send the second service request to the target authentication module. During specific implementation, the target authentication module may generate a key according to the security policy (namely, the specified security policy) of the specified network slice to which the UE is to be attached, and may further select an encryption algorithm and an integrity protection algorithm based on the security capability of the UE, the security capability of the AN, and the specified security policy. The key may include at least two keys, for example, a first key and a second key. The first key may be a key used to protect signaling between the UE and the AN, and the second key may be a key used to protect signaling between the UE and the AU. A length of the first key and a length of the second key are consistent with a key length specified in the specified security policy. The encryption algorithm may be an encryption algorithm with a highest selection priority in an encryption algorithm supported by both the UE and the AN, and the integrity protection algorithm may be an integrity protection algorithm with a highest selection priority in an integrity protection algorithm supported by both the UE and the AN.

In some feasible implementations, after generating the first key and the second key and selecting the target encryption algorithm and the target integrity protection algorithm, the target authentication module may generate the first security configuration based on the first key, an identifier of the target encryption algorithm, and an identifier of the target integrity protection algorithm, and add the first security configuration to the second service request response, so as to send the first security configuration information to the AN by using the second service request response. The first security configuration information may include information such as a use range of the first key, the identifier of the target encryption algorithm, and the identifier of the target integrity protection algorithm.

In some feasible implementations, after receiving the second service request response sent by the target authentication module, the AN may determine information such as the key and the identifier of the encryption algorithm or the identifier of the integrity protection algorithm based on the first configuration information carried in the second service request response. If the first security configuration carries information such as the first key, the identifier of the encryption algorithm, and the identifier of the integrity protection algorithm, the AN does not need to execute the security policy, and may directly store the key, determine, as the second security configuration, the identifier of the encryption algorithm and the identifier of the integrity protection algorithm that are carried in the first security configuration, add the second security configuration to the first service request response, and then send the first service request response to the UE to notify the UE of the second security configuration.

In some feasible implementations, if the security policy of the slice to which the UE is to be attached is jointly executed by the target authentication module and the AN, the security policy controller may send a security policy of one or more network slices supported by the target authentication module to the target authentication module, and the security policy controller may further send the security policy of each network slice in the system to the AN. The target authentication module may determine, by using the security capability of the UE that is carried in the second service request, information such as an encryption algorithm and an integrity protection algorithm supported by the UE, and may further send the security capability of the UE to the AN. Alternatively, the target authentication module and the AN may obtain, by using the network, the security capability of the UE, to be specific, information such as an encryption algorithm and an integrity protection algorithm supported by the UE. During specific implementation, the target authentication module may generate at least two keys, for example, the first key and the second key according to the specified security policy. Further, the target authentication module may generate the first configuration based on information such as a use range of the first key and the identifier of the specified network slice, and add the first configuration to the second service request response.

In some feasible implementations, after receiving the second service request response sent by the target authentication module, the AN may determine information such as the key and the identifier of the encryption algorithm or the identifier of the integrity protection algorithm based on the first configuration information carried in the second service request response. If the first security configuration carries only information about the first key, the AN needs to execute the security policy. Specifically, the AN may determine, based on the identifier of the specified network slice, the specified security policy corresponding to the identifier of the specified network slice, and then select a target encryption algorithm and a target integrity protection algorithm based on the security capability of the UE and the specified security policy. Further, the AN may add an identifier of the target encryption algorithm and an identifier of the target integrity protection algorithm to the first security configuration, to obtain the second security configuration, add the second security configuration to the first service request response, and send the first service request response to the UE to notify the UE of the second security configuration.

During specific implementation, for specific implementation processes in which different modules execute the security policy in different application scenarios in the management system provided in this embodiment of the present invention, refer to the implementations described in the steps in the embodiments corresponding to FIG. 8 and FIG. 9, and details are not described herein again.

In this embodiment of the present invention, the target authentication module selected according to the authentication protocol may generate a security configuration, or the target authentication module selected according to the authentication protocol and the AN may generate a security configuration, so that selection flexibility is high and cyber security is improved.

Figure 19:
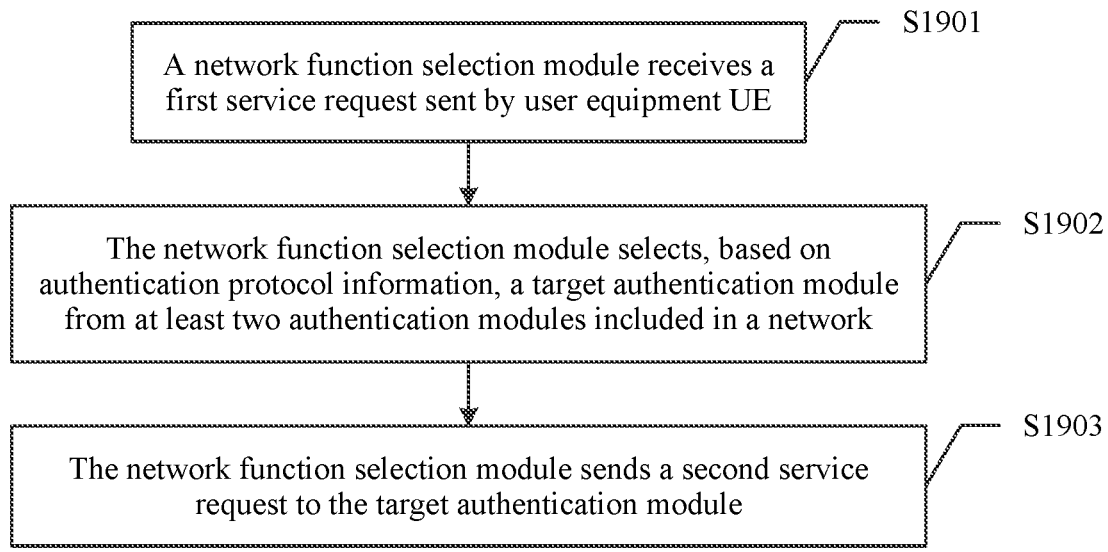
FIG. 19 is a schematic flowchart of a cyber security management method according to an embodiment of the present invention.

FIG. 19 is a schematic flowchart of a cyber security management method according to an embodiment of the present invention. The management method provided in this embodiment of the present invention may include the following steps.

S1901. A network function selection module receives a first service request sent by user equipment UE.

The first service request carries authentication protocol information.

S1902. The network function selection module selects, based on the authentication protocol information, a target authentication module from at least two authentication modules included in a network.

S1903. The network function selection module sends a second service request to the target authentication module.

In some feasible implementations, the authentication protocol information includes an identifier of a first authentication protocol selected by the UE; and that the network function selection module selects, based on the authentication protocol information, a target authentication module from at least two authentication modules included in a network includes:

selecting, by the network function selection module, the target authentication module that supports the first authentication protocol from the at least two authentication modules based on the identifier of the first authentication protocol.

In some feasible implementations, if more than one authentication module supports the first authentication protocol, the method further includes:

selecting, based on a load status of each authentication module that supports the first authentication protocol, an authentication module with least load from the authentication modules as the target authentication module.

In some feasible implementations, the authentication protocol information includes an identifier of a first authentication protocol selected by the UE;

the first service request further carries an identifier of a specified network slice; and that the network function selection module selects, based on the authentication protocol information, a target authentication module from at least two authentication modules included in a network includes:

selecting, by the network function selection module, the target authentication module that supports the first authentication protocol and the specified network slice from the at least two authentication modules based on the identifier of the first authentication protocol and the identifier of the specified network slice.

In some feasible implementations, if more than one authentication module supports the first authentication protocol and the specified network slice, the method further includes:

selecting, based on a load status of each authentication module that supports the first authentication protocol and the specified network slice, an authentication module with least load from the authentication modules as the target authentication module.

In some feasible implementations, the authentication protocol information includes identifiers of at least two second authentication protocols supported by the UE; and that the network function selection module selects, based on the authentication protocol information, a target authentication module from at least two authentication modules included in a network includes:

selecting, by the network function selection module as the target authentication module, a to-be-selected authentication module that supports at least one of the second authentication protocols from the at least two authentication modules based on the identifiers of the second authentication protocols.

In some feasible implementations, the authentication protocol information includes identifiers of at least two second authentication protocols supported by the UE;

the first service request further carries an identifier of a specified network slice; and that the network function selection module selects, based on the authentication protocol information, a target authentication module from at least two authentication modules included in a network includes:

selecting, by the network function selection module as the target authentication module, a to-be-selected authentication module that supports at least one of the second authentication protocols and supports the specified network slice from the at least two authentication modules based on the identifiers of the second authentication protocols.

In some feasible implementations, the authentication protocol information includes identifiers of at least two second authentication protocols supported by the UE; and that the network function selection module selects, based on the authentication protocol information, a target authentication module from at least two authentication modules included in a network includes:

determining, by the network function selection module based on an authentication protocol selection priority that is set in the network, an authentication protocol with a highest selection priority from the second authentication protocols supported by the UE, and selecting a to-be-selected authentication module that supports the authentication protocol with the highest selection priority from the at least two authentication modules as the target authentication module.

In some feasible implementations, if there is more than one to-be-selected authentication module, the method further includes:

selecting, based on a load status of each of the more than one to-be-selected authentication module, an authentication module with least load from the authentication modules as the target authentication module.

In some feasible implementations, the authentication protocol information includes identifiers of at least two third authentication protocols supported by the UE and a selection priority of each of the at least two third authentication protocols; and that the network function selection module selects, based on the authentication protocol information, a target authentication module from at least two authentication modules included in a network includes:

selecting, by the network function selection module, a to-be-selected authentication module that supports at least one of the third authentication protocols from the at least two authentication modules based on the identifiers of the third authentication protocols; and if there is more than one to-be-selected authentication module, selecting, based on the selection priority of each third authentication protocol, an authentication module that supports a fourth authentication protocol with a highest selection priority from all to-be-selected authentication modules as the target authentication module.

In some feasible implementations, the authentication protocol information includes identifiers of at least two third authentication protocols supported by the UE and a selection priority of each of the at least two third authentication protocols;

the first service request further carries an identifier of a specified network slice; and that the network function selection module selects, based on the authentication protocol information, a target authentication module from at least two authentication modules included in a network includes:

selecting, by the network function selection module, a first authentication module that supports at least one of the third authentication protocols from the at least two authentication modules based on the identifiers of the third authentication protocols;

if there is more than one first authentication module, selecting, based on the selection priority of each third authentication protocol, a second authentication module that supports a fourth authentication protocol with a highest priority from all first authentication modules; and if there is more than one second authentication module, selecting, based on a load status of each second authentication module or information about a network slice served by each second authentication module, an authentication module with least load that serves the specified network slice from the second authentication modules as the target authentication module.

In some feasible implementations, the network function selection module includes at least one of an authentication unit AU selection function AUSF, an AU routing function AURF, a slice selection function SSF, and mobility management MM.

During specific implementation, for an implementation described in each step in the management method, refer to an execution manner corresponding to each application scenario in each of the foregoing systems, and details are not described herein again.

Figure 20:
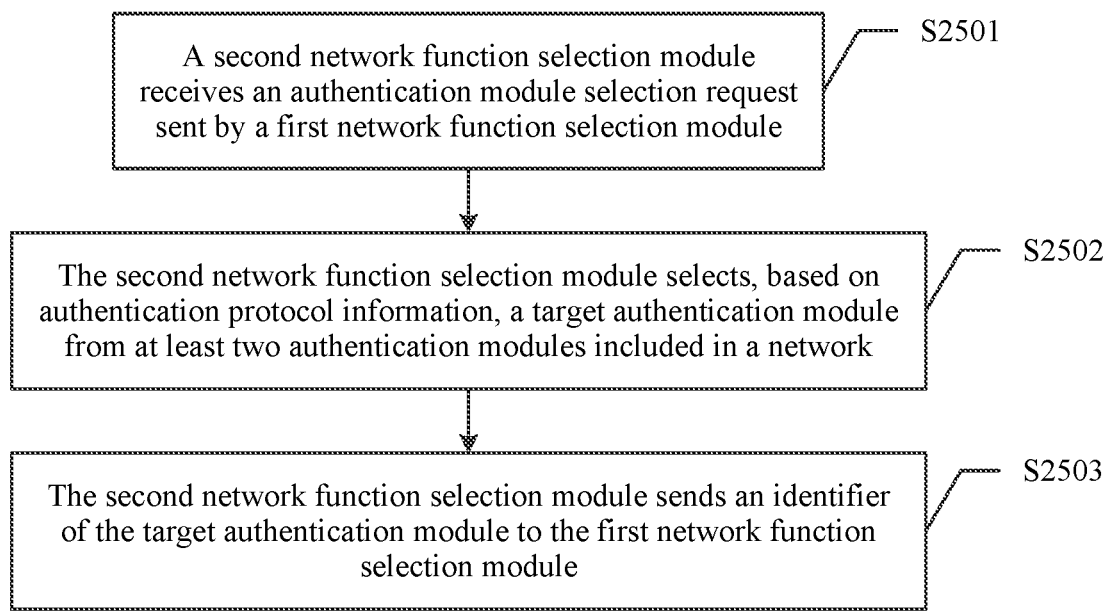
FIG. 20 is another schematic flowchart of a cyber security management method according to an embodiment of the present invention.

FIG. 20 is another schematic flowchart of a cyber security management method according to an embodiment of the present invention. The management method provided in this embodiment of the present invention may include the following steps.

S2501. A second network function selection module receives an authentication module selection request sent by a first network function selection module.

The authentication module selection request carries authentication protocol information sent by user equipment UE.

The foregoing first service request carries the authentication protocol information sent by the user equipment UE.

S2502. The second network function selection module selects, based on the authentication protocol information, a target authentication module from at least two authentication modules included in a network.

S2503. The second network function selection module sends an identifier of the target authentication module to the first network function selection module, so as to send a service request to the target authentication module by using the first network function selection module.

In this embodiment of the present invention, the first network function selection module may route a message, and the second network function selection module implements authentication module selection, so that network signaling overheads can be reduced, and authentication module selection efficiency can be improved.

Figure 21:
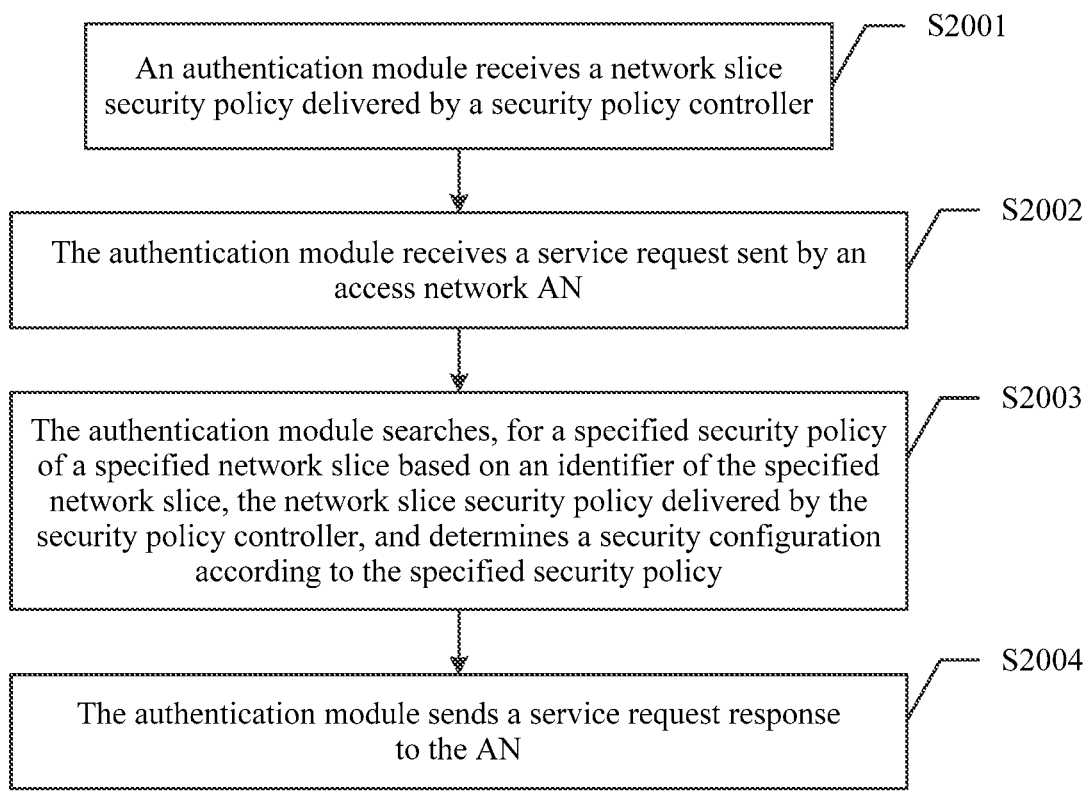
FIG. 21 is another schematic flowchart of a cyber security management method according to an embodiment of the present invention.

FIG. 21 is another schematic flowchart of a cyber security management method according to an embodiment of the present invention. The management method provided in this embodiment of the present invention may include the following steps.

S2001. An authentication module receives a network slice security policy delivered by a security policy controller.

S2002. The authentication module receives a service request sent by an access network AN.

The service request carries a security capability of user equipment UE and an identifier of a specified network slice to which the UE is to be attached.

S2003. The authentication module searches, for a specified security policy of the specified network slice based on the identifier of the specified network slice, the network slice security policy delivered by the security policy controller, and determines a security configuration according to the specified security policy.

S2004. The authentication module sends a service request response to the AN.

The service request response carries the security configuration.

In some feasible implementations, the specified security policy includes key information and encryption algorithm information or integrity protection algorithm information;

the service request further carries the security capability of the user equipment UE; and the determining a security configuration according to the specified security policy includes:
  determining a key length specified in the specified security policy of the specified network slice, and generating a key corresponding to the key length;
  selecting a target encryption algorithm or a target integrity protection algorithm based on the security capability of the UE, a security capability of the AN, and the encryption algorithm information and the integrity protection algorithm information included in the specified security policy; and
  generating the security configuration based on the key and an identifier of the target encryption algorithm or an identifier of the target integrity protection algorithm, and adding the security configuration to the second service request response.

In some feasible implementations, the specified security policy includes key information; and
  the determining a security configuration according to the specified security policy includes:
  determining a key length specified in the specified security policy of the specified network slice, generating a key corresponding to the key length, generating the security configuration based on the key and the identifier of the specified network slice, and adding the security configuration to the second service request response.

In some feasible implementations, the specified security policy includes encryption algorithm information or integrity protection algorithm information;
  the service request further carries the security capability of the user equipment UE; and
  the determining a security configuration according to the specified security policy includes:
  selecting a target encryption algorithm or a target integrity protection algorithm based on the security capability of the UE, a security capability of the AN, and the encryption algorithm information and the integrity protection algorithm information included in the specified security policy; and
  generating the security configuration based on an identifier of the target encryption algorithm or an identifier of the target integrity protection algorithm, and adding the security configuration to the second service request response.

In some feasible implementations, the encryption algorithm information included in the specified security policy is an encryption algorithm selection priority, and the integrity protection algorithm information is an integrity protection algorithm selection priority;
  the target encryption algorithm is an encryption algorithm with a highest selection priority in an encryption algorithm supported by both the UE and the AN; and
  the target integrity protection algorithm is an integrity protection algorithm with a highest selection priority in an integrity protection algorithm supported by both the UE and the AN.

In some feasible implementations, the authentication module includes at least one of an authentication unit AU, a front-end, and an access control agent ACA.

During specific implementation, for an implementation described in each step in the management method, refer to an execution manner corresponding to each application scenario in each of the foregoing systems, and details are not described herein again.

Figure 22:
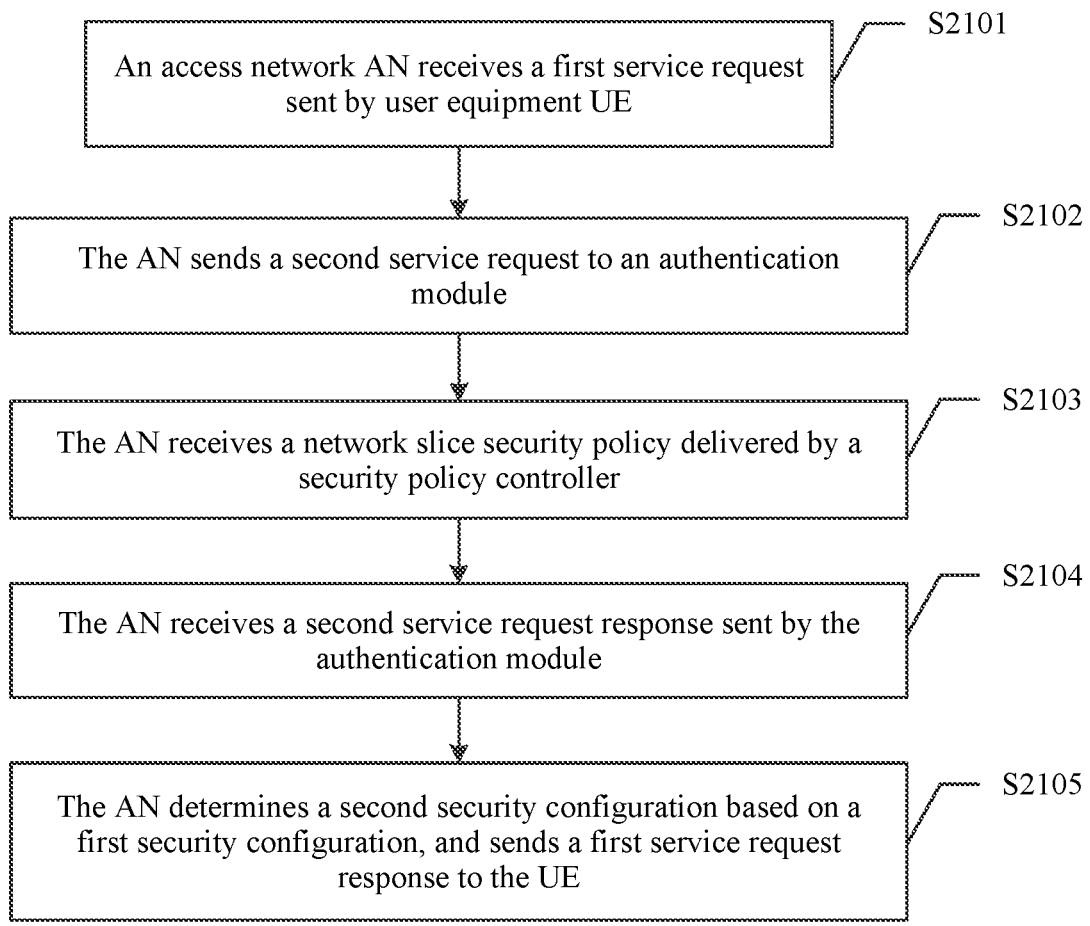
FIG. 22 is another schematic flowchart of a cyber security management method according to an embodiment of the present invention.

FIG. 22 is another schematic flowchart of a cyber security management method according to an embodiment of the present invention. The management method provided in this embodiment of the present invention may include the following steps.

S2101. An access network AN receives a first service request sent by user equipment UE.

The first service request carries a security capability of the UE and an identifier of a specified network slice to which the UE is to be attached.

S2102. The AN sends a second service request to an authentication module.

The second service request carries the identifier of the specified network slice to which the UE is to be attached, a security capability of the AN, and the security capability of the UE.

S2103. The AN receives a network slice security policy delivered by a security policy controller.

S2104. The AN receives a second service request response sent by the authentication module.

The second service request response carries a first security configuration that is determined by the authentication module based on the identifier of the specified network slice, the security capability of the AN, and the security capability of the UE.

S2105. The AN determines a second security configuration based on a first security configuration, and sends a first service request response to the UE.

The first service request response carries the second security configuration.

In some feasible implementations, the first security configuration includes a key and an identifier of an encryption algorithm or an identifier of an integrity protection algorithm; and
  that the AN determines a second security configuration based on the first security configuration includes:
  storing, by the AN, the key, obtaining the identifier of the encryption algorithm and the identifier of the integrity protection algorithm from the first security configuration, and generating the second security configuration based on the identifier of the encryption algorithm and the identifier of the integrity protection algorithm.

During specific implementation, for an implementation described in each step in the management method, refer to an execution manner corresponding to each application scenario in each of the foregoing systems, and details are not described herein again.

Figure 23:
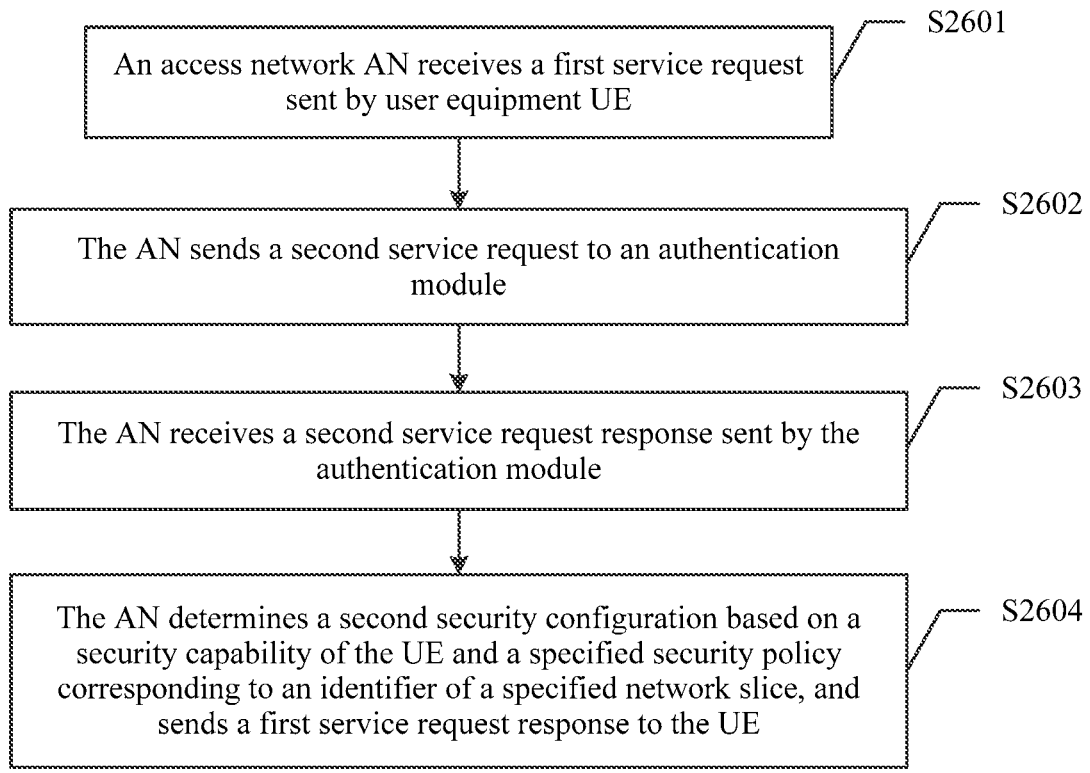
FIG. 23 is another schematic flowchart of a cyber security management method according to an embodiment of the present invention.

FIG. 23 is another schematic flowchart of a cyber security management method according to an embodiment of the present invention. The management method provided in this embodiment of the present invention may include the following steps.

S2601. An access network AN receives a first service request sent by user equipment UE.

The first service request carries a security capability of the UE and an identifier of a specified network slice to which the UE is to be attached.

S2602. The AN sends a second service request to an authentication module.

The second service request carries the identifier of the specified network slice to which the UE is to be attached.

S2603. The AN receives a second service request response sent by the authentication module.

S2604. The AN determines a second security configuration based on a security capability of the UE and a specified security policy corresponding to an identifier of a specified network slice, and sends a first service request response to the UE.

The first service request response carries the second security configuration.

In some feasible implementations, that the AN determines a second security configuration based on a security capability of the UE and a specified security policy corresponding to an identifier of the specified network slice includes:

determining, by the AN, the specified security policy based on the identifier of the specified network slice; and selecting a target encryption algorithm or a target integrity protection algorithm based on a security capability of the AN, the security capability of the UE, and the specified security policy, and generating the second security configuration based on an identifier of the target encryption algorithm or an identifier of the target integrity protection algorithm.

In some feasible implementations, encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

During specific implementation, for an implementation described in each step in the management method, refer to an execution manner corresponding to each application scenario in each of the foregoing systems, and details are not described herein again.

Figure 24:
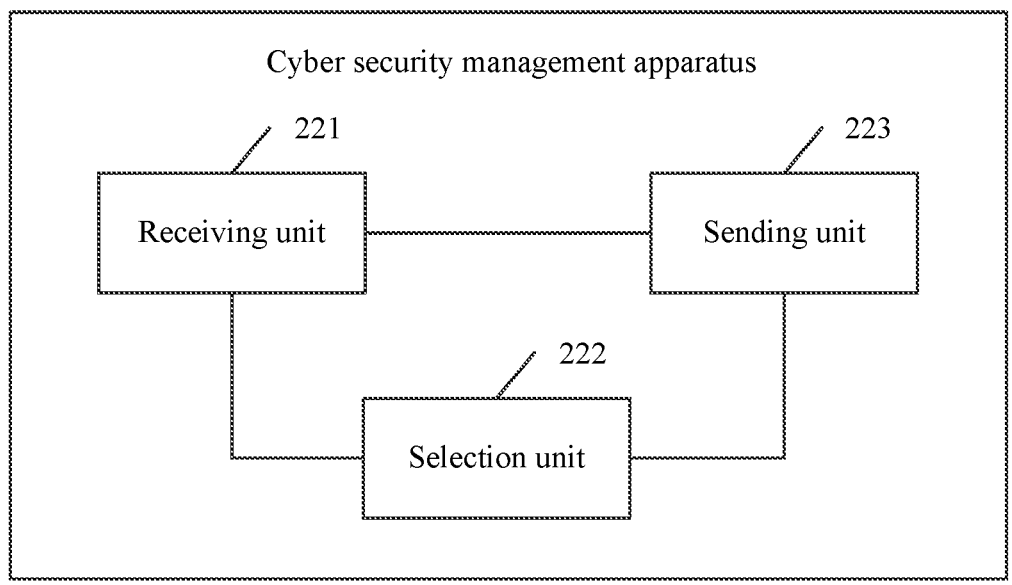
FIG. 24 is a schematic structural diagram of a cyber security management apparatus according to an embodiment of the present invention.

FIG. 24 is a schematic structural diagram of a cyber security management apparatus according to an embodiment of the present invention. As shown in FIG. 24, the management apparatus provided in this embodiment of the present invention may be specifically a network function selection module provided in the embodiments of the present invention. The management apparatus may include:

a receiving unit 221, configured to receive a first service request sent by user equipment UE, where the first service request carries authentication protocol information;

a selection unit 222, configured to select, based on the authentication protocol information received by the receiving unit, a target authentication module from at least two authentication modules included in a network; and a sending unit 223, configured to send a second service request to the target authentication module selected by the selection unit.

In some feasible implementations, the authentication protocol information includes an identifier of a first authentication protocol selected by the UE; and the selection unit 222 is specifically configured to:
select the target authentication module that supports the first authentication protocol from the at least two authentication modules based on the identifier of the first authentication protocol.

In some feasible implementations, if more than one authentication module supports the first authentication protocol, the selection unit 222 is specifically configured to:
select, based on a load status of each authentication module that supports the first authentication protocol, an authentication module with least load from the authentication modules as the target authentication module.

In some feasible implementations, the authentication protocol information includes an identifier of a first authentication protocol selected by the UE;

the first service request further carries an identifier of a specified network slice; and the selection unit 222 is specifically configured to:
select the target authentication module that supports the first authentication protocol and the specified network slice from the at least two authentication modules based on the identifier of the first authentication protocol and the identifier of the specified network slice.

In some feasible implementations, if more than one authentication module supports the first authentication protocol and the specified network slice, the selection unit 222 is specifically configured to:
select, based on a load status of each authentication module that supports the first authentication protocol and the specified network slice, an authentication module with least load from the authentication modules as the target authentication module.

The authentication protocol information includes identifiers of at least two second authentication protocols supported by the UE; and the selection unit 222 is specifically configured to:
select, based on the identifiers of the second authentication protocols, a to-be-selected authentication module that supports at least one of the second authentication protocols from the at least two authentication modules as the target authentication module.

In some feasible implementations, the authentication protocol information includes identifiers of at least two second authentication protocols supported by the UE;

the first service request further carries an identifier of a specified network slice; and the selection unit 222 is specifically configured to:
select, based on the identifiers of the second authentication protocols, a to-be-selected authentication module that supports at least one of the second authentication protocols and supports the specified network slice from the at least two authentication modules as the target authentication module.

In some feasible implementations, the authentication protocol information includes identifiers of at least two second authentication protocols supported by the UE; and the selection unit 222 is specifically configured to:
determine, based on an authentication protocol selection priority that is set in the network, an authentication protocol with a highest selection priority from the second authentication protocols supported by the UE, and select a to-be-selected authentication module that supports the authentication protocol with the highest selection priority from the at least two authentication modules as the target authentication module.

In some feasible implementations, if there is more than one to-be-selected authentication module, the selection unit 222 is specifically configured to:
select, based on a load status of each of the more than one to-be-selected authentication module, an authentication module with least load from the authentication modules as the target authentication module.

In some feasible implementations, the authentication protocol information includes identifiers of at least two third authentication protocols supported by the UE and a selection priority of each of the at least two third authentication protocols; and the selection unit 222 is specifically configured to:

select a to-be-selected authentication module that supports at least one of the third authentication protocols from the at least two authentication modules based on the identifiers of the third authentication protocols; and if there is more than one to-be-selected authentication module, select, based on the selection priority of each third authentication protocol, an authentication module that supports a fourth authentication protocol with a highest selection priority from all to-be-selected authentication modules as the target authentication module.

In some feasible implementations, the authentication protocol information includes identifiers of at least two third authentication protocols supported by the UE and a selection priority of each of the at least two third authentication protocols;

the first service request further carries an identifier of a specified network slice; and the selection unit 222 is specifically configured to:

select a first authentication module that supports at least one of the third authentication protocols from the at least two authentication modules based on the identifiers of the third authentication protocols;

if there is more than one first authentication module, select, based on the selection priority of each third authentication protocol, a second authentication module that supports a fourth authentication protocol with a highest priority from all first authentication modules; and if there is more than one second authentication module, select, based on a load status of each second authentication module or information about a network slice served by each second authentication module, an authentication module with least load that serves the specified network slice from the second authentication modules as the target authentication module.

In some feasible implementations, the selection unit 222 includes a first subunit and a second subunit, where the first subunit is configured to: receive the first service request sent by the UE, and send an authentication module selection request to the second subunit, where the authentication module selection request carries the authentication protocol information;

the second subunit is configured to: select the target authentication module from the at least two authentication modules based on the authentication protocol information, and send an identifier of the target authentication module to the first subunit; and the first subunit is further configured to send the second service request to the target authentication module corresponding to the identifier of the target authentication module.

In some feasible implementations, the second subunit is specifically configured to perform any one of the implementations performed by the selection unit.

In some feasible implementations, the selection unit 222 includes at least one of an authentication unit AU selection function AUSF, an AU routing function AURF, a slice selection function SSF, and mobility management MM.

In some feasible implementations, the first subunit is an AURF, and the second subunit is an AUSF.

During specific implementation, for an implementation described in each step in the management method, refer to an execution manner corresponding to each application scenario in each of the foregoing systems, and details are not described herein again.

Figure 25:
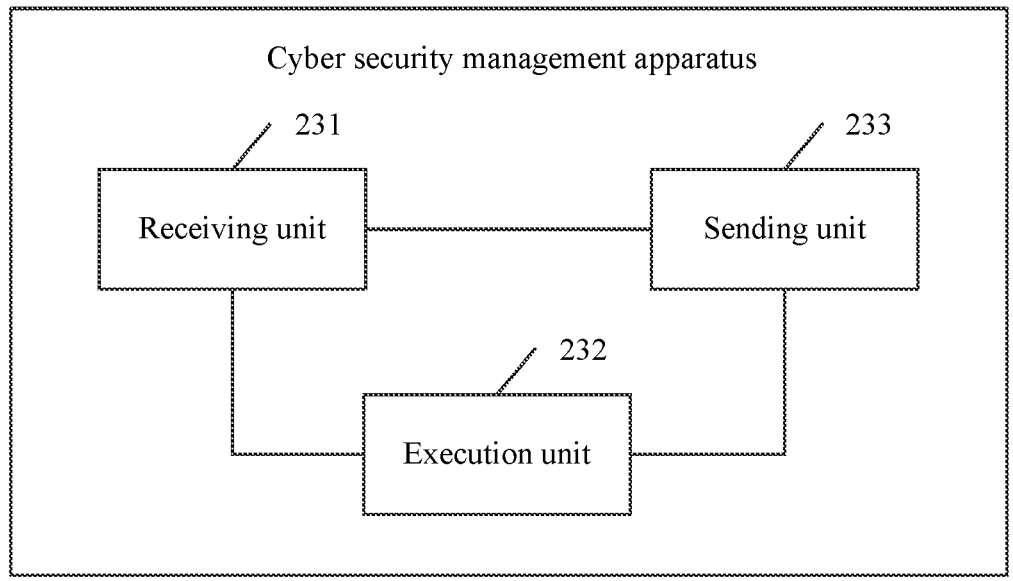
FIG. 25 is another schematic structural diagram of a cyber security management apparatus according to an embodiment of the present invention.

FIG. 25 is another schematic structural diagram of a cyber security management apparatus according to an embodiment of the present invention. As shown in FIG. 25, the management apparatus provided in this embodiment of the present invention may be specifically an authentication module provided in the embodiments of the present invention. The management apparatus may include:

a receiving unit 231, configured to receive a network slice security policy delivered by a security policy controller, where the receiving unit 231 is further configured to receive a service request sent by an access network AN, where the service request carries a security capability of user equipment UE and an identifier of a specified network slice to which the UE is to be attached;

an execution unit 232, configured to: search, for a specified security policy of the specified network slice based on the identifier of the specified network slice that is received by the receiving unit 231, the network slice security policy delivered by the security policy controller, and determine a security configuration according to the specified security policy; and a sending unit 233, configured to send a service request response to the AN, where the service request response carries the security configuration determined by the execution unit 232.

In some feasible implementations, the specified security policy includes key information and encryption algorithm information or integrity protection algorithm information;

the service request further carries the security capability of the user equipment UE; and the execution unit 232 is specifically configured to:

determine a key length specified in the specified security policy of the specified network slice, and generate a key corresponding to the key length;

select a target encryption algorithm or a target integrity protection algorithm based on the security capability of the UE, a security capability of the AN, and the encryption algorithm information or the integrity protection algorithm information included in the specified security policy; and generate the security configuration based on the key and an identifier of the target encryption algorithm or an identifier of the target integrity protection algorithm, and add the security configuration to the second service request response.

In some feasible implementations, the specified security policy includes key information; and the execution unit 232 is specifically configured to:

determine a key length specified in the specified security policy of the specified network slice, generate a key corresponding to the key length, generate the security configuration based on the key and the identifier of the specified network slice, and add the security configuration to the second service request response.

In some feasible implementations, the specified security policy includes encryption algorithm information or integrity protection algorithm information;

the service request further carries the security capability of the user equipment UE; and the execution unit is specifically configured to:

select a target encryption algorithm or a target integrity protection algorithm based on the security capability of the UE, a security capability of the AN, and the encryption algorithm information or the integrity protection algorithm information included in the specified security policy; and generate the security configuration based on an identifier of the encryption algorithm or an identifier of the integrity protection algorithm, and add the security configuration to the second service request response.

In some feasible implementations, the encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

In some feasible implementations, the execution unit 232 includes at least one of an authentication unit AU, a front-end, and an access control agent ACA.

During specific implementation, for an implementation described in each step in the management method, refer to an execution manner corresponding to each application scenario in each of the foregoing systems, and details are not described herein again.

Figure 26:
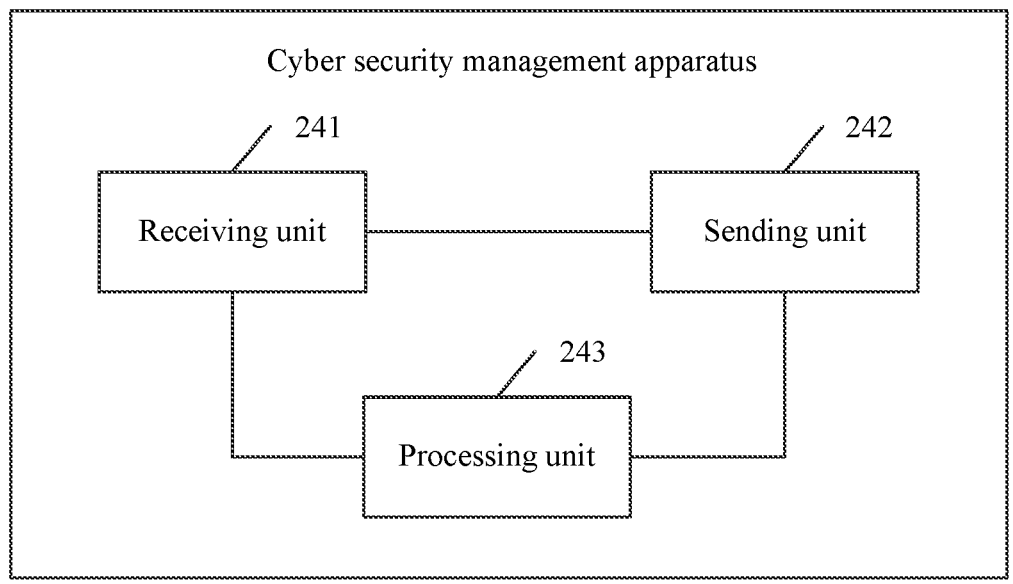
FIG. 26 is another schematic structural diagram of a cyber security management apparatus according to an embodiment of the present invention.

FIG. 26 is another schematic structural diagram of a cyber security management apparatus according to an embodiment of the present invention. As shown in FIG. 26, the management apparatus provided in this embodiment of the present invention may be specifically an AN (or a RAN) provided in the embodiments of the present invention. The management apparatus may include:

a receiving unit 241, configured to receive a first service request sent by user equipment UE, where the first service request carries a security capability of the UE and an identifier of a specified network slice to which the UE is to be attached;

a sending unit 242, configured to send a second service request to an authentication module based on the first service request received by the receiving unit, where the second service request carries the identifier of the specified network slice to which the UE is to be attached, a security capability of the AN, and the security capability of the UE, where the receiving unit 241 is further configured to receive a network slice security policy delivered by a security policy controller, and the receiving unit 241 is further configured to receive a second service request response sent by the authentication module, where the second service request response carries a first security configuration that is determined by the authentication module based on the identifier of the specified network slice, the security capability of the AN, and the security capability of the UE; and a processing unit 243, configured to determine a second security configuration based on the first security configuration received by the receiving unit, where the sending unit 242 is further configured to send a first service request response to the UE, where the first service request response carries the second security configuration determined by the processing unit.

In some feasible implementations, the first security configuration includes a key and an identifier of an encryption algorithm or an identifier of an integrity protection algorithm; and the processing unit 243 is specifically configured to:
store the key, obtain the identifier of the encryption algorithm or the identifier of the integrity protection algorithm from the first security configuration, and generate the second security configuration based on the identifier of the encryption algorithm or the identifier of the integrity protection algorithm.

During specific implementation, for an implementation described in each step in the management method, refer to an execution manner corresponding to each application scenario in each of the foregoing systems, and details are not described herein again.

Figure 27:
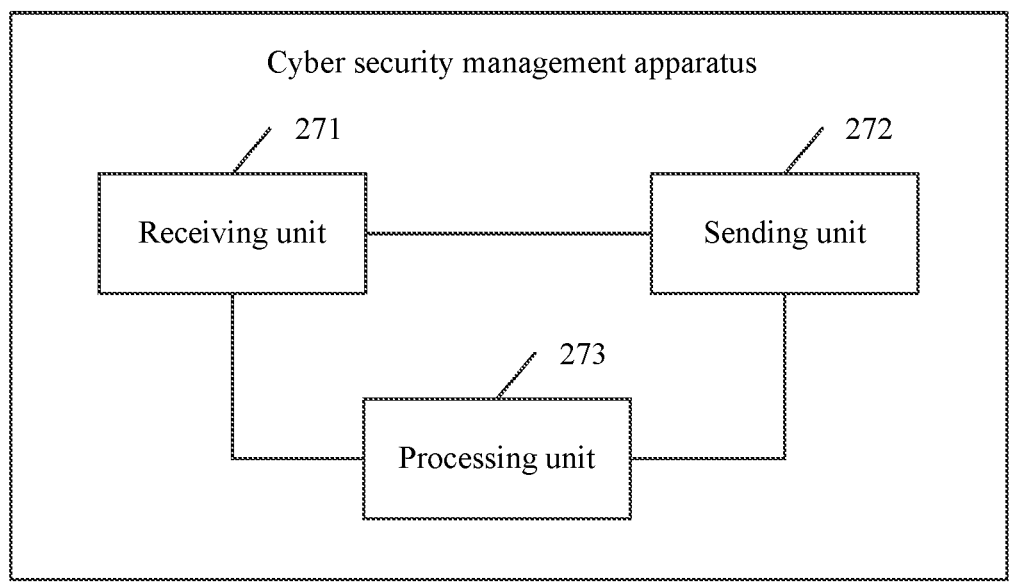
FIG. 27 is another schematic structural diagram of a cyber security management apparatus according to an embodiment of the present invention.

FIG. 27 is another schematic structural diagram of a cyber security management apparatus according to an embodiment of the present invention. As shown in FIG. 27, the management apparatus provided in this embodiment of the present invention may be specifically an AN (or a RAN) provided in the embodiments of the present invention. The management apparatus may include:

a receiving unit 271, configured to receive a first service request sent by user equipment UE, where the first service request carries a security capability of the UE and an identifier of a specified network slice to which the UE is to be attached;

a sending unit 272, configured to send a second service request to an authentication module based on the first service request received by the receiving unit, where the second service request carries the identifier of the specified network slice to which the UE is to be attached, where the receiving unit 271 is further configured to receive a second service request response sent by the authentication module; and a processing unit 273, configured to determine a second security configuration based on the security capability of the UE that is received by the receiving unit and a specified security policy corresponding to the identifier of the specified network slice, where the sending unit 272 is further configured to send a first service request response to the UE, where the first service request response carries the second security configuration determined by the processing unit.

In some feasible implementations, the processing unit is specifically configured to:
determine the specified security policy based on the identifier of the specified network slice; and
select a target encryption algorithm or a target integrity protection algorithm based on a security capability of the AN, the security capability of the UE, and the specified security policy, and generate the second security configuration based on an identifier of the target encryption algorithm or an identifier of the target integrity protection algorithm.

In some feasible implementations, encryption algorithm information included in the specified security policy is an encryption algorithm selection priority, and the integrity protection algorithm information is an integrity protection algorithm selection priority;

the target encryption algorithm is an encryption algorithm with a highest selection priority in an encryption algorithm supported by both the UE and the AN; and the target integrity protection algorithm is an integrity protection algorithm with a highest selection priority in an integrity protection algorithm supported by both the UE and the AN.

During specific implementation, for an implementation described in each step in the management method, refer to an execution manner corresponding to each application scenario in each of the foregoing systems, and details are not described herein again.

In the specification, claims, and accompanying drawings of the present invention, the terms "first", "second", "third", "fourth", and the like are intended to distinguish between different objects but do not indicate a particular order. Moreover, the terms "include", "contain", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments may be performed. The storage medium may include: a magnetic disk, an optical disc, a read-only memory (Read-Only Memory, ROM), a random access memory (Random Access Memory, RAM), or the like.

What are disclosed above are merely examples of embodiments of the present invention, and certainly are not intended to limit the scope of the claims of the present invention. Therefore, equivalent variations made in accordance with the claims of the present invention shall fall within the scope of the present invention.

What is claimed is:

1. A cyber security management system, wherein the cyber security management system is configured to implement security management of a 5G telecommunication network comprising at least two logical telecommunication network slices, and the cyber security management system comprises user equipment (UE), an access network (AN) connected to multiple carriers and multiple UEs, a network function selection module, and at least two authentication modules, wherein
the network function selection module comprises a first memory and a first processor connected to the first memory, the first memory stores a first program, and the first processor is configured to execute the first program;
each authentication module comprises a second memory and a second processor connected to the second memory, the second memory stores a second program, and the second processor is configured to execute the second program;
the UE is configured to send a first service request to the network function selection module, wherein the first service request carries authentication protocol information;
the network function selection module is configured to: select a target authentication module from the at least two authentication modules based on the authentication protocol information, and send a second service request to the target authentication module, wherein the target authentication module is configured to: receive the second service request, and perform mutual authentication with the UE; and
the target authentication module is further configured to: determine a first security configuration according to a specified security policy of a specified network slice to which the UE is to be attached, and send a second service request response to the AN, wherein the second service request response carries the first security configuration;
the AN is configured to provide network access for multiple UEs to access multiple carriers and multiple network slices; and
the AN is further configured to: determine a second security configuration based on the first security configuration or the specified security policy, and send a first service request response to the UE, wherein the first service request response carries the second security configuration.

2. The cyber security management system according to claim 1, wherein the authentication protocol information comprises an identifier of a first authentication protocol selected by the UE; and
the network function selection module is configured to:
select the target authentication module that supports the first authentication protocol from the at least two authentication modules based on the identifier of the first authentication protocol.

3. The cyber security management system according to claim 2, wherein if more than one authentication module supports the first authentication protocol, the network function selection module is configured to:
select, based on a load status of each authentication module that supports the first authentication protocol, an authentication module having a least load from the authentication modules as the target authentication module.

4. The cyber security management system according to claim 1, wherein the authentication protocol information comprises an identifier of a first authentication protocol selected by the UE;
the first service request further carries an identifier of the specified network slice; and
the network function selection module is configured to:
select the target authentication module that supports the first authentication protocol and the specified network slice from the at least two authentication modules based on the identifier of the first authentication protocol and the identifier of the specified network slice.

5. The cyber security management system according to claim 4, wherein if more than one authentication module supports the first authentication protocol and the specified network slice, the network function selection module is configured to:
select, based on a load status of each authentication module that supports the first authentication protocol and the specified network slice, an authentication module having a least load from the authentication modules as the target authentication module.

6. The cyber security management system according to claim 1, wherein the authentication protocol information comprises identifiers of at least two second authentication protocols supported by the UE; and
the network function selection module is configured to:
select, based on the identifiers of the second authentication protocols, an authentication module that supports at least one of the second authentication protocols from the at least two authentication modules as the target authentication module.

7. The cyber security management system according to claim 6, wherein if there is more than one to-be-selected authentication module, the network function selection module is configured to:
  select, based on a load status of each of the more than one authentication module, an authentication module have a least load from the authentication modules as the target authentication module.

8. The cyber security management system according to claim 1, wherein the authentication protocol information comprises identifiers of at least two second authentication protocols supported by the UE;
  the first service request further carries an identifier of the specified network slice; and
  the network function selection module is specifically configured to:
  select, based on the identifiers of the second authentication protocols, an authentication module that supports at least one of the second authentication protocols and supports the specified network slice from the at least two authentication modules as the target authentication module.

9. The cyber security management system according to claim 1, wherein the authentication protocol information comprises identifiers of at least two second authentication protocols supported by the UE; and
  the network function selection module is configured to:
  determine, based on an authentication protocol selection priority that is set in the network, an authentication protocol with a highest selection priority from the second authentication protocols supported by the UE, and select an authentication module that supports the authentication protocol with a highest selection priority from the at least two authentication modules as the target authentication module.

10. The cyber security management system according to claim 1, wherein the authentication protocol information comprises identifiers of at least two authentication protocols supported by the UE and a selection priority of each of the at least two authentication protocols; and
  the network function selection module is configured to:
  select at least one authentication module that supports at least one of the authentication protocols from the at least two authentication modules based on the identifiers of the authentication protocols; and
  if there is more than one selected authentication module that supports at least one of the authentication protocols, select, based on a selection priority of each authentication protocol, an authentication module that supports an authentication protocol with a highest selection priority from all the selected authentication modules that supports at least one of the authentication protocols as the target authentication module.

11. A cyber security management method configured to implement security management of a 5G telecommunication network comprising at least two logical telecommunication network slices, comprising:
  receiving, by a network function selection module, a first service request sent by user equipment (UE), wherein the first service request carries authentication protocol information;
  selecting, by the network function selection module based on the authentication protocol information, a target authentication module from at least two authentication modules in the telecommunication network;
  sending, by the network function selection module, a second service request to the target authentication module;
  performing, by the target authentication module, mutual authentication with the UE;
  determining, by the target authentication module, a first security configuration according to a specified security policy of a specified network slice to which the UE is to be attached;
  sending, by the target authentication module, a second service request response to an access network (AN) connected to multiple carriers and multiple UEs, wherein the second service request response carries the first security configuration;
  determining, by the AN, a second security configuration based on the first security configuration or the specified security policy; and
  sending, by the AN, a first service request response to the UE, wherein the first service request response carries the second security configuration;
  wherein the AN is configured to provide network access for multiple UEs to access multiple carriers and multiple network slices;
  wherein the network function selection module comprises a first memory and a first processor connected to the first memory, the first memory stores a first program, and the first processor is configured to execute the first program;
  wherein each authentication module comprises a second memory and a second processor connected to the second memory, the second memory stores a second program, and the second processor is configured to execute the second program.

12. The management method according to claim 11, wherein the authentication protocol information comprises an identifier of a first authentication protocol selected by the UE; and
  selecting, by the network function selection module based on the authentication protocol information, a target authentication module from at least two authentication modules comprised in a network comprises:
  selecting, by the network function selection module, the target authentication module that supports the first authentication protocol from the at least two authentication modules based on the identifier of the first authentication protocol.

13. The management method according to claim 12, wherein if more than one authentication module supports the first authentication protocol, the method further comprises:
  selecting, based on a load status of each authentication module that supports the first authentication protocol, an authentication module having a least load from the authentication modules as the target authentication module.

14. The management method according to claim 11, wherein the authentication protocol information comprises an identifier of a first authentication protocol selected by the UE;
  the first service request further carries an identifier of a specified network slice; and
  selecting, by the network function selection module based on the authentication protocol information, the target authentication module from at least two authentication modules in the network comprises:

selecting, by the network function selection module, the target authentication module that supports the first authentication protocol and the specified network slice from the at least two authentication modules based on the identifier of the first authentication protocol and the identifier of the specified network slice.

15. The management method according to claim 14, wherein if more than one authentication module supports the first authentication protocol and the specified network slice, the method further comprises:
   selecting, based on a load status of each authentication module that supports the first authentication protocol and the specified network slice, an authentication module having a least load from the authentication modules as the target authentication module.

16. The management method according to claim 11, wherein the authentication protocol information comprises identifiers of at least two second authentication protocols supported by the UE; and
   the network function selection module is configured to:
   select, based on the identifiers of the second authentication protocols, an authentication module that supports at least one of the second authentication protocols from the at least two authentication modules as the target authentication module.

17. The management method according to claim 16, wherein if there is more than one to-be-selected authentication module, the network function selection module is configured to:
   select, based on a load status of each of the more than one authentication module, an authentication module have a least load from the authentication modules as the target authentication module.

18. The management method according to claim 11, wherein the authentication protocol information comprises identifiers of at least two second authentication protocols supported by the UE;
   the first service request further carries an identifier of the specified network slice; and
   the network function selection module is specifically configured to:
   select, based on the identifiers of the second authentication protocols, an authentication module that supports at least one of the second authentication protocols and supports the specified network slice from the at least two authentication modules as the target authentication module.

19. The management method according to claim 11, wherein the authentication protocol information comprises identifiers of at least two second authentication protocols supported by the UE; and
   the network function selection module is configured to:
   determine, based on an authentication protocol selection priority that is set in the network, an authentication protocol with a highest selection priority from the second authentication protocols supported by the UE, and select an authentication module that supports the authentication protocol with a highest selection priority from the at least two authentication modules as the target authentication module.

20. The management method according to claim 11, wherein the authentication protocol information comprises identifiers of at least two authentication protocols supported by the UE and a selection priority of each of the at least two authentication protocols; and
   the network function selection module is configured to:
   select at least one authentication module that supports at least one of the authentication protocols from the at least two authentication modules based on the identifiers of the authentication protocols; and
   if there is more than one to-be-selected authentication module that supports at least one of the authentication protocols, select, based on a selection priority of each authentication protocol, an authentication module that supports an authentication protocol with a highest selection priority from all the selected authentication modules that supports at least one of the authentication protocols as the target authentication module.

* * * * *